COMMUNICATION SYSTEM

Filed Dec. 30, 1938 20 Sheets-Sheet 1

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 2

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 3

INVENTORS: W. M. BACON
E. F. WATSON

BY W. F. Simpson

ATTORNEY

INVENTORS: W. M. BACON
E. F. WATSON
BY W. F. Simpson
ATTORNEY

COMMUNICATION SYSTEM

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 6

INVENTORS: W. M. BACON
E. F. WATSON

BY W. F. Simpson

ATTORNEY

Jan. 31, 1950 W. M. BACON ET AL 2,495,682

COMMUNICATION SYSTEM

Filed Dec. 30, 1938 20 Sheets-Sheet 7

INVENTORS: W. M. BACON
E. F. WATSON

BY W. F. Simpson

ATTORNEY

Jan. 31, 1950 W. M. BACON ET AL 2,495,682

COMMUNICATION SYSTEM

Filed Dec. 30, 1938 20 Sheets-Sheet 8

INVENTORS: W. M. BACON
E. F. WATSON
BY W. F. Simpson
ATTORNEY

COMMUNICATION SYSTEM

Filed Dec. 30, 1938 20 Sheets-Sheet 9

INVENTORS: W. M. BACON
E. F. WATSON

BY W. F. Simpson

ATTORNEY

INVENTORS: W. M. BACON
E. F. WATSON
BY W. F. Simpson
ATTORNEY

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 12

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 13

INVENTORS: W. M. BACON
E. F. WATSON

BY W. F. Simpson

ATTORNEY

Jan. 31, 1950 W. M. BACON ET AL 2,495,682

COMMUNICATION SYSTEM

Filed Dec. 30, 1938 20 Sheets-Sheet 14

INVENTORS: W. M. BACON
E. F. WATSON

BY W. F. Simpson

ATTORNEY

Jan. 31, 1950 W. M. BACON ET AL 2,495,682

COMMUNICATION SYSTEM

Filed Dec. 30, 1938 20 Sheets-Sheet 15

INVENTORS: W. M. BACON
E. F. WATSON
BY W. F. Simpson
ATTORNEY

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 17

INVENTORS: W. M. BACON
E. F. WATSON

BY W. F. Simpson

ATTORNEY

INVENTORS: W. M. BACON
E. F. WATSON
BY W. F. Simpson
ATTORNEY

Jan. 31, 1950 W. M. BACON ET AL 2,495,682

COMMUNICATION SYSTEM

Filed Dec. 30, 1938 20 Sheets-Sheet 19

INVENTORS: W. M. BACON
E. F. WATSON
BY W. F. Simpson.
ATTORNEY

INVENTORS: W. M. BACON
E. F. WATSON
BY W. F. Simpson
ATTORNEY

Patented Jan. 31, 1950 2,495,682

UNITED STATES PATENT OFFICE 2,495,682

COMMUNICATION SYSTEM

Walter M. Bacon, New York, and Edward F. Watson, Larchmont, N. Y., assignors to Bell Telephone Laboratories, Incorporated, New York, N. Y., a corporation of New York Application December 30, 1938, Serial No. 248,426

115 Claims. (Cl. 178—4)

Figure 2:
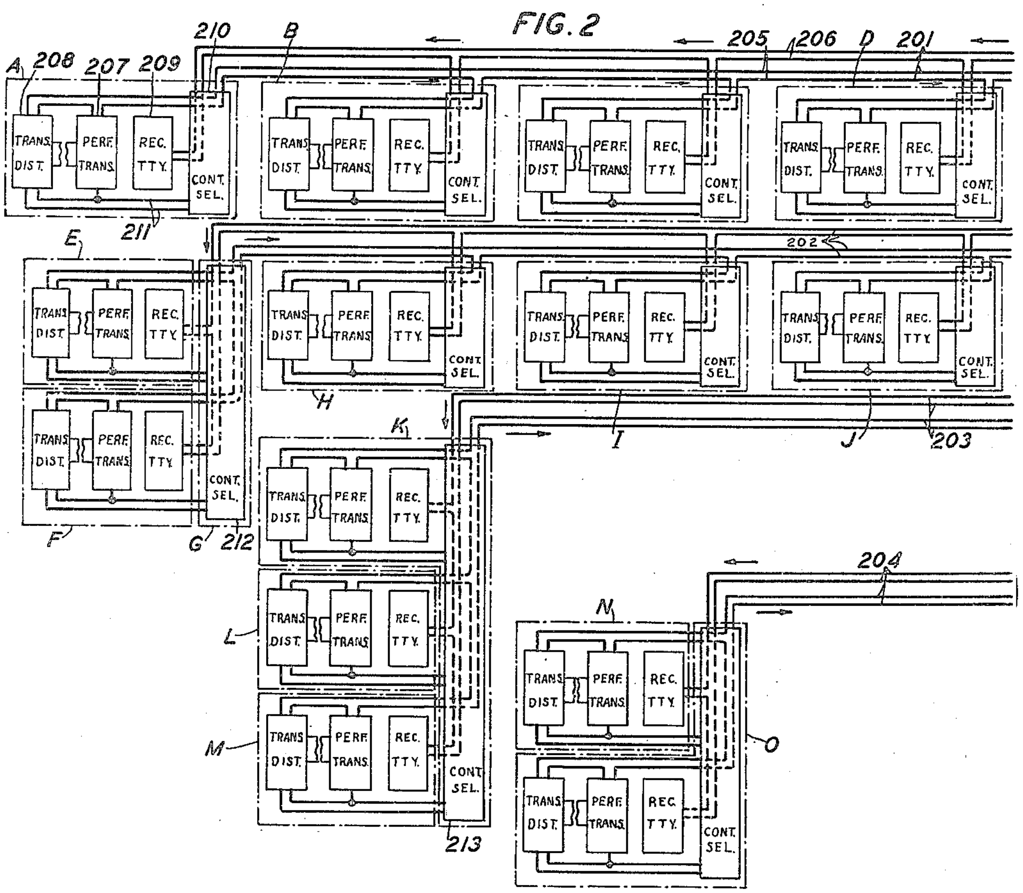

This invention relates to communication systems and more particularly to switching and interconnecting arrangements for telegraph systems.

In the usual automatic switching arrangements employed in communication systems, it has been the practice heretofore to require a subscriber to wait until the calling station or line was idle before permitting the calling subscriber to transmit his message.

It is an object of this invention to permit the calling subscriber to record his message for transmission at any time he so desires whether or not the calling line is idle; and to provide for its automatic transmission when his line is idle without any attention on his part.

Another object of this invention is to provide an arrangement whereby the transmission from each of the outlying or subscribers' stations may be started and stopped from the central or interconnecting switching station.

Another object of this invention is to provide party lines for telegraph subscribers, i. e., a telegraph line which serves a number of outlying or subscribers' telegraph stations all of which are connected to the central station over the same telegraph line.

Another object of this invention is to arrange the circuits and apparatus at the stations connected to a party line so that only one station can transmit over the party line at one time and so that one or more stations may simultaneously receive from the party line.

Another object of this invention is to provide a switching arrangement, located at or near an outlying station which is controlled over the telegraph line, for independently and selectively controlling at least two different series of circuits or functions.

A feature of this switching arrangement is directed to arrangements whereby the control of one series of circuits or functions does not interfere with or disturb the connections established in the other series.

Another object of this invention is to provide an outlying switching arrangement connected to a telegraph line for selectively controlling a plurality of subscribers' stations connected to said line which are located relatively near to said outlying switching arrangement.

Still another object of this invention is to provide an improved controlling arrangement at the outlying stations to interrupt the transmission therefrom and disconnect the transmitting apparatus from the line when all of the messages have been transmitted.

Another object of this invention is to signal the operator at the central station when a suitable number or all the messages available for transmission from any station have been transmitted.

Another object of this invention is to provide controlling and transmitting arrangements at the central station for interrupting the transmission to any outlying station without mutilating or adding any extraneous characters to the message being transmitted and then transmitting directing or switching impulses after which the transmission circuit to the outlying station is reestablished without mutilating or adding any extraneous characters to the message.

Another object of this invention is to provide an alternative arrangement at the central station for directing messages for said central station to receiving apparatus at said central station without first passing through the switching apparatus at the central station in case a substantial percentage of the message signals originating on said line are intended for said central station.

In case only a small percentage of the messages originating on any line are intended for the central station arrangements may be provided in accordance with this invention to direct the message signals intended for the central station to a receiving device through the switching apparatus at the central station.

An object of this invention is to provide an improved perforating apparatus in which an additional hole may be perforated in the tape at the outlying station for controlling certain local circuits at the outlying station to disconnect the transmitter from the line when all the messages prepared for transmission have been transmitted.

Another object of this invention is to provide an improved perforator mechanism at a central station for perforating an additional hole in the tape in response to a particular code combination received from an outlying transmitting station or in response to the operation of a particular key on a manually operated perforator for controlling the switching circuits at the central station.

Another object of this invention is to provide an improved perforator mechanism which incorporates a group of contacts controlled by said mechanism in accordance with received signals for controlling other apparatus.

Still another object of this invention relates to a selecting arrangement controlled by and cooperating with a tape transmitter for selectively connecting said transmitter, under control of perforations in the tape supplied to said transmitter, to the line for which the message perforated in the tape is intended.

Another object of this invention is to provide a permutation code selecting arrangement responsive to two separate and distinct permutation code groups of impulses for operatively and selectively connecting two separate and distinct groups of switching devices and circuits to said permutation selector and for independently controlling said switching devices by said selector.

Another object of this invention is to provide automatic means operative at the end of each call when the supply of tape between the reperforator and transmitter become sufficiently reduced to automatically feed out an additional supply of perforated tape to insure that no part of the last message remains between the reperforator and the tape transmitter.

Another object of this invention is to provide additional apparatus to indicate to an operator when sufficient tape has been automatically fed out of the reperforator to insure that the end of the last message has been retransmitted and to provide circuits to enable the operator to stop the automatic perforation of tape at this time.

Another object of this invention is to automatically stop the automatic perforation of additional tape as mentioned in the preceding paragraph on the receipt of further signals from the line.

Another object is to provide a system for automatically routing messages from a plurality of transmitters to selected ones of a plurality of lines, the transmitters being arranged to send in a predetermined sequence whenever two or more transmitters have messages destined for any single line.

In brief, in the preferred embodiment of this invention, a plurality of outlying or subscribers' stations are connected to a central interconnecting or switching station by means of two one-way communication channels or their equivalent as a duplexed line. One of the channels is employed for transmitting message signals from the outlying station to the central station. In order to distinguish this channel from the other channel it will be referred to hereinafter as a "transmitting channel" or "transmitting line." The other channel connected between the outlying subscriber's station and the central station is for transmitting message signals from the central station to the outlying station. In order that this channel may be readily referred to and distinguished from the other channel it will be called the "receiving channel" or "receiving line" herein.

These channels or lines to the central station may comprise two one-way telegraph lines or a full duplex telegraph line and may comprise open-wire lines, cable circuits or radio channels which are capable of transmitting low frequency telegraph signal impulses, voice frequency carrier current telegraph signaling impulses, high frequency carrier current telegraph signaling impulses and radio telegraph signaling impulses. These lines may also include telegraph channels of composited telephone and telegraph lines. The lines may also include multiplex channels of multiplex telegraph systems. These lines and channels may also be provided with necessary or desirable repeating equipment including regenerative repeaters. These lines may also include any combination of the above type of telegraph channels.

Each of the outlying or subscriber's stations is provided with a keyboard operated perforating apparatus for perforating tape in accordance with the message to be transmitted.

The outlying stations are also provided with a tape-controlled transmitter for transmitting message signals in accordance with the perforations in the tape. These stations are further provided with a keyboard transmitter whereby the messages may be transmitted directly from the keyboard. In this case the message may be also perforated in the tape if it is so desired. The outlying stations are also provided with receiving apparatus for receiving and recording messages transmitted from other stations. In addition to the transmitting and receiving apparatus provided at each of the outlying stations, a permutation code selector will usually be provided at each of these stations for connecting the transmitting apparatus to the transmitting line under control of permutation code groups of impulses received over the receiving channel and for connecting the receiving apparatus to the receiving channel under control of other permutation code groups of impulses received over the receiving channel.

In case insufficient messages originate or terminate at any of the outlying stations to require the full line or channel line additional stations may be connected to the line to form a party line. In this case the transmitting apparatus at each of the stations of the party line is connected to the transmitting channel under the control of the selecting apparatus at the outlying stations and the receiving apparatus at each of the outlying stations is similarly connected to the receiving channel under control of the permutation code selector. The permutation code selector is permanently connected to the receiving channel at each of the stations. In case several of the outlying stations are located relatively near to each other a single permutation code selector may be connected to the receiving channel at one of the outlying stations or at some central point. In this case, this single permutation code selector will selectively connect the transmitting apparatus of any of the associated stations to the transmitting channel and the receiving apparatus to the receiving channel. The connection of the receiving apparatus to the receiving channel in all cases is independent of the connection of the transmitting apparatus to the transmitting channel. In other words, the transmitting apparatus at one station may be connected to the transmitting channel and the receiving apparatus at the other station connected to the receiving channel. Of course, when it is so desired both the transmitting and the receiving apparatus at any given station may be connected to the respective transmitting and receiving channels.

At the central station the message signals are received either by a printing telegraph receiver or by telegraph reperforating apparatus which perforates a tape. This tape then passes through a retransmitter which is connected to switching apparatus. In case the line connected to the station for which the message is intended is busy the retransmitting apparatus will remain inoperative. When the line becomes idle the transmitting apparatus will actuate the switching equipment and connect the retransmitter to the desired line after which it will transmit the message to the desired station.

In addition, a special transmitting apparatus is provided at the central station for transmitting switching permutation code groups of impulses to the outlying stations for starting the transmitting apparatus at any of the outlying stations, In case message signals are in the progress of being transmitted over the receiving channel over which it is necessary to transmit these switching permutation code groups of impulses, the special transmitting apparatus at the central station first interrupts this transmission without mutilating any of the message signals and without adding any additional characters to the message. After this the switching impulses are transmitted to control the connection of the transmitting apparatus to the transmitting channel at the desired station after which the previous transmission circuit is restored, again without mutilating any of the signaling impulses or adding any additional characters to the message the transmission of which was interrupted.

The outlying subscribers will perforate the tape in accordance with the messages to be transmitted from their stations. In perforating the tape they will precede each message by certain code combinations designating the line and station to which the following messages are directed. In addition to this, when transmission is started from a station, a subscriber will transmit several additional switching code combinations to insure that the equipment at the central office will be in condition to properly receive and store the messages. Furthermore, the subscriber will follow each message by certain switching code combinations which will restore the circuits at the distant station and at the central office to normal condition and prepare them for reception of the succeeding switching information. In addition to this, when all of the material to be transmitted has been transmitted from any particular station, certain additional code combinations will be transmitted to the central station to indicate to the operating attendant thereat that the transmission from that particular station has been completed for the time being.

The attendant upon receiving this signal will then operate her special transmitter to start the transmission from another station connected to that line.

In case the message is intended for the central station, the equipment at the central station is arranged to connect the receiving instrument to the line to record the message.

In case the message is intended for some station other than the central station the impulses transmitted from the outlying station are first stored by perforating a tape. The perforated tape is then passed through a tape-controlled transmitter.

The tape-controlled transmitter or retransmitter, as it is sometimes called, is connected to the switching equipment at the central office. When the line to which the message is directed is idle the switching perforations in the tape cause the tape transmitter to be connected to the desired line. The tape transmitter will then transmit additional switching information over this line to cause the receiving apparatus at the proper station to be connected to the receiving channel. The tape transmitter will thereafter transmit the message intended for that station. At the termination of this message additional switching information is transmitted over this line to disconnect the receiving equipment from the receiving line at the distant station.

In addition, the connection of the tape transmitter at the central station to this line is interrupted and the circuits restored to their original condition and may be used for the transmission of other messages. The next message perforated in the tape is directed to the station for which it is intended in a similar manner. When the transmission from any station is completed and a signal indicating this condition is received at the central station, the operator thereat will start the transmitter at another station.

At the completion of the transmission from any of the subscribers' stations or after the completion of all messages which are stored in the perforated tape the circuit at the central station is arranged so that the transmission from the tape-controlled transmitter at the central office will continue until the supply of tape between the reperforator and the transmitter is reduced to a predetermined amount at which time the reperforator is automatically actuated to perforate an additional supply of tape so the end of the last message has been transmitted through the transmitting distributor.

After sufficient tape has been thus automatically perforated to insure that the end of the preceding message has been transmitted a lamp lights before the operator at the central station to indicate this condition to her whereupon she will operate a key or button to stop the automatic perforation of tape at this time.

In case a message should be transmitted from the subscriber's station to the reperforator during the time it is automatically perforating tape this message will stop the automatic operation of the reperforator so that the reperforator will perforate the tape in accordance with the message being transmitted from the subscriber's station.

In case it is desired to start a transmitter connected to a line, the receiving channel of which is being employed to transmit messages to some station on that line, it is necessary for the automatic transmitter to first interrupt the transmission of this message without mutilating any of the characters or adding any additional characters to the message. The transmitter will then transmit the signaling or switching impulses over the line required to connect the desired transmitter to the channel. After this the transmitter is arranged to restore the previous transmission circuit over the receiving channel again without mutilating or losing any character of the message and without adding any additional characters.

Figure 4:
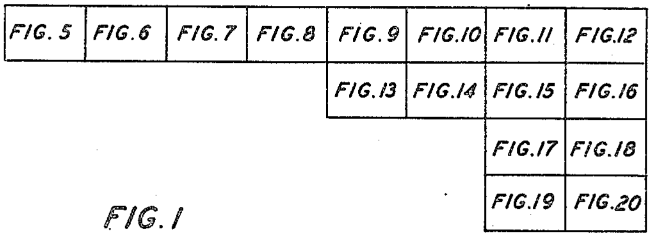
Figure 1:
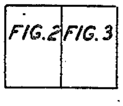
Figure 3:
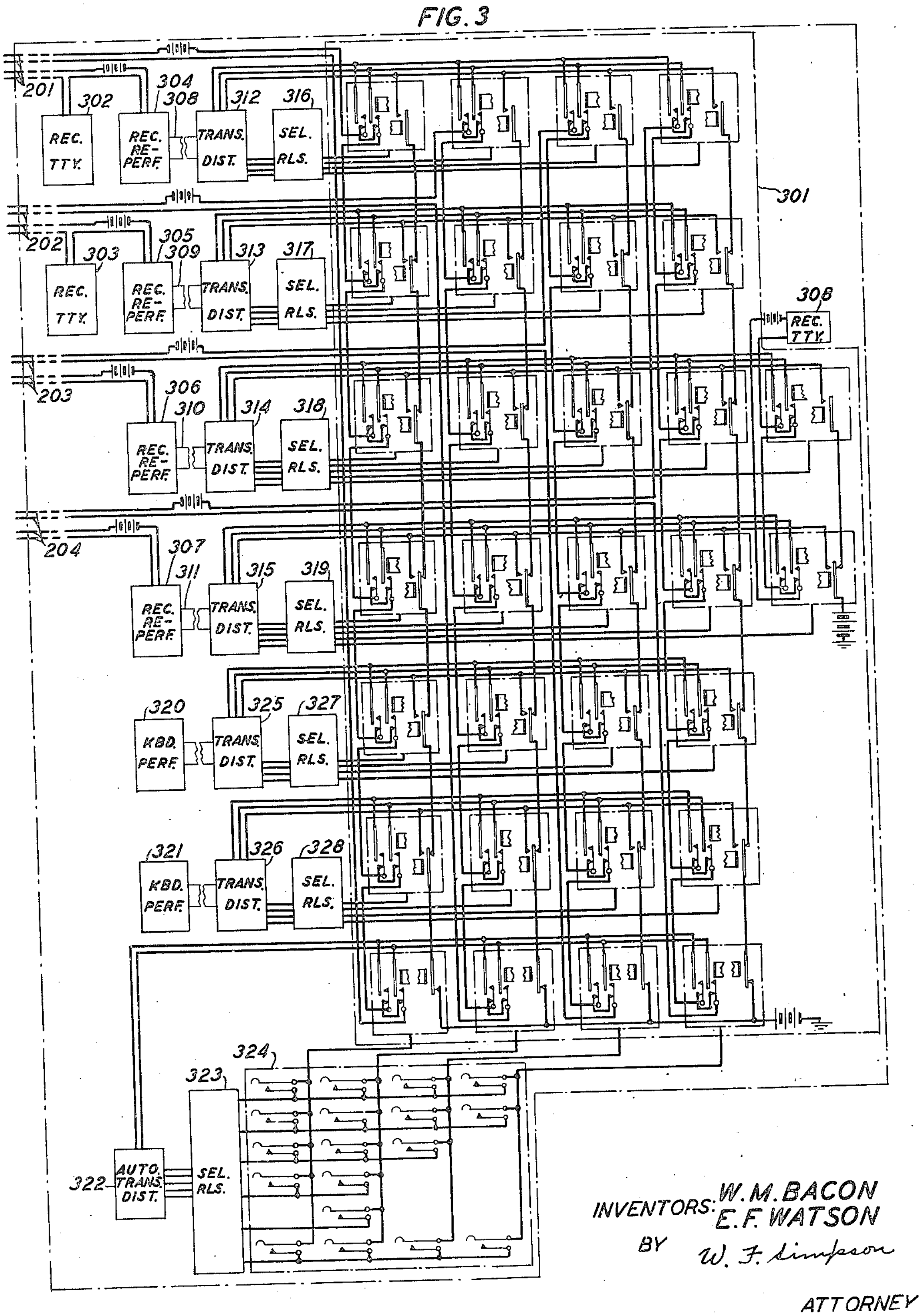

The details of an exemplary embodiment of the invention fulfilling the foregoing and other objects and including the foregoing features of this invention may be more readily understood from the following description, when read with reference to the attached drawing in which:

Fig. 1 illustrates the manner in which Figs. 2 and 3 are positioned;

Figs. 2 and 3 when positioned as shown in Fig. 1, show in a general way various stations and the equipment located at each and its manner of interconnection;

Fig. 4 shows the way Figs. 5 to 20 are to be arranged to form a typical system in accordance with this invention;

Figs. 5 to 20 when arranged as shown in Fig. 4 show the details of the various signaling, switching, and communication circuits of a typical communication system designed in accordance with this invention; and Figs. 21 to 24 show mechanical details of reperforating mechanism in accordance with this invention.

*General description of the system*

Referring now to the general arrangement of the system as shown in Figs. 2 and 3 when arranged as shown in Fig. 1, Fig. 2 shows a number of the outlying telegraph stations. As shown in this specific embodiment of the invention four party lines 201, 202, 203 and 204 extend to the central station shown in Fig. 3.

These lines are shown as comprising two separate and distinct telegraph channels or one-way lines. For example, party line 201 comprises a transmitting line or channel 205, and a receiving line or channel 206. Each of the other party lines similarly comprises a receiving channel and a transmitting channel.

Party line 201 extends to stations A, B, C and D. Each of these stations is provided with a keyboard teletypewriter, a keyboard transmitter and tape perforator, tape-controlled transmitter, a receiving or recording telegraph instrument which is preferably a teletypewriter, and a control selector and associated switching equipment.

The keyboard perforator and transmitter are represented at station A by a box 207, the tape-controlled transmitter is represented by the box 208, the receiving teletypewriter is represented by the box 209 and the controlling selector and associated switching apparatus by the box 210. The control selector 210 is connected to both the receiving line 205 and the transmitting line or channel 206. In addition, the receiving teletypewriter 209 is connected to this control selector as are transmitting distributor 208 and the keyboard transmitter 207. The tape from the keyboard perforator 207 is supplied to the tape-controlled transmitter 208. In addition, operation of the tape-controlled transmitter is controlled from the controlling selector and switching apparatus over line 211.

As shown at stations A, B, C and D all of this equipment is located at each of these stations and all function in a similar manner. Both the receiving channel 206 and the transmitting channel 205 are connected to the control selecting equipment at each of these stations.

Stations H, I and J are similar to stations A, B, C and D except that they are connected to the party line 202 extending to the central station. The party line 202 in addition to extending to stations H, I and J extends to station G at which the selector controlling and switching apparatus 212 is located. This selecting equipment is connected to both the transmitting channel and the receiving channel of party line 202 extending to the central switching station. In this case, however, no receiving or transmitting apparatus is located at station G. The transmitting and receiving apparatus are stations E and F which are located near to station G. Stations E and F are connected to and controlled by the control selector 212 at station G. The receiving teletypewriter at each of these stations is connected by means of a receiving telegraph loop to the control selector 212. The keyboard perforator and tape-controlled transmitters are likewise connected to this control selector over a transmitting loop and the operation of the tape-controlled transmitter is controlled from the control selector over an additional circuit extending from each of these stations E and F to the control equipment at station G.

In this case the control equipment 212 at station G is arranged to selectively connect the receiving apparatus at either or both station E or F to the receiving channel of party line 202 and to selectively connect the transmitting apparatus at either of these stations to the transmitting channel of the party line 202.

Similarly stations K, L and M are connected to the party line 203. In this case as in the case of stations E and F only one control selector is employed for these three stations since they are located relatively near to each other. In this case, however, the control equipment 213 is located at station K instead of at a separate and independent station. This control equipment works similar to 212 in that it selectively connects the receiving teletypewriter at one or more of these stations to the receiving channel of the party line 203 and the transmitting apparatus at any one of these stations to the transmitting channel of the party line 203. The stations N and O connected to party line 204 are quite similar to the stations K, L and M connected to party line 203 except in this case only two stations are connected to this party line. Consequently the control selector and switching equipment need only control the receiving and transmitting apparatus at these two stations.

Turning now to the equipment shown at the central station in Fig. 3, the receiving channels of each of the party lines 201, 202, 203 and 204 are connected to the switching apparatus comprising the switching relays within the box 301. The transmitting channel of the party lines 201 and 202 are connected to receiving teletypewriters 302 and 303 and the receiving reperforators 304 and 305 respectively. Transmitting channels of party lines 203 and 204 are connected to the receiving reperforators 306 and 307 respectively. In this case no receiving teletypewriter is provided. It is assumed that a substantial portion of the messages originating on party lines 201 and 202 is intended for the central switching station shown in Fig. 3. Consequently an individual receiving teletypewriter is provided for each of these lines at this station and is arranged to receive all of the messages originating on these lines intended for the central switching station. By providing these receiving teletypewriters individual to these lines a considerable saving in time may be effected since these messages need not be delayed while another machine or line is busy and the tape-controlled retransmitter is waiting for an idle line or receiving printer. In the case of lines 203 and 204 it is assumed that only a small percentage of the messages originating on these lines is intended for the central station shown in Fig. 3. Consequently the expense of a receiving teletypewriter individual to these lines is not justified. In this case the receiving teletypewriter 308 is provided which may be connected through the switching and relay equipment 301, to the receiving channels of either of these party lines to record the messages for the central station originating on these lines.

The signals arriving over the transmitting channels of the party lines 201 and 202 which are intended for other outlying stations and all of the signals arriving over the transmitting channels of party lines 203 and 204 actuate to the respective reperforators 304, 305, 306 and 307 which cause corresponding perforations to be produced in the respective tapes 308, 309, 310 and 311. From the reperforators these tapes pass through respective transmitter-distributors 312 through 315.

These transmitters in combination with their respective tapes are arranged to control selecting relays indicated within the boxes 316 through 319. These selecting relays in turn control the switching relays within the box 301 and cause any of these transmitting distributors to be connected to the receiving channels of the party lines 201, 202, 203 and 204. In addition to this equipment two keyboard perforators 320 and 321 are provided at the central station to enable the central station to transmit message signals over any of the receiving channels to any of the outlying subscribers' stations. The tape from these keyboard perforators passes through the respective transmitting distributors 325 and 326 and controls selecting relays 327 and 328 similar to the transmitting distributors and selecting relays associated with each of the party lines. In this manner the messages perforated in the tape by either of the keyboard perforators 320 and 321 may be transmitted to any of the outlying stations.

An automatic transmitter 322 and selecting relays 323 are also provided at the central station to enable an operator at this station to start the tape transmitters at any of the outlying stations. A number of buttons or switches located within the box 324 are associated with the selecting relays 323. One of these buttons is provided for each of the outlying tape-controlled transmitters at the outlying stations. When the operator presses any one of these buttons the corresponding transmitter at the outlying station is set into operation.

Assume that the operator at the central station presses a button for starting the tape-controlled transmitter at station A. If messages are at that time being transmitted over the receiving channel of the party line 201 to which station A is connected the automatic transmitter 322 and selecting relays 323 stop the transmitting distributor at the central station which is transmitting these impulses after the transmission of the code combination in the progress of transmission at the time the key was operated. The automatic transmitter 322 and selecting relays 323 then transmit signals over the receiving channel of the party line 201 to the control selecting equipment and each of the stations A, B, C and D connected to party line 201 for selectively initiating an outlying station into transmission. The selecting equipment at each of these stations responds to each of these switching impulses but the selecting equipment 210 at station A is the only one which causes its respective transmitting apparatus including the keyboard perforator 207 and the tape-controlled transmitter 208 to be connected to the transmitting channel. After this the automatic transmitter 322 and selecting relays 323 at the central station are disconnected from the receiving channel of party line 201 this causes the same transmitter which was previously transmitting over this party line to resume operation and transmit the remainder of the message, the transmission of which was interrupted.

Assume, for example, that when the operator operated this key the receiving apparatus at station C was receiving message signals being transmitted from the transmitter, distributor 314 at the central station. When the automatic transmitter 322 transmits the first switching information over the receiving channel of line 201 the selecting equipment at station C will at once function to disconnect the receiving equipment at this station and maintain this receiving equipment in a non-operative condition during the reception of the remainder of the switching information transmitted over the receiving channel of the party line. If the receiving equipment at any of the other stations is also connected to the receiving channel at this time it will be similarly disconnected and maintained in a non-operative condition during the reception of the remainder of the switching information. At the termination of the switching impulses the selector at each of these stations will reconnect the receiving apparatus which had previously been connected to the line to the receiving channel thus restoring the circuit to its previous condition. For example, assume that the receiving apparatus at station C was connected to the receiving channel of this line before the operator operated the key, upon the termination of the switching impulses this receiving equipment will be automatically reconnected to the receiving channel of the line 201 before the tape-controlled transmitter-distributor 314 is restarted thus insuring that none of the characters of the message are mutilated or dropped and that no additional characters are added to the message.

It should be noted that during the time the automatic transmitter 322 is transmitting switching impulses the switching relays which connected the transmitting distributor 314 to the receiving channel of party line 201 have not been disturbed. Consequently at the termination of the switching impulses none of these receiving relays need be reoperated.

It is also to be noted that none of the transmitting apparatus at any of the outlying stations is connected to the transmitting channel unless the central office operator operates one of the control keys at the central office. In this way the accidental operation of any of the transmitting apparatus of any of the other stations is prevented from interfering with the message being transmitted over the party line.

Arrangements are also provided between each of the reperforators 304 and the transmitting distributor 312 and reperforator 305 and transmitting distributor 313, reperforator 306 and transmitting distributor 314 and reperforator 307 and transmitting distributor 315 for automatically perforating and advancing tape through the reperforator upon the completion of any message when the supply of tape between the reperforator and transmitting distributor is reduced to a predetermined minimum provided no additional signals have been received and perforated in the tape. The reperforator is arranged to perforate a series of letters signals, i. e., a signal combination in which all the impulses are marking in the tape. These signals are represented by perforations in all of the positions 1 through 5 in the tape. After sufficient tape has been advanced through the reperforating equipment to insure that the end of the preceding message has been or may be transmitted by the tape-controlled transmitting distributor 312, for example, the equipment is arranged to light a lamp before an operator whereupon the operator will operate a key or button to stop the automatic perforations of the tape. The tape-controlled transmitter, however, will continue to advance the tape through it without transmitting these additional perforations until the supply of tape between it and the reperforator is again reduced to a predetermined minimum at which time the tape-controlled transmitter stops.

As pointed out above the transmitting and receiving channels on the party lines extending from the central office to the outlying subscribers' stations may include any type of telegraph channel or any combinations of different telegraph channels together with suitable repeating equipment including regenerative repeaters such as is usually employed for transmitting telegraph signaling impulses over and between the respective types of telegraph channels.

The detailed operation of a specific embodiment of this invention may be more fully understood by reference to Figs. 5 through 20, inclusive, of the drawing when arranged as shown in Fig. 4.

*Normal condition of the system*

First assume that the system has been fully installed and tested but that power has been removed from the system both at the central station and at each of the subscribers' stations.

Assume further that when the system is put into operation power is applied to the system at the central exchange and also at the subscribers' stations. Furthermore, assume that the power supply is connected to the driving motors for the permutation selecting and switching apparatus at the subscribers' stations. The power will also be connected to the motors driving the keyboard perforator, the tape transmitter and also the receiving teletypewriter at each of the subscribers' stations. The motors for the keyboard perforator and keyboard transmitter and also for the receiving teletypewriter and the permutation controlled selector have not been shown. It is to be understood, however, that a motor or motors are provided for driving this equipment as is well understood in the telegraph art and that the motor or motors are connected to a source of power and are continuously operating when the system is energized.

The driving motors for the receiver teletypewriters and reperforators at the central station have not been shown. These devices are provided with driving motors as is well understood in the telegraph art and that these motors are connected to a source of power and that they are continuously rotating. In addition, the motors driving the tape-controlled transmitters at the central station are also connected to a source of power and are tending to drive the tape-controlled transmitters.

When power is applied to the system at the central office relay 1021 operates in a circuit from battery through the break contacts of relay 1006, the winding of relay 1021 to ground through the left-hand break contacts of relay 1005. Relay 1021 in operating completes a locking circuit for maintaining itself operated from battery through break contacts of relay 1006, winding of relay 1021 to ground through right-hand operated contacts of relay 1021.

If there is a minimum supply of tape 1001 between the reperforator 1002 and the tape-controlled transmitter or retransmitter 1101 so that the contacts 1102 are open when power is applied to the system at the central station, relay 1103 will not operate. Consequently, a circuit is completed for the operation of relay 1003 from ground through the left-hand break contacts of relay 1103, the winding of relay 1003, the right-hand break contacts of relay 1004, the left-hand operated contacts of relay 1021 to battery through the left-hand break contacts of relay 1006. The operation of relay 1003 completes a locking circuit from ground through its right-hand operated contacts and winding, the right-hand break contacts of relay 1004 to battery through the left-hand operated contacts of relay 1021 and break contacts of relay 1006. The operation of relay 1003 also completes an obvious circuit for the operation of relay 1007 and the tape feed-out magnet 1008.

The operation of the tape feed-out magnet 1008 causes the reperforator 1002 to operate and perforate an additional supply of tape with holes perforated in all of the positions 1 to 5, inclusive.

Figures 21, 22:
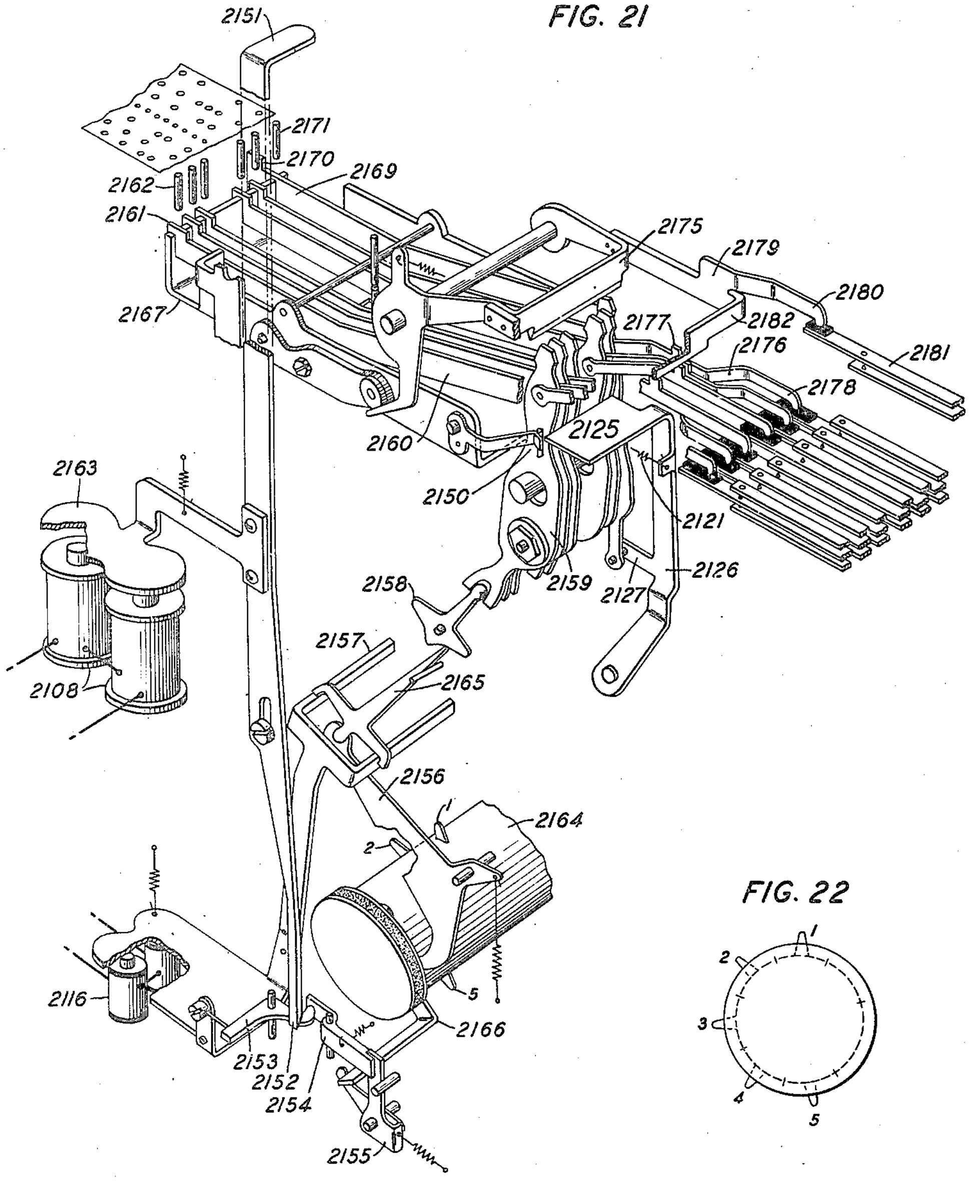
Figure 24:
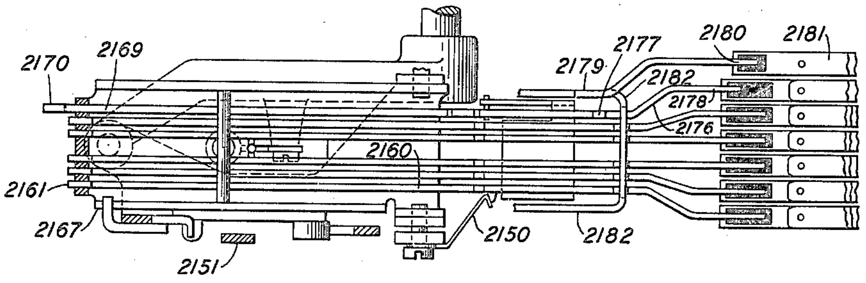
Figure 23:
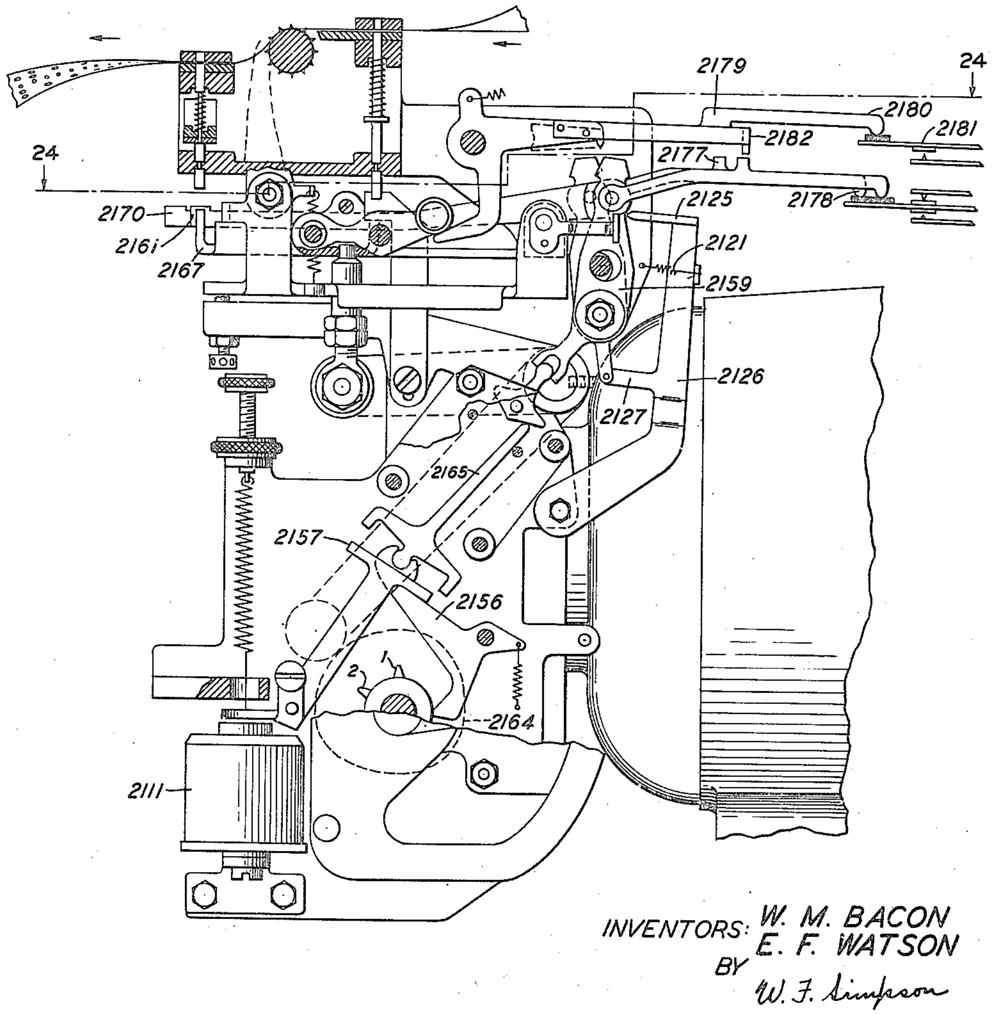

The manner in which the tape feed-out magnet 1008 causes the tape reperforator 1002 to perforate tape may be more fully understood by reference to Fig. 21. Here magnet 2108 corresponds to the tape feed-out magnet 1008 of the reperforator 1002 and the perforator magnet 2116 corresponds to the perforator magnet 1016 of the perforator 1002.

When the magnet 2108 is operated, it attracts its armature 2163 and causes the tape feed-out lever 2151 to be depressed or moved downward, as shown in Fig. 21. When the tape feed-out lever 2151 is moved downward, the bevelled portion 2152 of the lower end of this lever engages member 2153 and causes it to rotate in a counter-clockwise direction, as viewed in Fig. 21. This, in turn, causes member 2154 to rotate in a clockwise direction and disengage the bell crank member 2155, permitting this member to rotate in a counter-clockwise direction. The rotation of member 2155 in a counter-clockwise direction releases the stop arm 2166 of the cam barrel 2164 and permits it to rotate.

At this time the receiving magnet 1016 of the reperforator 1002 will be held in its marking position. Since the receiving magnet 2116 of Fig. 21 corresponds to receiving magnet 1016 of the reperforator 1002, receiving magnet 2116 will also be maintained in its marking position during the rotation of the cam barrel 2164. As the cam barrel 2164 rotates, it operates the five levers 2156 by means of cams 1 to 5 (see Figs. 21 and 22) and causes the armature extension 2157 to engage the sword levers 2165 and move them to the position shown. It is to be understood that there are five levers like lever 2156 and five sword levers like 2165 which are operated in succession by the projections 1 to 5 on the cam barrel 2164. Each one of these sword levers will be moved to the position corresponding to the position of lever 2165 which corresponds to the reception of a marking impulse by the receiving magnet 2116 at this time. All five of the sword levers 2165 will be positioned in their clockwise positions as viewed in Fig. 21 and will cause their corresponding T levers 2158 to be operated in a counter-clockwise direction. These T levers, in turn, cause the connecting links or levers 2159 to be rotated in a clockwise direction. The bars 2160 are connected to these connecting links 2159 and are caused to move to their right-hand positions. This causes the projections 2161 on the ends of these levers to register with the punch pins 2162. After these levers 2160 have been positioned, member 2167 is caused to move upward and engage the punch pins 2162 and cause them to perforate holes in the tape.

These reperforators at the central office are also all provided with a special set of contacts which are actuated in accordance with the signals received and the holes perforated in the tape. The manner in which the contacts are actuated by the reperforator is clearly shown in Figs. 21, 23 and 24. Each of the members 2159 or each of the members 2160 has connected to it an extension or a separate member 2176. These members 2176 are provided with a raised portion 2177 and a contact actuating portion 2178. The contact actuating portion rests upon or over an insulated portion of the contact springs in such a manner as to operate the contacts when this extension or member 2176 is operated to its right-hand position. The locking bail 2175 which locks members 2159 is also provided with an extension 2179 having a contact operating portion 2180 which cooperates with contacts 2181 and operates these contacts every time the locking bail 2175 is operated. This locking bail operates once during every code combination and locks all the members 2159 during the punching of the character that has just been selected. During this punching cycle the first four impulses of the next combination are received and set upon the swords under spring tension. At the end of the reception of the fourth pulse the locking bail raises and releases the members 2159. The first four immediately assume the positions that the incoming selection has indicated and the fifth pulse is then selected with the mechanism unlocked. The No. 5 member 2159 tends, due to the pressure of bail 2125, to move to the spacing position if during the last selection it had been marking and if the first four impulses are spacing. If the present selection intends to keep the fifth in the marking position a false selection may be recorded due to this action of bail 2125 and the selector mechanism. A detent 2150 is provided on the fifth member to make the action of the selecting mechanism more positive and prevent this improper operation of bail 2125. During the operation of the locking bail 2175 the common contacts 2181 are operated. The extension 2179 is provided with a bail 2182 which cooperates with the raised portion 2177 of the contact actuating members 2176. When the members 2159 are positioned in their marking positions they move the contact actuating members 2176 to their right-hand position. They also move members 2160 to their right-hand position where extensions 2161 will engage the punched pins 2162 when member 2167 is raised to perforate the tape. When members 2159 move the contact actuating member 2176 to their marking position the raised portion 2177 will cooperate with the bail 2182, when the locking member 2175 moves downward and locks the members 2159. When the locking member 2175 moves downward, bail 2182 also moves downward and engages the raised portion 2177 of those members 2176 which have been moved to their marking positions and causes these members to actuate their associated contacts. Thus if a code combination comprises marking first, third, fifth impulses, the first, third and fifth members, members 2159 will be moved to their marking positions. This will in turn move the first, third and fifth members 2160 to their marking positions so that a hole will be perforated in the tape in the first, third and fifth positions. In addition the first, third and fifth members 2176 will also be moved to their marking positions so that the first, third and fifth contacts will be momentarily operated at this time. Common contacts 2181 will also close momentarily at this time. These contacts are shown within the box 1002 of the reperforator at the central station and serve to control certain relay circuits as will be described hereinafter.

The operation of the contacts 1 to 5 and the common contact 1019 completes a circuit for the operation of relay 1005 from battery through the left-hand winding of relay 1005 operated contacts 1 through 4, common contacts 1019, right-hand break contacts of relays 1005 and 1013, break contacts 1020 to ground through unoperated No. 6 contacts of the reperforator. Relay 1005 in operating completes a locking circuit for maintaining itself operated from battery through its right-hand winding and right-hand operated contacts of relay 1005, right-hand break contacts of relay 1013, normally closed contacts 1020 to ground through the unoperated No. 6 contacts of reperforator 1002. The operation of relay 1005 interrupts the operating circuit of relay 1021. Relay 1021, however, is maintained operated by current flowing through its locking circuit as described above.

All the details of this reperforating mechanism have not been shown in Figs. 21, 22, 23 and 24. It is to be understood, however, that it is similar to well-known reperforating mechanisms and operates in a manner similar to the manner of operation of these well-known reperforator mechanisms. The details of these mechanisms and their manner of operation are described more fully in U. S. Patents 2,005,748, granted June 25, 1935, to Larson and 2,042,788, granted June 2, 1936, to Krum, which patents are hereby made a part of this application as if fully included herein. Only sufficient details of these well-known mechanisms have been shown in this application to show the manner in which they are modified to cooperate with the other elements of the present invention.

As long as the lever 2151 is maintained depressed by the operation of magnet 2108, its end 2152 will hold member 2153 rotated and this, in turn, holds member 2154 rotated so that it does not engage the bell crank 2155. Consequently, the cam barrel 2164 continues to rotate and for each rotation causes five holes to be perforated in the tape in the positions 1 through 5, inclusive.

When the relay 1003 completed the operating circuit of relay 1007, this relay started to operate. Relay 1007, however, is a slow-operating relay and requires approximately fifteen seconds, in the preferred embodiment of this invention, to operate. At the end of this interval of approximately fifteen seconds, relay 1007 operates and completes an obvious circuit for lighting the tape feed-out lamps 1009 which are located before an operator. The operator, upon observing that these lamps are lighted, will momentarily operate stop key 1010 which completes a circuit for the operation of relay 1004 from ground through the contacts of stop key 1010, the winding of relay 1004 to battery through the left-hand operated contacts of relay 1021 and break contact of relay 1006. Relay 1004, in operating, completes a locking circuit from ground through its left-hand operated contacts, winding of relay 1004 to battery through the left-hand operated contacts of relay 1021 and break contact of relay 1006. Relay 1004, in operating, interrupts the locking circuit of relay 1003, thus permitting this relay to release. The release of relay 1003 interrupts the operating circuit of the tape feed-out magnet 1008 which, in turn, allows the tape feed-out lever to be restored to its normal position so that the reperforating mechanism will stop at the end of its cycle of operation then in progress. The release of relay 1003 also interrupts the operating circuit of relay 1007 which releases and, in turn, extinguishes the tape feed-out lamp 1009.

When the reperforator 1002 perforates tape, as described above, this additional supply of tape between the reperforator 1002 and the tape-controlled transmitter 1101 is sufficient to cause tape-controlled contacts 1102 to close and complete an obvious circuit for the operation of relay 1103. The operation of relay 1103 completes a circuit for the operation of the start magnet 1104 from ground through the closed switch 1105, winding of the start magnet 1104, right-hand operated contacts of relay 1103, lower outer operated contacts of relay 1111, which is operated through an obvious circuit through the right-hand break contacts of relays 1209, 1210, 1211 and 1212, to battery through the left-hand break contacts of relays 1106, 1107, 1108, 1109 and 1110. The operation of the start magnet 1104 of the tape-controlled transmitter 1101 will release the brush arm 1112 and permit it to rotate. This causes the fingers associated with contacts 1105 to rise to feel the holes in the perforated tape and cause the respective contacts to close when a perforation passes over the respective fingers.

At this time there will usually be perforations over at least two of the fingers controlling contacts 1 to 5 so that at least two of these contacts will be closed. This will, in turn, complete a circuit for the operation of two of the relays 1106 to 1110 from battery through the upper winding of relay 1113, the left-hand windings of at least two relays 1106 to 1110, the upper operated contacts of relay 1111, operated tape-controlled contacts 1 to 5 to ground through the lower inner operated contacts of relay 1111.

Relay 1113 is a marginal relay and is arranged so that its armature will operate to its left-hand position when more than one of the relays 1106 to 1110 operate. The current flowing through the lower winding of relay 1113 in an obvious circuit tends to operate the armature of this relay to its right-hand position. The current flowing through the upper winding of this relay tends to operate its armature to its left-hand position.

When a circuit is completed through the left-hand windings of more than one of the relays 1106 to 1110, the current flowing through the upper winding of relay 1113 is of a sufficient magnitude to overcome the effect of the current flowing through the lower winding of this relay and causes its armature to move to its left-hand position.

Figure 11:
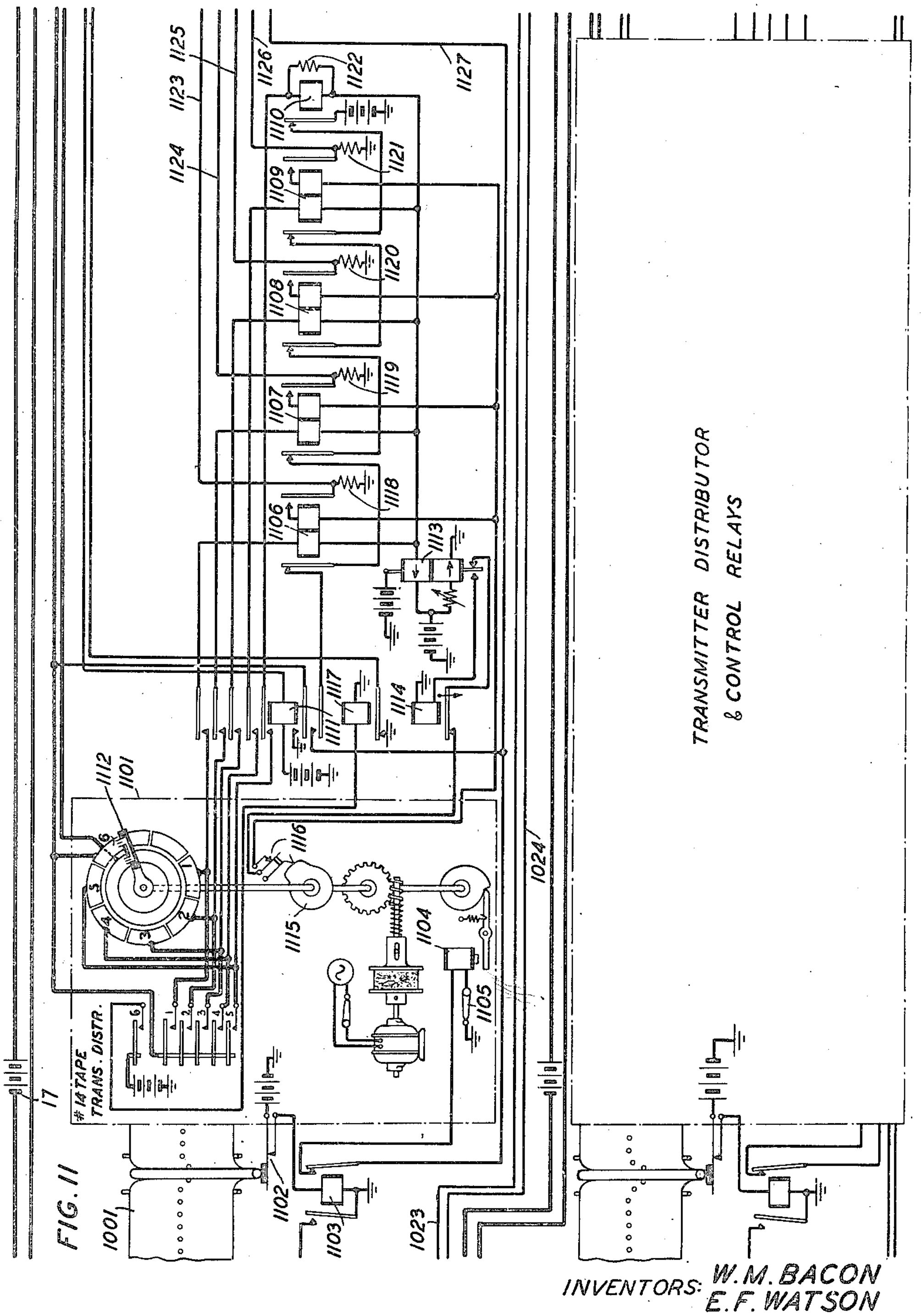
Figure 12:
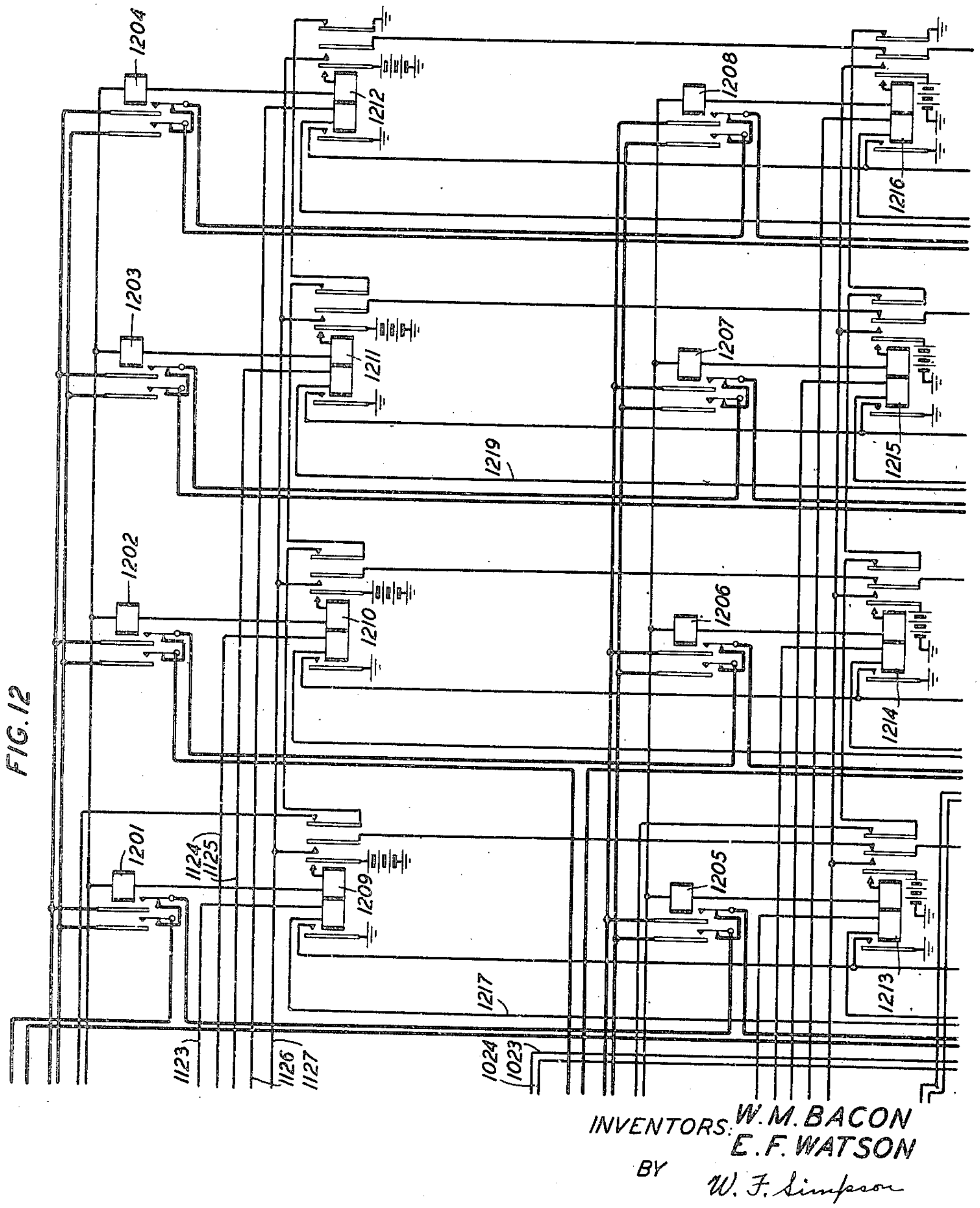
Figure 13:
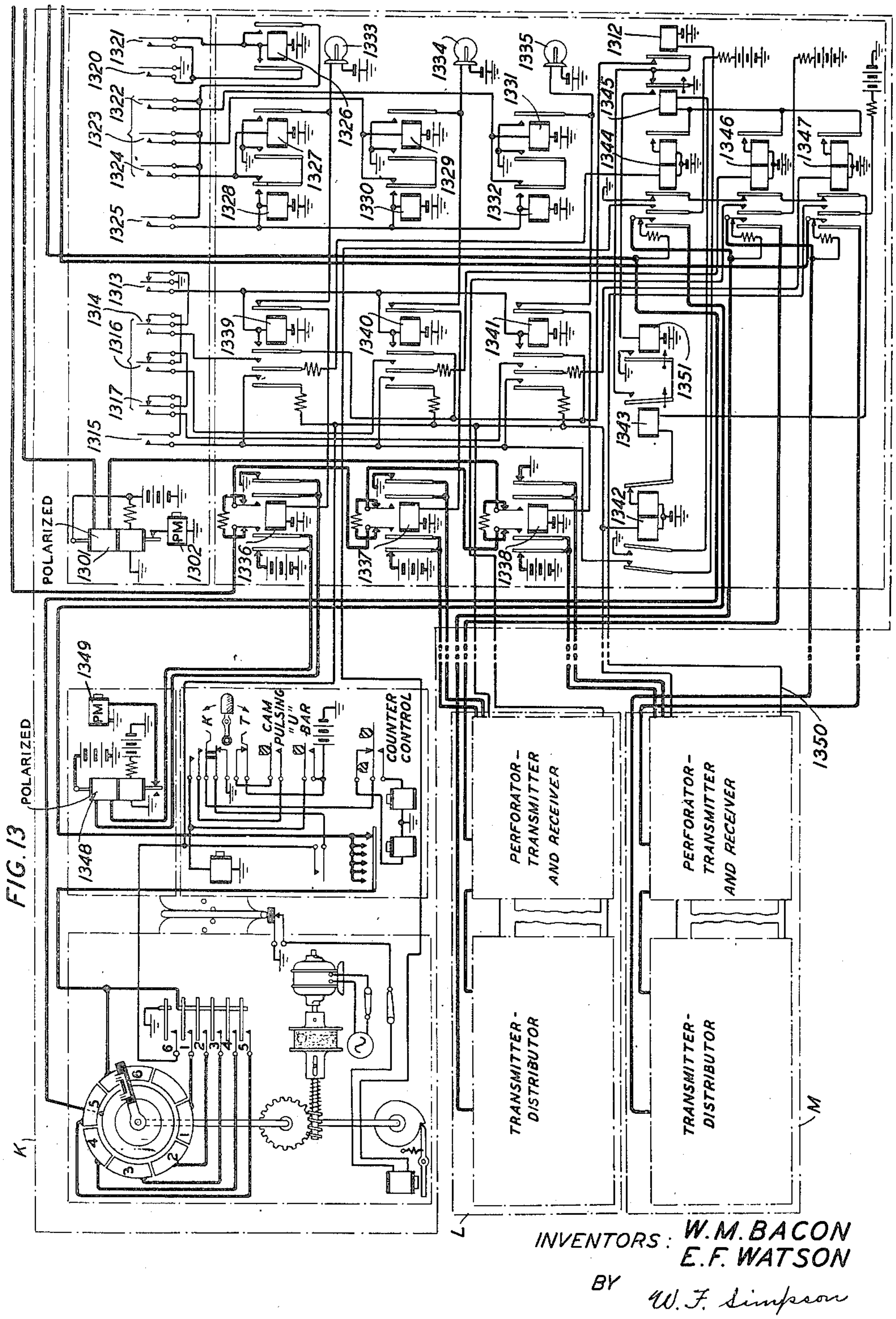
Figure 14:
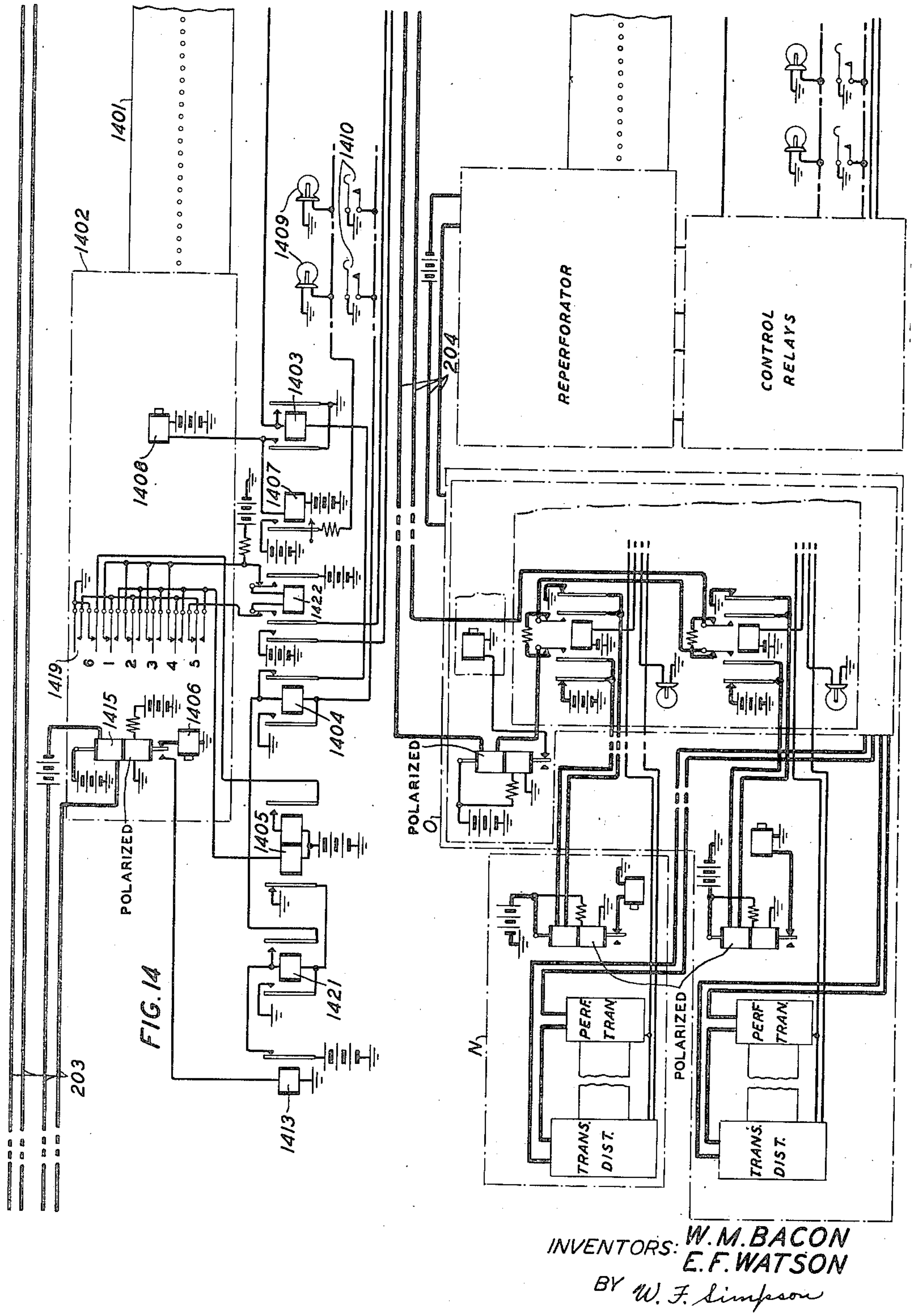
Figure 15:
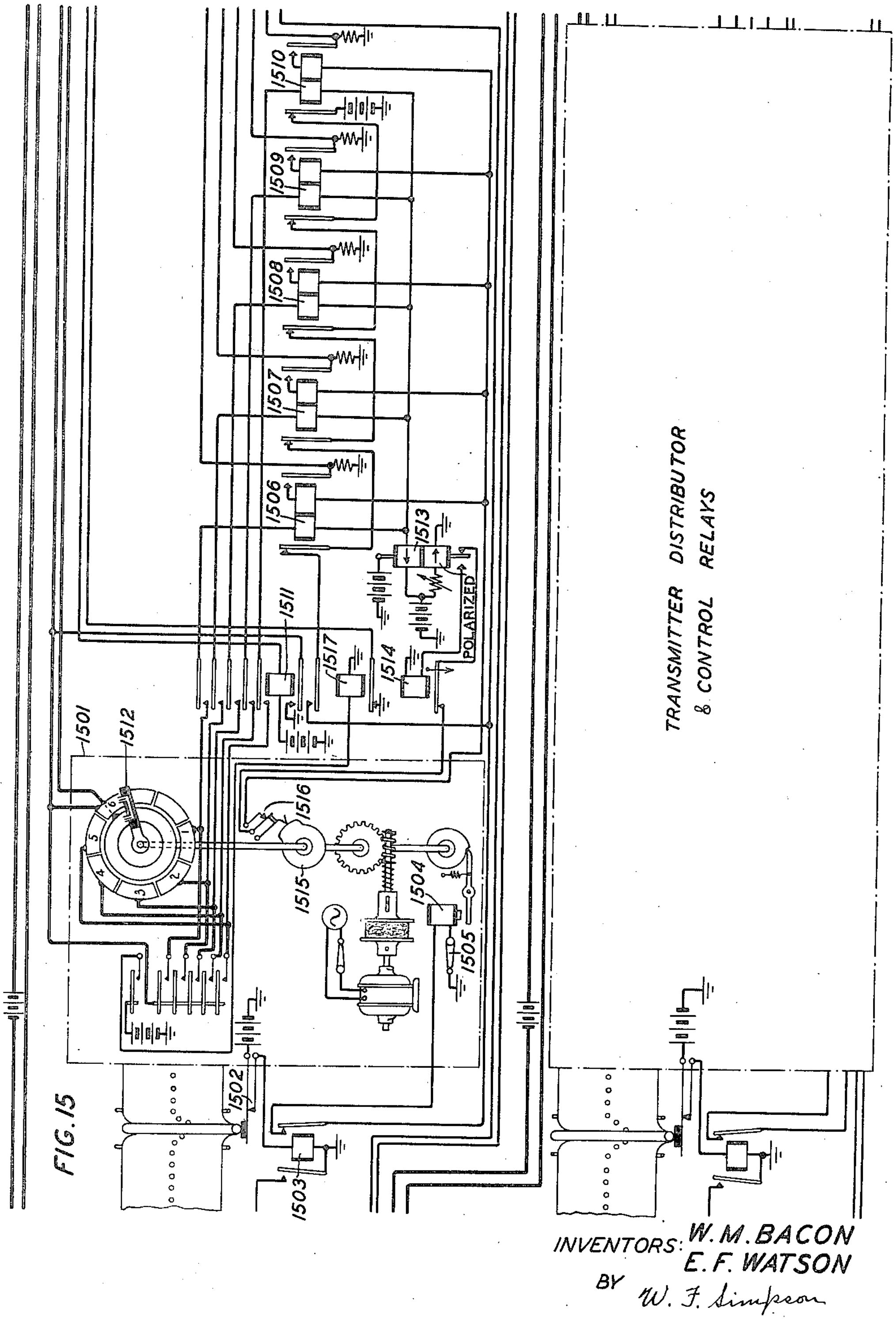
Figure 16:
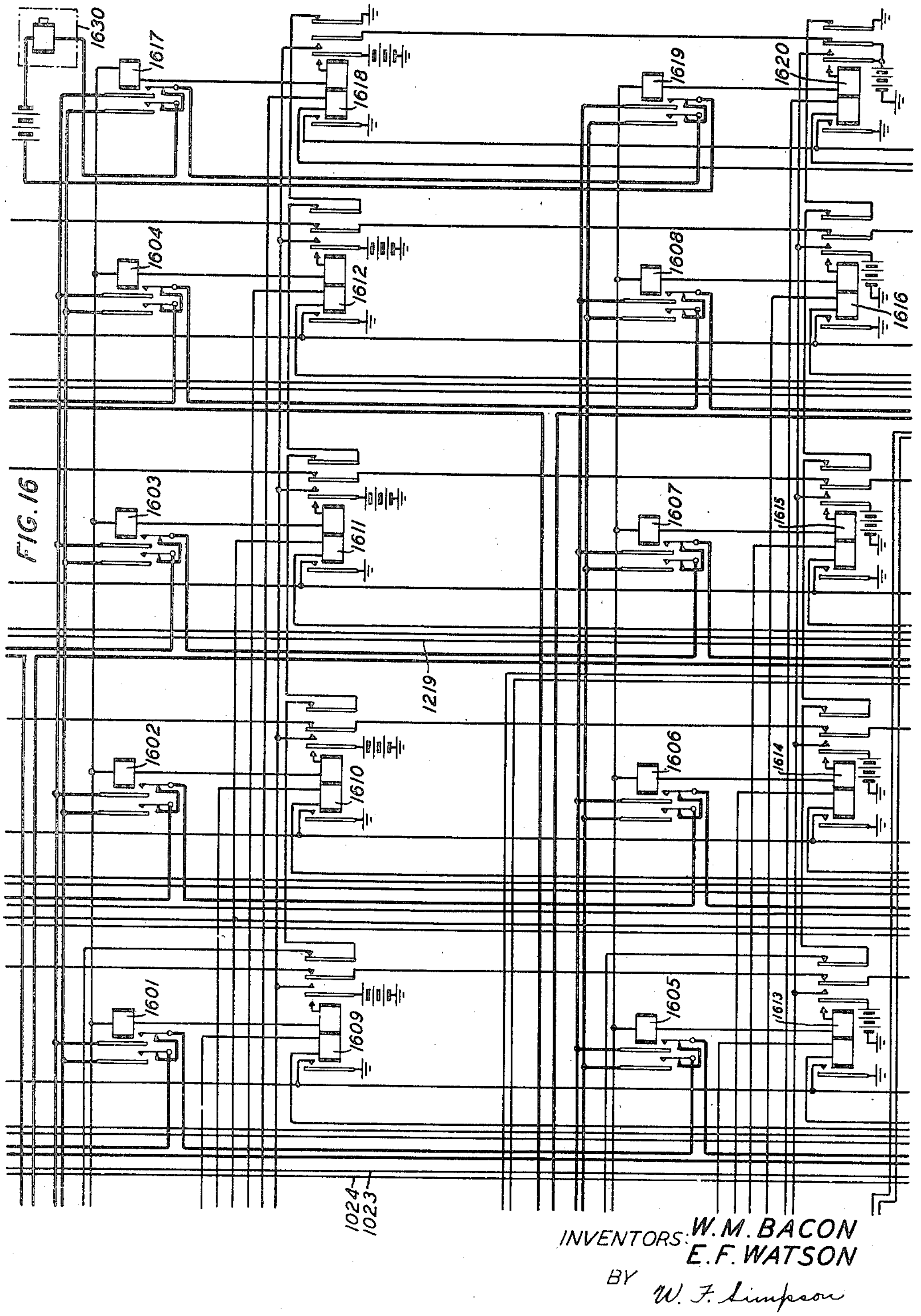

It should be noted that an additional resistance 1122 is connected in parallel with the winding of relay 1110. This additional resistance is provided in the switching equipment associated with transmitting distributor 1101 to cause relay 1113 to operate even though only relay 1110 operates. This is because the circuit arrangement shown in Fig. 11 is arranged to respond to only four switching code combinations instead of five. In case it is desired to arrange the circuit so that it will respond to all five of the switching combinations it will be arranged as the circuit shown in Fig. 15. In case it is desired to arrange the circuit to respond to less than four switching combinations a relay and resistance, similar to relay 1110 and resistance 1122, are substituted for each of the relays 1106 through 1109 whose corresponding selecting code combinations it is desired to eliminate.

When the armature of relay 1113 operates to its left-hand position, it completes an obvious circuit for the operation of relay 1114. The operation of relay 1114 interrupts the locking circuit of any of the relays 1106 through 1110 which may be operated at this time.

Then, as the brush arm 1112 completes the rotation of one revolution, the tape-controlled contacts are opened, thus permitting relays 1106 to 1109 to release. This, in turn, causes relay 1113 to be operated to its right-hand position when it interrupts the circuit of the winding of relay 1114. Relay 1114, however, is slow in releasing so as to provide sufficient time to insure that relays 1106 to 1110 have all released before relay 1114 releases and prepares a locking circuit for these relays. When relays 1106 to 1110 all release, the circuit is again completed for the operation of the start magnet 1104, as described above.

In case none of the contacts 1 to 5 closes during the revolution of brush arm 1112, the relays remain in the position described above and maintain the start magnet 1104 operated, thus permitting the brush arm 1112 to make another revolution in the same manner as if perforations in the tape had caused two or more of the tape-controlled contacts 1 to 5 to close.

The above-described operation of the tape-controlled transmitter 1101 and its associated relays is thus repeated until there is one, and only one, perforation in the tape over the pins or fingers controlling the tape-controlling contacts 1 to 5, or until the supply of tape 1001 between the reperforator 1002 and the tape-controlled transmitter 1101 is reduced sufficiently to cause contacts 1102 to open.

In case contacts 1102 open, they interrupt the operating circuit of relay 1103 which, in turn, releases and interrupts the operating circuit of the start magnet 1104. At the end of the cycle of operation of the tape-controlled transmitter 1101 then in progress, this transmitter will come to rest. The release of relay 1103 at this time does not cause the reoperation of relay 1003 because its operating circuit is now interrupted at the right-hand operated contacts of relay 1004.

The circuits of the reperforator 1002 and retransmitter 1101 remain in this condition until some messages are received, as will be explained hereinafter.

If there is a sufficient supply of tape 1001 between the reperforator 1002 and the tape-controlled retransmitter 1101 when the power is applied to the equipment at the central office, the tape-controlled contacts 1102 will be closed and complete an obvious circuit for the operation of relay 1103. The operation of relay 1103 will cause the operation of the tape-controlled transmitter 1101, as described above, until the supply of tape is sufficiently reduced to cause contacts 1102 to open. Thereafter the circuit will operate as described above when power is applied to the system when the contacts 1102 are opened.

The reperforators and tape-controlled transmitters associated with the lines 202, 203, and 204 operate in the same manner as the perforator 1102 and transmitter-distributor 1101 associated with the party line 201. The transmitter-distributor 1701 operates in a similar manner to the transmitter 1101, as described above, until the supply of tape between the keyboard perforator 1703 and the transmitter-distributor 1701 becomes reduced to such a value that the contacts 1702 open at which time this transmitter comes to rest. It remains at rest until additional tape is perforated by the operation of the keyboard perforator 1703.

When power is applied to equipment at the central exchange, a circuit is completed for the operation of relay 1926 from battery 1913 through closed contacts 1914, winding of relay 1926 to ground through the left-hand inner break contacts of relay 1907. A circuit is also completed for the operation of relay 1928 from battery 1913, closed contacts 1914, right-hand inner break contacts of relay 1926 to ground through the left-hand break contacts and winding of relay 1928. The operation of relay 1926 completes a locking circuit for maintaining itself operated from ground through its left-hand operated contacts and winding to battery 1913 through contacts 1914.

The operation of relay 1926 interrupts both the operating and locking circuits of relay 1928, thus causing this relay to immediately release if it operates before relay 1926 operates. Thereafter the relays of the automatic transmitter shown in Fig. 19 remain in the position shown until the operation of this circuit is initiated by the operation as described hereinafter.

*Subscriber perforates messages in tape*

In addition to starting the motors and applying power to the other equipment at their respective stations, the subscribers will perforate tape in accordance with the messages to be transmitted. Preceding the perforations in the tape in representing messages to be transmitted, the subscribers will perforate the tape in accordance with certain switching information depending upon the station to which he desires to transmit the message.

Generally, the subscriber will first perforate two letters signals in the tape, then a blank signal and then a signal combination having a single marking impulse. The subscriber will then perforate a figures combination in the tape after which he will perforate at least one combination depending upon the station to which the message is to be transmitted, followed by a letters signal. The function of the signal combination having a single marking impulse is to select the line extending from the central office over which the subsequent message will be transmitted and the "one combination depending upon the station to which the message is to be transmitted" functions to determine the station upon said line which is to record the message. Each or any of these signals in the series may be repeated one or more times in order to insure that the system and apparatus will receive and respond to the switching signals. The subscriber will then perforate the tape in accordance with the message to be transmitted. At the end of the message the subscriber will perforate several signal combinations to disconnect the distant station. If the subscriber has a message for another station, he will then similarly perforate some additional tape, with the exception that only a single letters signal need be placed between the disconnect signal and the blank signal at the beginning of the next message. After the subscriber has perforated tape in accordance with all the messages to be transmitted at any given time, the subscriber will perforate a blank combination in the tape, followed by a K. This is then followed by a special perforation in the tape, the K and the special perforation repeated. The purpose of these various combinations perforated in the tape will be described hereinafter.

Figure 5:
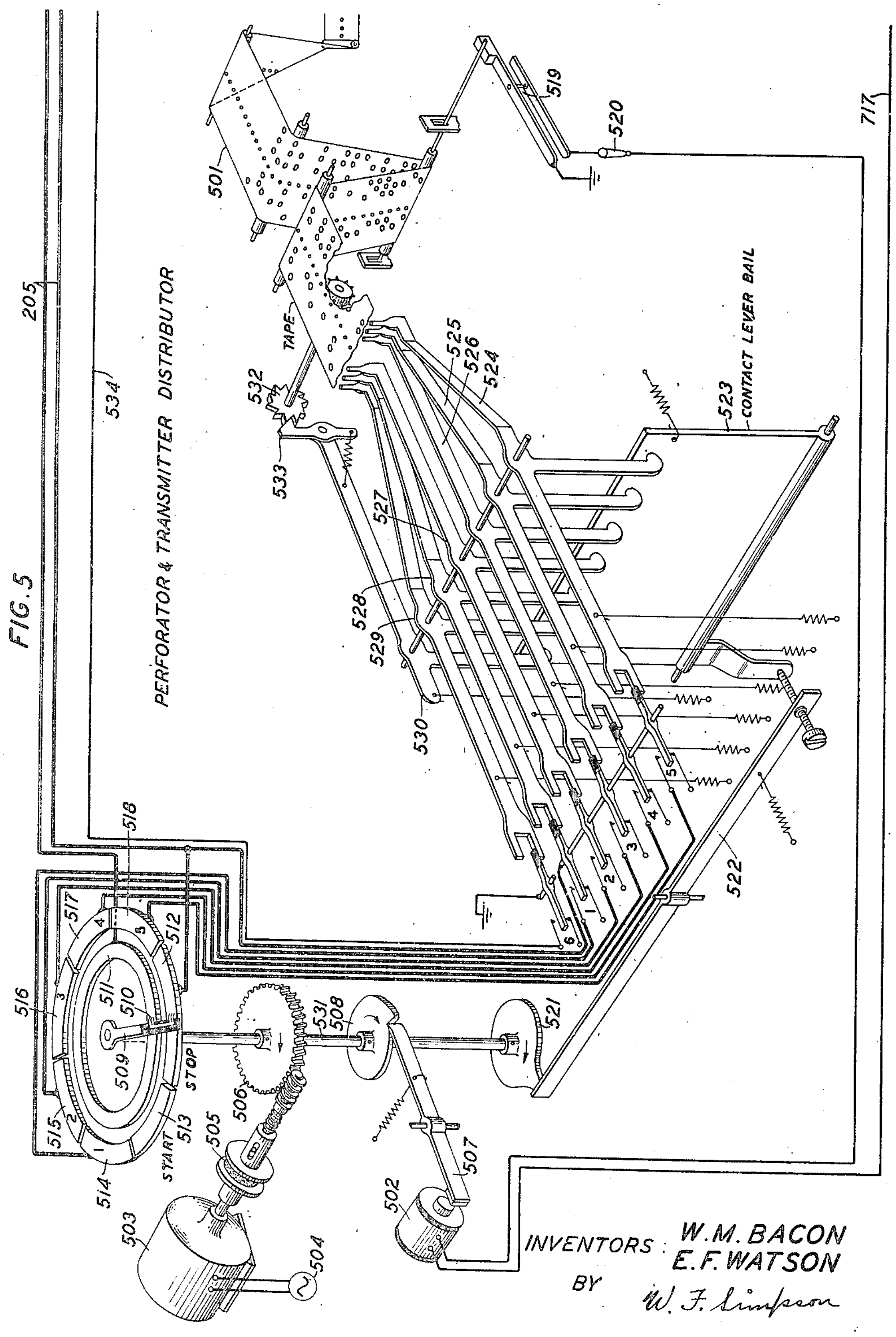
Figure 6:
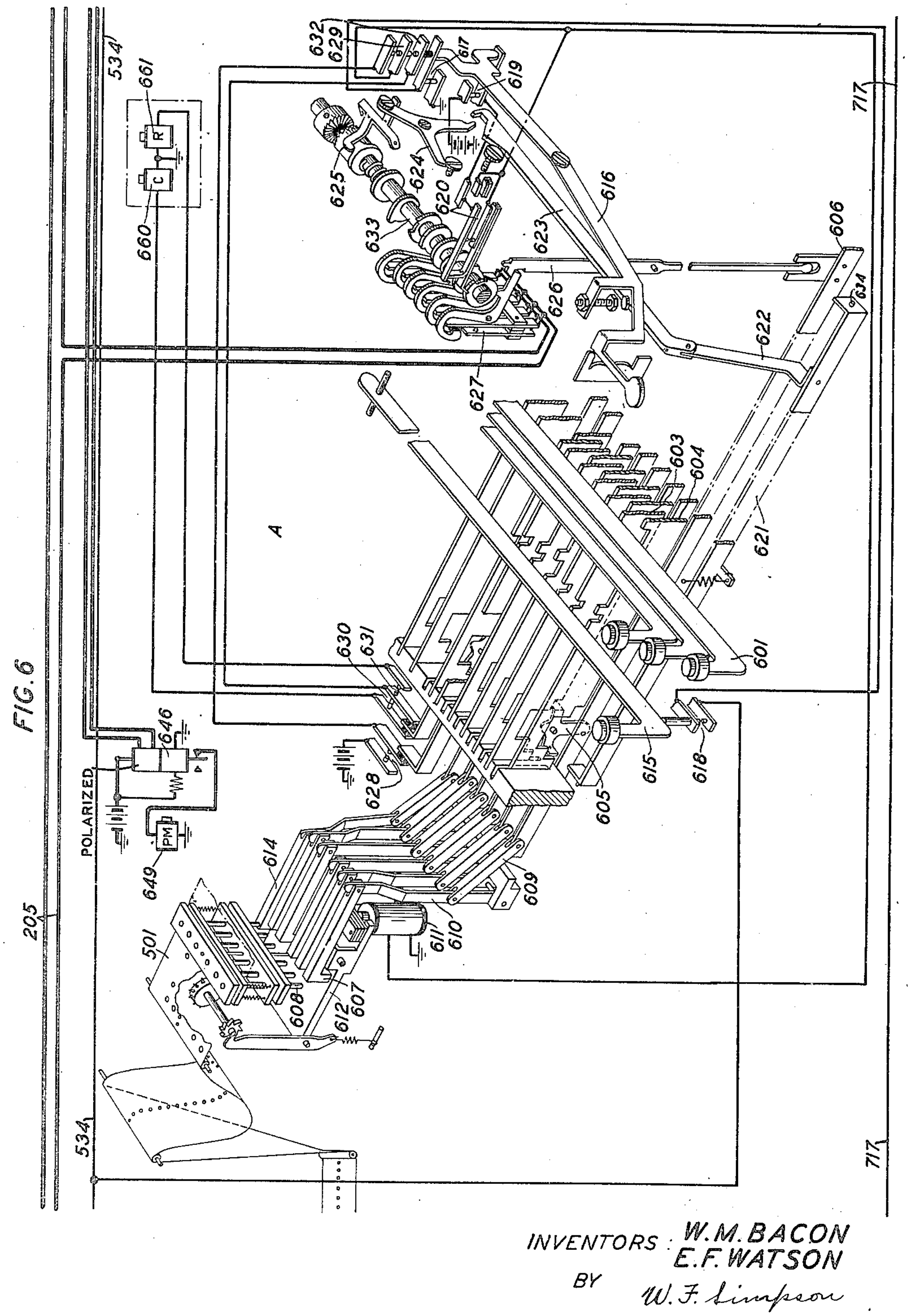
Figure 7:
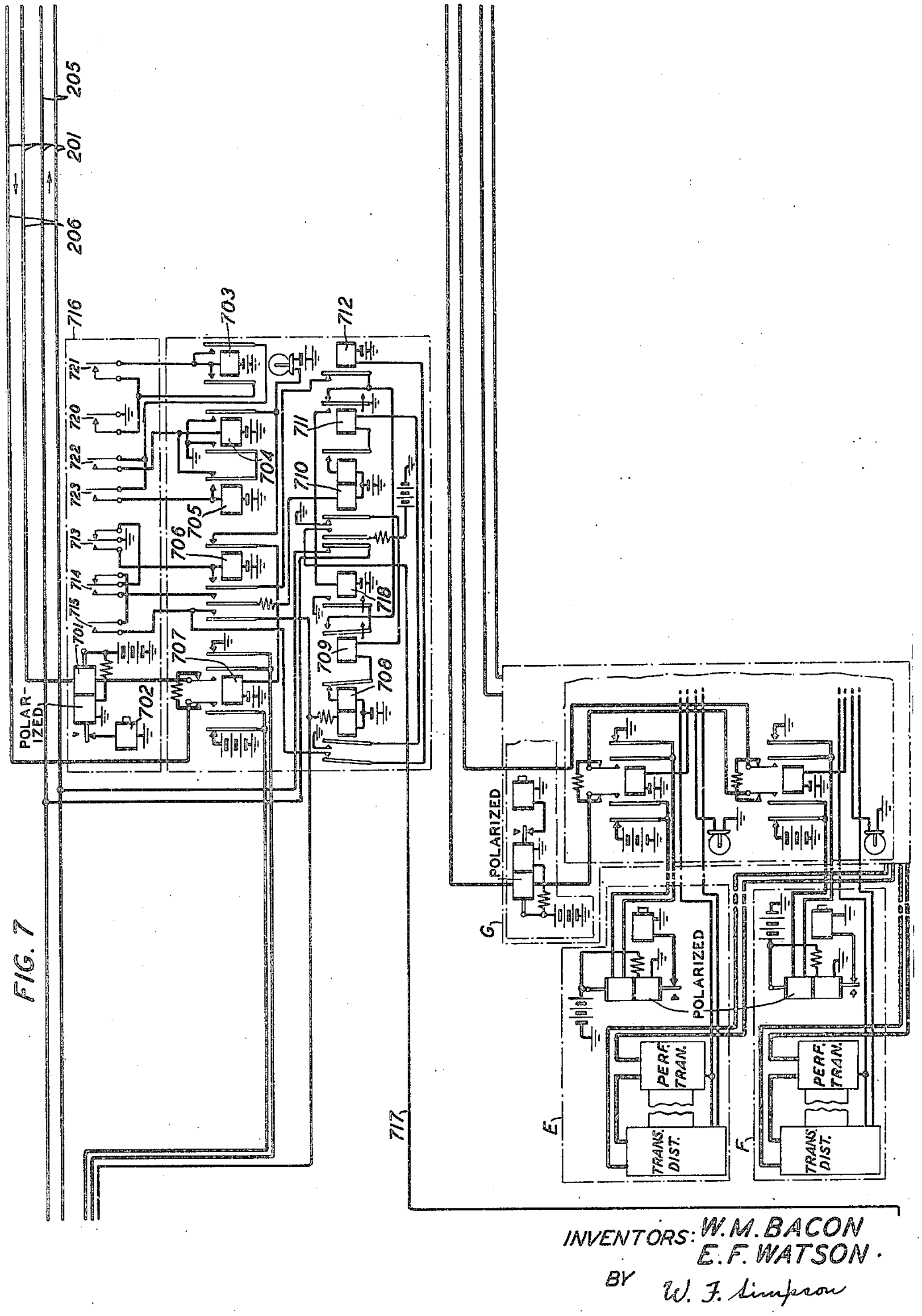

The subscriber will perforate the tape by means of a keyboard perforator, such as shown in schematic form in Fig. 6. The equipment shown in Figs. 5 and 6 and the upper part of Fig. 7 is all located at the subscriber's station A. This equipment is shown in some detail in order that the modifications of this apparatus in accordance with this invention may be fully understood. It is to be understood that similar equipment is located at each of the other outlying or subscribers' stations. It has not, however, been shown in the same detail as the showing of station A. The boxes indicated at the other stations comprise the apparatus similar to the apparatus shown in Figs. 5, 6, and the upper part of Fig. 7.

For a more detailed description of the perforating and transmitting equipment at the subscribers' stations, reference is made to the following patents, the disclosures of which are hereby made a part of this specification as if fully included herein: 1,965,572, Burcky et al., July 10, 1934; 1,965,602, Lake, July 10, 1934; and 1,969,891, Lake et al., August 14, 1934.

Briefly, the subscriber perforates the tape by operating keys similar to key 601 of a keyboard similar to a typewriter or teletypewriter keyboard. A number of pairs of bars pass beneath all of the keys of the keyboard and have notches cut in their top edge which cooperate with these keys so that when any key is depressed it causes one or the other bar of each pair of bars to be depressed. For example, when key 601 is depressed it causes bar 603 to be depressed and permits bar 604 to rise. This causes the T lever 605 to position corresponding longitudinal bar 606 either to its right-hand or left-hand position. Under the assumed conditions, it causes it to be positioned to its left-hand position. This causes the punch member 607 to be operated to its left-hand position under the punch pin 608 through the linkage comprising levers 609 and 610. The depression of the key 601 causes the punch magnet 611 to be operated after all of the members 607 have been positioned, as will be described hereinafter. The operation of the punch magnet 611 causes armature extension 612 to be moved upward. Under the assumed conditions with only member 607 positioned to the left so that it will engage the punch pin 608, a hole will be perforated or punched in the tape 501 in the position corresponding to that of the punch pin 608 which is position No. 5. When the key 601 is depressed, each one of the sets of longitudinal bars passing underneath all of the keys is positively positioned so that each of the punch bars 607, associated with each pair of these longitudinal bars, is positively positioned either to the right or to the left. The number of punch bars and the number of longitudinal bars underneath the keys is dependent upon the number of elements of the code. Generally, a five-unit code is employed and, consequently, there will be five punch bars similar to 607. This will require five pairs of bars similar to 603 and 604. In addition, several extra bars are provided for controlling other parts of the perforator. In accordance with the present invention, an extra pair of bars is provided to control an extra or sixth punch bar 614. This extra bar is positioned to its left-hand position by the operation of a special key 615 and serves to control the equipment at the subscriber's station, as will be described hereinafter. The operation of all of the other keys of the keyboard positions this additional punch bar to its right-hand position so that no perforations will be punched in the sixth position of the tape except when the special key 615 is operated. The special key 615 is arranged so that it will position all of the other punch bars to their right-hand position when this key is operated. Consequently, when a sixth hole is perforated in the tape, no other holes will be punched in any of the other positions except, of course, the feed hole.

In order to perforate the tape, the subscriber will operate the switching lever 616 to its lowermost position. With lever 616 operated to its lowermost position, contacts 617 are opened while the remaining contacts controlled by this lever are closed. When lever 616 is operated to this lowest position it causes member 623 to be depressed so that this member will no longer engage lever 624 each time a key 601 is depressed. Consequently, latch 625 will not be released and the transmitting cam shaft 633 will remain at rest. The cam pulsing contacts 620 will, therefore, also remain opened and unoperating at this time.

In order to operate the perforate magnet 611 at this time, the universal contacts 628 operate every time any key 601, including key 615, is depressed. The universal contacts 628 complete a circuit from battery through the closed contacts 628, closed contact 629 to ground through the winding of perforating magnet 611 thus causing this magnet to operate and perforate the tape in accordance with the setting of members 607 which in turn are controlled by the particular key 601 depressed, as described above. The operation of the various keys also causes the operation of counting contacts 630. These counting contacts operate once for each operation of each of the keys 601 with the exception of certain of the keys which control certain functions of the teletypewriter equipment such as letters, figures, line feed, carriage return, etc.

Every time one of the keys 601 is depressed, except the function keys referred to above, a circuit is completed for operating counting magnet 660 from battery through the universal contact 628, switch contacts 629 and 632, the counting contacts 630 to ground through the winding of the counting magnet 660.

Thus the counter magnet counts the number of the characters perforated in the tape and indicates when sufficient characters have been perforated in the tape to fill a printed line on a page printing teletypewriter. The subscriber in operating the keyboard to perforate the tape will constantly observe this counter and transmit carriage return and line feed signals at the proper time. When the subscriber operates the carriage return key it causes contacts 631 to be closed instead of contact 630. Upon the closure of contact 631 the circuit is completed for the operation of the release magnet 661 of the counter from battery through the operated contact 628, which also operated at this time, switch contacts 629 and 632, contacts 631 to ground through the winding of the release magnet 661. The operation of the release magnet 661 restores the counter to its original position so that it will be in condition to count the characters of the next line.

It is noted that since the transmitting shaft 633 is held at rest it will not transmit any signals over the transmitting channel 205 of party line 201 at this time. It should be further noted that unless certain of the relays shown in Fig. 7 are operated as described hereinafter, the operation of these contacts at this time will be ineffective to transmit over the transmitting channel or to interfere with the transmission taking place over this channel.

All the details of this perforating mechanism have not been shown because their nature and manner of operation are well known in the prior art. For a more complete description of typical keyboard perforating mechanism reference may be had to the above-identified patents: 1,965,572, granted to Burcky et al, July 10, 1934; 1,965,602, Lake, July 10, 1934; and 1,969,891, Lake et al. August 14, 1934.

A keyboard transmitter is also provided in combination with this keyboard perforator similar to keyboard transmitters described in the foregoing patents. A switching arrangement is provided comprising lever 616 for controlling the keyboard perforating equipment and also keyboard transmitting equipment. When the lever 616 is in its uppermost position, transmission is entirely from the keyboard and no tape is perforated. When the lever 616 is in its middle position, signals are transmitted from the keyboard transmitter and, in addition, tape is also perforated in accordance with the message transmitted by the keyboard transmitter. Thus, when the key is in this position, the perforations in the tape record the signaling impulses transmitted over the line. When the key 616 is operated to its lowermost position, the operations of keys of the keyboard merely serve to perforate tape.

When key 616 is in its uppermost position, only contact 617 controlled by this key is closed and this contact merely serves to connect ground to the contacts 618 associated with the special key 615. Consequently, the circuit of the perforating magnet 611 is interrupted. Consequently, this magnet does not operate when keys of the keyboard perforator are operated so that no tape is perforated at this time.

When key 616 is operated to its middle position, contacts 617 and 619 are closed. This supplies battery to pulsing contacts 620. These contacts are closed every time the cam barrel 621 of the keyboard transmitter makes a revolution. Consequently, the circuit of the perforating magnet 611 is closed once during each revolution of the cams 633 of the keyboard transmitter. The circuit for so operating perforator magnet 611 may be traced from ground, winding of the perforator magnet 611, pulse contacts 620 when they are closed to battery, through closed contacts 619.

When signaling impulses are transmitted from the keyboard, i. e., with lever 616 in either the upper or the middle position and especially when lever 616 is in its middle position, it is essential for the switch 520 of the tape transmitter to be open so that this transmitter will not operate and interfere with the transmission from the keyboard. With key 616 in either its upper position or its middle position each time one of the keys of the keyboard, such as key 601, is depressed, the keyboard transmitting cam barrel 621 is released for one revolution in the following manner: Depression of a key, such as key 601, causes bar 621 to be rotated about pivot 634. This, in turn, causes the latch 625 of the clutch to be released through the linkage system comprising members 622, 623 and 624. The longitudinal bars, such as 606, beneath the keys in addition to positioning the punch bars 607, also control latches 626 of the keyboard transmitter so that signals will be transmitted in accordance with the keys depressed. It is to be understood, of course, that five bars, such as 606, control five latch members 626 in accordance with the particular key of the keyboard depressed.

It should be noted that the transmission circuit transmitted through the transmitting contacts 627 is short-circuited by the left-hand outer break contacts of relay 710. Relay 710 is controlled from the central exchange, as will be described hereinafter. Consequently, the operation of the keyboard transmitter, except when relay 710 is operated, is unable to transmit any signals over the transmitting channel 205 of the party line 201.

The application of power to the equipment at the subscriber's station merely permits the operation of the keyboard to perforate tape as described above but does not perform any other function until the transmitting apparatus to the subscriber's station is started from the central station. The subscriber, after perforating a tape in accordance with the messages to be transmitted from this station, will insert the tape in the tape transmitter, as shown in Fig. 5. Here the tape 501 is shown extending from the keyboard perforator, shown in Fig. 6, to the tape control transmitter shown in Fig. 5. The operator will insert the tape in the tape control transmitter so that the first letters signal perforated in the tape, as described above, will be the first signal transmitted by the transmitter distributor when it is started from the central station.

In general, the subscriber's equipment at each of these stations operates as described above and each of the subscribers will normally perforate the tape in accordance with the messages to be transmitted from their stations so that a supply of perforated tape at each of the stations will usually be available for the transmission of messages when the tape transmitter is started from the central exchange.

*Central station operator starts subscriber's transmitter*

Assume now that the circuits at the subscribers' stations and central station are as described above and that an operator at the central station wishes to start the transmission from the subscriber's station A. Assume, further, that the subscriber has inserted a perforated tape in the tape transmitter, shown in Fig. 5, and that all of the motors of the equipment at the subscriber's station are energized and ready to be started from the central station.

Figure 20:
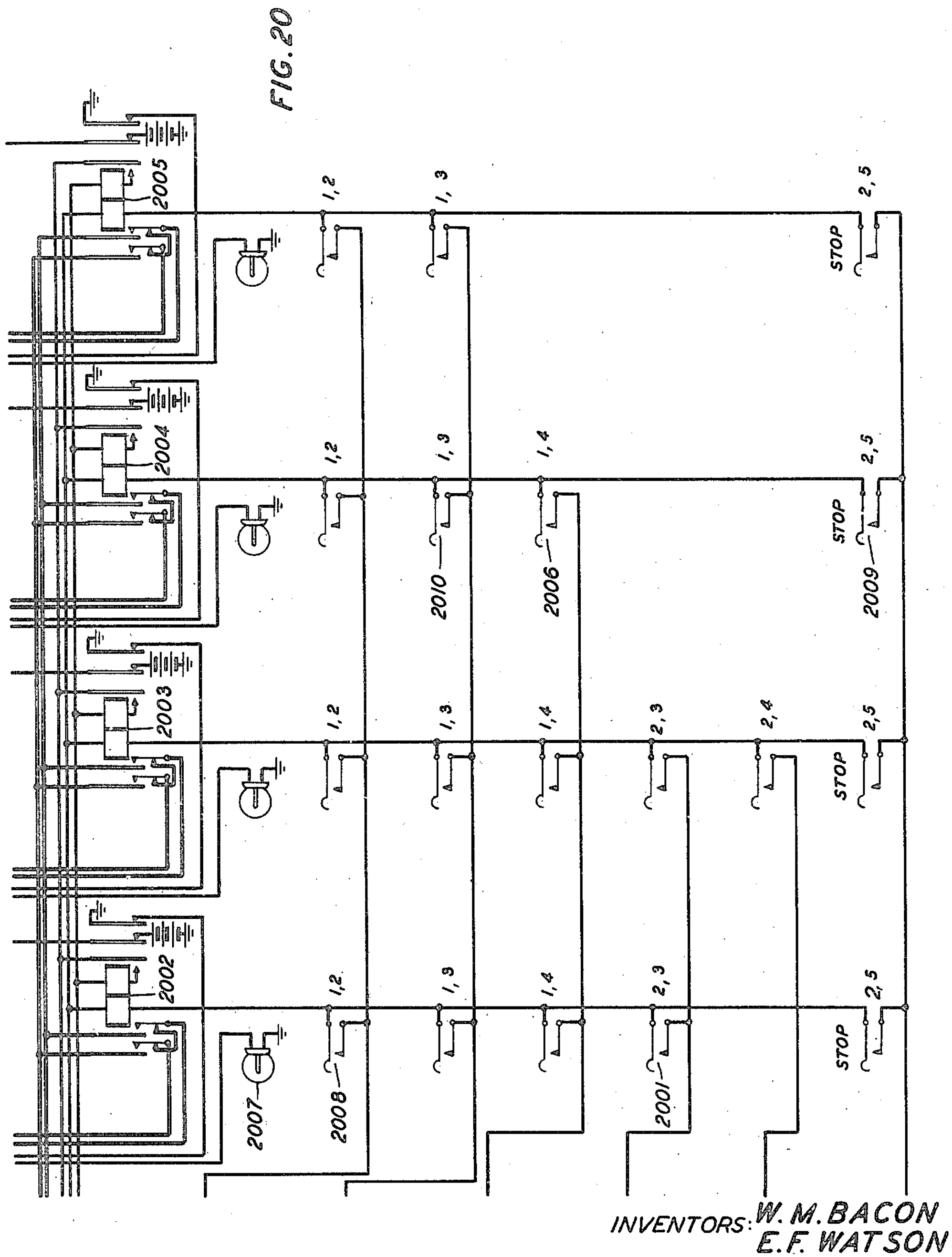

The operator at the central station will then operate key 2001, shown in Fig. 20, which is the key the operator will always press when she wishes to start the tape controlled transmitter of subscriber's station A. The operation of key 2001 completes a circuit for the operation of relays 1904 and 2002 from battery through the upper winding of relay 1904, contacts of key 2001, left-hand winding of relay 2002 to ground through the right-hand right contacts of relay 1907. The operation of relays 1904 and 2002 complete a circuit for locking themselves operated and for operating relay 1907 from battery through the lower winding of relay 1904, lower operated contacts of relay 1904, the right-hand winding of relay 2002, the right-hand inner operated contacts of relay 2002, the winding of relay 1907 to ground through the break contacts of relay 1908. Relay 1907, in operating, interrupts the operating circuit of all the relays 2002, 2003, 2004, 2005 and 1901, 1902, 1903, 1904, 1905 and 1906 so that none of these relays can now be operated as long as relay 1907 is operated. Relay 1907, in operating, connects resistance 1909 from its right-hand winding terminal to ground. This resistance provides an additional locking path for relays 1904 and 2002 for maintaining these relays operated so long as relay 1907 is operated. Resistance 1909 is of sufficiently high value, however, that relay 1907 remains operated in the circuit traced above. Relay 2002, in operating, extends the receiving channel of party line 201 to the automatic transmitter distributor shown in Fig. 19. This transmission circuit may be traced from battery 17, connected to the receiving channel of party line 201, through the left-hand break contacts of relays 1201, 1205, 1601, 1605, 1801 and 1805 and the left-hand outer operated contacts of relay 2002 to distributor ring 1910 of the automatic transmitter distributor, through brush 1911 and segment 1912 of this distributor to the left-hand inner operated contacts of relay 2002 to the other side of the receiving channel of party line 201.

The operation of relay 1907, as described above, completes a circuit from battery 1913, through the cam-controlled contacts 1914 which are closed at this time by cam 1915 since the transmitter distributor is in its rest or stop position, the left-hand outer operated contacts of relay 1907, high resistance 1916 to ground through the upper winding of relay 1917. Very little current flows through the upper winding of relay 1917 at this time because condenser 1918 is connected in parallel with this winding and the capacity of this condenser, the value of high resistance 1916 and the constants of the upper winding of relay 1917 are so related that the current flowing through the upper winding of relay 1917 remains insufficient to operate the armature of this relay to its left-hand position until the condenser 1918 has received a predetermined charge. Normally, the current flowing through the lower winding of relay 1917 maintains relay 1917 in its right-hand position. However, when the charge on condenser 1918 exceeds some critical value, current flowing through the upper winding of relay 1917 will overpower the current flowing through the lower winding of this relay and cause it to be operated to its left-hand position. In the preferred embodiment of this invention, it requires approximately one-third of a second for relay 1917 to be operated to its left-hand position after relay 1907 has operated.

When the armature of relay 1917 operates to its left-hand position, it completes a circuit for the operation of the transmitter distributor start magnet 1930 from ground through the armature and left-hand contacts of relay 1917, the left-hand break contacts of relay 1919 to battery through the winding of start magnet 1930. Start magnet 1930 operates and withdraws the stop pawl 1920 from engagement with the stop cam 1921, thus permitting the motor 1922 to drive transmitting distributor shaft 1923 through the friction clutch 1924 and gears 1925. Shortly after the distributor shaft 1923 starts to rotate cam 1915 causes contacts 1914 to open and to interrupt the circuit through the winding of relay 1926 from battery 1913, contacts 1914 and winding of relay 1926 to ground through the left-hand operated contacts of relay 1926. This permits relay 1926 to release. When contacts 1914 open they also interrupt the circuit through the upper winding of relay 1917 and permit condenser 1918 to discharge through the upper winding of this relay. During this discharge time relay 1917 is maintained in its left-hand position. It only requires a short time for a condenser 1918 to sufficiently discharge to permit the armature of relay 1917 to move to its right-hand position under the influence of the current flowing through its lower winding.

As the transmitter distributor shaft 1923 rotates, it rotates brush arm 1927 carrying brush 1911 of the distributor shaft of the transmitting distributor. After brush 1911 passes off the distributor segment 1912, it transmits spacing a condition or current over the receiving channel of the party line 201 for substantially the entire revolution until brush 1911 again makes contact with the distributor segment 1912 at which time it transmits a marking impulse over this channel. This comprises a "blank" code combination. By the time the distributor shaft 1923, together with the brush arm 1927, has made one revolution, the relay 1917 will have released and, in turn, released the stop magnet 1930 so that the distributor shaft 1923 and brush arm 1927 will be stopped.

At each of the subscribers' stations A, B, C and D connected to the party line 201, the armatures of the receiving relays 701, 801, 851 and 901 are operated to their spacing positions in response to these spacing impulses transmitted by the automatic transmitter described above. The operation of these relays to their spacing position interrupts an obvious circuit through the respective selector magnets 702, 802, 852 and 902. These selector magnets are somewhat similar to the printer magnets of teletypewriter mechanisms and control a selector mechanism which is essentially the same as the selector mechanism of a printing telegraph receiving instrument. However, instead of causing characters to be printed, these selector mechanisms are arranged, for the purpose of controlling switching operations, to selectively control and close certain contacts in response to reception of permutation code combinations and telegraph impulses.

Each of these permutation code selectors located at or near the subscribers' stations are provided with a number of contacts which are selectively controlled by the permutation code selector. All of the selectors at or near all of the subscribers' stations are provided with a contact which is controlled by a movable member which corresponds to a platen of a teletypewriter. When this platen member is operated to its figures or upper case position, it closes a contact controlled thereby and maintains this contact closed as long as this member remains in its figure position. When this member is returned by the selecting mechanism to its letters position or lower case, it will open this contact. All of these selectors at all of the subscribers' stations are also provided with a contact hereinafter referred to as a "universal" contact which momentarily operates once for each code combination received by the selecting mechanism. In the preferred embodiment of this invention this contact is preferably operated by the locking member which locks each received selection on the permutation elements which are sometimes called code bars. However, this contact may be controlled by any member of the selecting apparatus which operates once for each code combination received. For example, this contact may be controlled from a cam mounted on the selection cam shaft or it may be controlled by a cam mounted on the function shaft or by the printing bail or any other suitable element which operates once for each received code combination.

The remaining contacts controlled by the permutation code selectors located at or near each of the subscribers' stations are preferably controlled by the code bars selected by the received code combinations. These code bars instead of operating type bars as in a teletypewriter or receiving telegraph printing apparatus cause the contacts associated with them to be momentarily operated. The selecting equipment at all of these stations have contacts associated with a particular release code bar, for example, the code bar which would normally operate the letter V type bar of the teletypewriter. The selecting equipments located at or near each of the subscribers' stations have an activating contact which is similarly controlled by the same pull bar at each of the stations as, for example, the pull bar which normally operates the letter X type bar.

All of the other contacts at the respective stations controlled by the permutation code selectors thereat may be operated by different pull bars at the different stations. For example, at station A, contacts may be associated with the A and R pull bars, at station B contacts may be operated by the B and S pull bars, etc.

The details of the selecting mechanism have not been shown because they are well known and operate in their usual manner. For a detailed description of devices of this kind, reference may be had to the following United States patents the disclosures of which are hereby made a part of this present specification as if fully included herein: 2,112,234, granted to Beattie et al., March 29, 1938; and 2,120,235, granted to Beattie et al., June 14, 1938. It is to be understood that the circuits controlled by the selector contacts in the present application operate differently from the circuits controlled by the selector contacts in these patents. As stated in Beattie et al., Patent 2,120,235, the various pull bars of the selecting mechanisms or teletypewriters may be used for performing their regular printing functions in response to lower case selections.

The details of the circuit arrangements in accordance with this invention which are controlled by the selector contacts will be described in detail with reference to the circuit shown in Fig. 7 and located at station A. It is to be understood, however, that similar switching circuit arrangements are provided at the other stations and operate in the same manner as that to be described with reference to Fig. 7, except as pointed out hereinafter.

When the all spacing, i. e. the blank, combination is received by the selecting magnets 702, 802, 852 and 902 it causes them to momentarily close activating contacts 713. A very short interval of time after the activating contacts 713 actuated, contacts 715 are also actuated. However, the operation of contact 715 performs no useful function at this time since the circuit through these contacts is interrupted at the break contacts 713. It is also essential that contact 715 should be restored to normal before contacts 713 are restored to normal to prevent improper operation of the circuit.

The momentary operation of contacts 713 complete an obvious circuit for the operation of relay 706. Relay 706 in operating completes a circuit for locking itself operated from battery through its winding and left inner operated contacts to ground through the break contacts of relays 712 and 711.

The selector at station D is controlled by the selecting magnet 902 and will similarly momentarily close contact 913 in response to the blank or spacing combination received over the receiving channel 206 of party line 201. The operation of contacts 913 completes an obvious circuit for the operation of relay 906. Relay 906 in operating completes a locking circuit for maintaining itself operated through the break contacts of relays 912 and 911.

The switching equipment at stations B and C controlled by the selecting magnets 802 and 852, respectively, similarly respond to the spacing combination transmitted over the receiving channel 206 of party line 201 from the automatic transmitter at the central station as described above.

Returning now to the central station, when the transmitter distributor shaft nears the end of the first revolution cam 1915 will again close the contacts 1914. This completes a circuit for the operation of relay 1928 from battery 1913, through the closed contacts 1914, right-hand inner break contacts of relay 1926, the left-hand break contacts of relay 1928 to ground through the winding of relay 1928. Relay 1928, in operating, completes a locking circuit from ground through its winding and left-hand operated contacts to battery through the right-hand outer break contacts of relay 1926. Relay 1928, in operating, also connects the transmission circuit to the armatures of relays 1901 through 1906, inclusive.

When the cam 1915 closes contacts 1914, as described above, the circuit through the upper winding of relay 1917 is again closed and approximately one-third of a second thereafter, the armature of relay 1917 operates to its left-hand position where it again completes the circuit of the start magnet 1930 of the automatic transmitter. The operation of start magnet at this time completes the circuit for the operation of relay 1929 from ground to the inner operated right-hand contacts of relay 1928, winding of relay 1929 to battery through the operated contacts of start magnet 1930. The operation of relay 1929 completes a locking circuit for maintaining itself operated from battery through the right-hand outer break contacts of relay 1926, the left-hand inner make contacts of relay 1929, winding of relay 1929 to ground through the right-hand inner make contacts of relay 1928.

The operation of relay 1929 prepares a circuit for the operation of relay 1919 by connecting ground through the left-hand outer operated contacts of relay 1929 to the lower winding terminal of relay 1919. Relay 1919, however, does not operate at this time because ground is also connected to its upper winding terminal from the armature and left-hand contact of relay 1917 and the right-hand break contacts of relay 1919.

The reoperation of the start magnet 1930 as described above releases the distributor shaft 1923 for a second revolution. During this second revolution of the transmitter shaft 1923 carrying brush arm 1927, a series of impulses are transmitted over the receiving channel of the party line 201 which, under the assumed conditions, comprises a spacing start pulse, a spacing No. 1 impulse, a marking No. 2 impulse, a marking No. 3 impulse, a spacing No. 4 impulse and a spacing No. 5 impulse. The particular code combination transmitted is determined by which one of the relays 1901 through 1906 which is operated at this time. (Under the assumed conditions relay 1904 is operated.) During the transmission of the marking No. 2 impulse, the circuit path may be traced from one side of the receiving channels of the party line 201 to ring 1910 of the automatic transmitter distributor and then through brush 1911, segment 1931, upper operated contacts of relay 1904, right-hand outer operated contacts of relay 1928 to the other side of receiving channel of party line 201. A similar circuit may be traced during the transmission of the marking No. 3 impulse. During the transmission of the other impulses the circuit is open or spacing.

Figure 9:
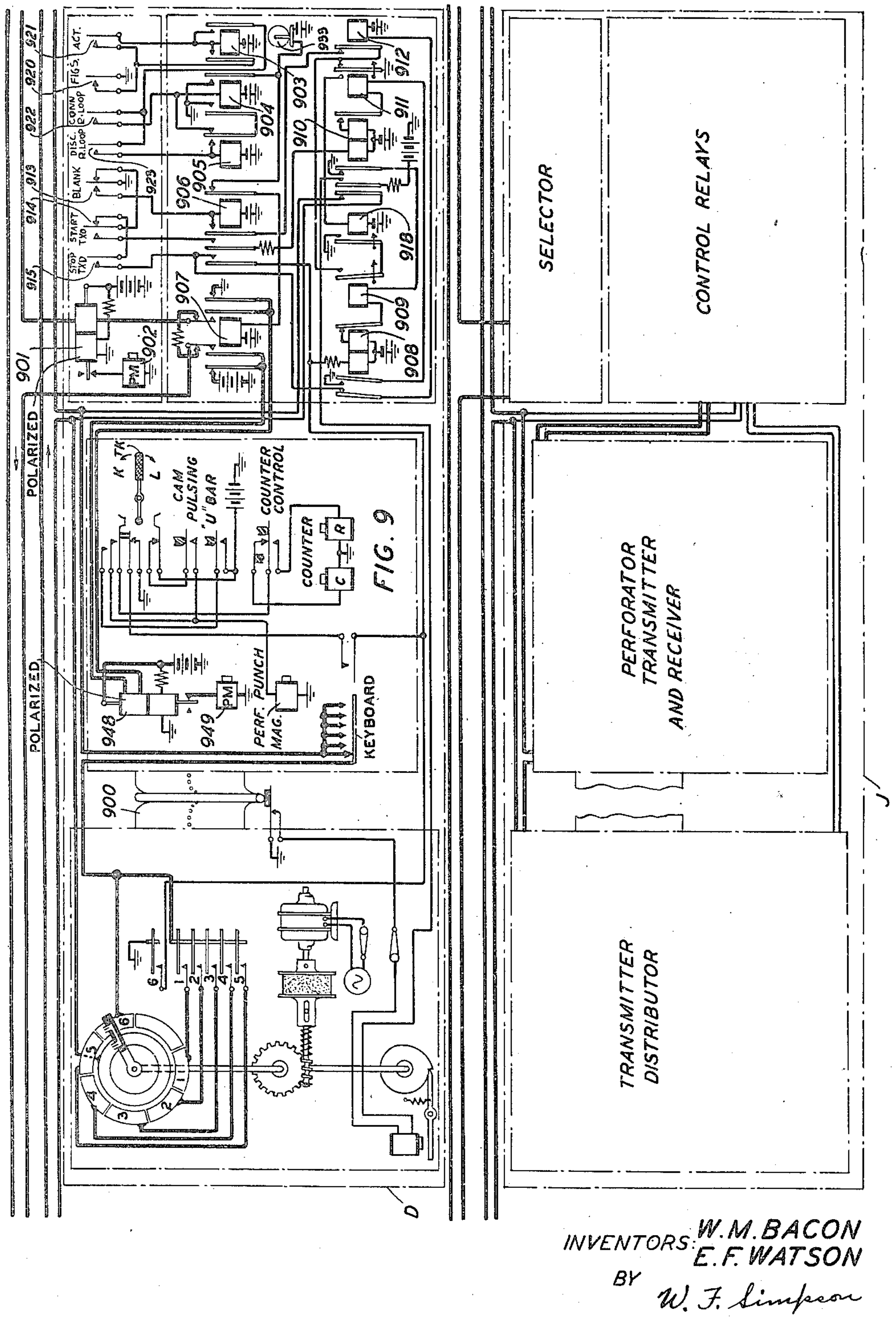
Figure 10:
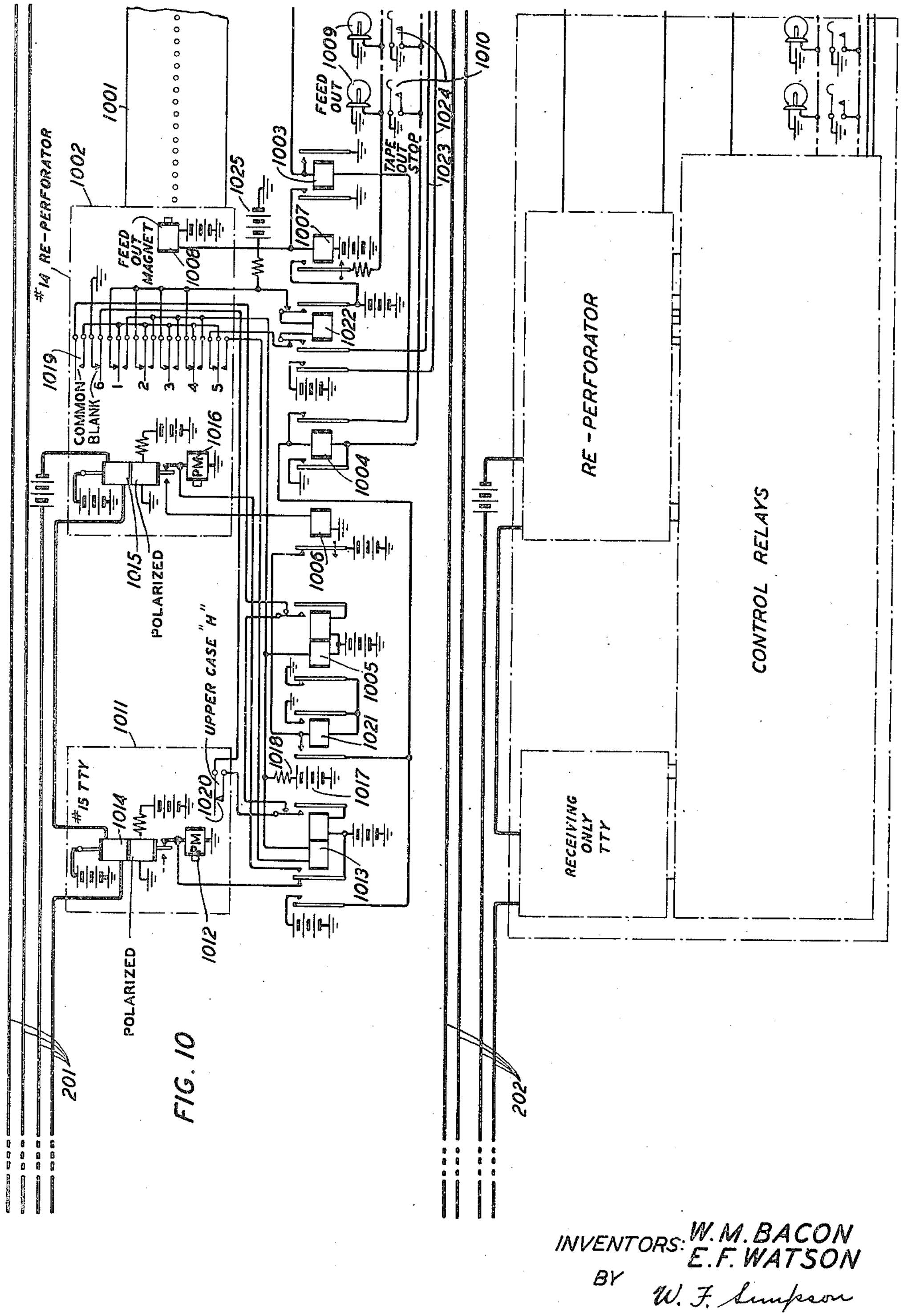

These impulses are transmitted to and received by the selector mechanisms and each of the stations A, B, C and D connected to the party line 201. The permutation selector at each of these stations responds to this received group of impulses by actuating a particular selector element or pull bar. The operation of this pull bar at station A, as shown in Fig. 7, causes the operation of contacts 714. The operation of the pull bars at the other stations by this code combination does not operate any contacts at these other stations because the selector mechanism at these stations is not provided with a contact actuated by a pull bar operated in response to this particular code combination. A short interval of time after contacts 714 are actuated, contacts 715 are operated. These contacts at station A perform no useful function at this time, because the operation of contacts 714 interrupts the circuit through contacts 715. On release, contacts 715 should open before contacts 714 to insure the proper operation of the circuit. Similarly, contacts corresponding to contacts 715 are actuated at other stations. The operation of these contacts at these other stations deenergizes switching equipment by causing the relay corresponding to relay 706 to release. For example, at station D, as shown in Fig. 9, when contacts 915 operate they complete a path from ground through normal contacts 913 and 914 and the operated contacts 915, operated contacts of relay 906 to battery through the left-hand winding of relay 908. The operation of relay 908 completes a circuit for maintaining itself operated and for operating relay 909 from battery through the right-hand winding of relay 908, the right-hand operated contacts of relay 908, the winding of relay 909 to ground through the left-hand inner break contacts of relay 910. Relay 908 in operating also completes a circuit for the operation of relay 912 from battery through the winding of relay 912, the left-hand outer operated contacts of relay 908, operated contacts 915 to ground through the normal contacts 914 and 913. The operation of relay 912 interrupts the locking circuit of relay 906 and permits this relay to release and restore the circuit to its normal or deactivated position. The selectors and associated circuits at the other stations operate in a similar manner.

The operation of contacts 714 at the subscriber's station A completes a circuit for the operation of relay 710 from ground through the break contacts 713, the operated contacts 714, the operated contacts of relay 706 to battery through the left-hand winding of relay 710. The operation of relay 710 completes a locking circuit from battery through its winding and right-hand operated contacts, the winding of relay 711 to ground through the left-hand inner break contacts of relay 708. Relay 711 operates in this locking circuit and interrupts the locking circuit of relay 706. Relay 711 in operating completes an obvious circuit for the operation of relay 718. Relay 718 in operating prepares a circuit for again locking relay 706 operated when it is again operated. Relay 718, however, is made slow operating to insure that relay 706 has sufficient time to fully release.

The operation of relay 710 removes the short circuit from the transmitting contacts of the transmitting apparatus at station A and thus extends the transmitting channel of the party line 201 to this transmitting apparatus. The operation of relay 710 also completes a circuit from battery over lead 717 for the operation of the subscriber's transmitting distributor start magnet 502.

Returning now to the central station, near the beginning of the revolution of the transmitting distributor shaft 1923 during which this selecting code combination is transmitting, contacts 1914 are again opened. This interrupts circuit through upper winding of relay 1917 and permits the armature of this relay to be operated to its right-hand position. Relay 1917, in operating to its right-hand position, removes ground from the upper winding terminal of relay 1919, thus permitting this relay to operate. The operation of relay 1917 to its right-hand position and the operation of relay 1919 interrupts the operating circuit of the start magnet 1930, thus releasing the stop pawl 1920 so that it will engage the stop cam 1921 at the end of the second revolution of the transmitting distributor shaft 1923.

The operation of relay 1919 prepares the circuit for the operation of relay 1908. Before the transmitter shaft 1923 comes to rest, cam 1915 again closes contacts 1914 which, in turn, again complete the circuit through the upper winding of relay 1917. Approximately three-tenths of a second later the armature of relay 1917 again operates to its left-hand position where it completes a circuit for the operation of relay 1908 from ground through the armature and left-hand contacts of relay 1917, the left-hand operated contacts of relay 1919 to battery through the winding of relay 1908. The operation of relay 1908 interrupts the operating circuit of relay 1907. The operation of relay 1908 does not interrupt the locking circuits of relays 2002 and 1904 since this locking circuit is still completed through resistance 1909 and the operated contacts of relay 1907, as described above. A short interval of time later relay 1907 releases and, in turn, interrupts the locking circuit of relays 2002 and 1904, thus permitting these relays to release. The release of relay 1907 again interrupts the circuit through the upper winding of relay 1917 and permits this relay to be again operated to its right-hand position where it interrupts the operating circuit of relay 1908, thus permitting relay 1903 to release. The release of relay 1907 completes a circuit for the operation of relay 1926 from ground through the inner left-hand break contacts of relay 1907, the winding of relay 1926, to battery 1913 through the contacts 1914. Relay 1926, in operating completes an obvious circuit for locking itself operated and interrupts the locking circuit for relays 1928 and 1929, permitting these relays to release. The release of relay 1929 in turn causes the release of relay 1919. The release of these relays and the operation of relay 1926 restores this automatic transmitting circuit to its normal position. Thereupon the operator may start the transmitter associated with any of the other party lines she may so desire by operating the key which controls the starting of the transmitter at the desired station in the same manner as described above.

*Transmission from one subscriber's station to another subscriber's station*

When relay 710 operated, as described above, it completed a circuit of lead 717 for the operation of the transmitter distributor start magnet 502. Assuming as pointed out above that a supply of tape is available and has been inserted in the tape transmitter. This circuit may be traced from battery through the center set of left-hand operated contacts of relay 710, lead 717, winding of the start magnet 502, switch 520, which the subscriber must close at this time, tape controlled contacts 519, to ground. The start magnet 502 will operate in this circuit and withdraw the stop latch 507 from engagement with the stop cam 508. This will permit the motor 503, which is connected to source 504, to drive the transmitter distributor shaft 531 through the friction clutch 505 and gears 506.

As this shaft starts to turn the cam 521 will release the lever 522 which in turn will release the bail 523. The release of bail 523 permits the pins attached to the levers 524 through 529 to rise against tape 501. The pins which find holes in the tape over them will pass through these holes and cause the contacts associated with or controlled by them to close in accordance with the perforations in the tape. Consequently during the remainder of the revolution of the transmitter distributor shaft 531 which carries brush arm 509 and brush 510 a code combination representing the character represented by the perforations in the tape will be transmitted over the transmitting channel, channel 205 of the party line 201.

As brush 510 passes off the stop segment 512 and onto the start segment 513 a spacing start pulse is transmitted over the line. Then as brush 510 passes over the segments 514 through 518 a code combination of five impulses is transmitted over the transmitting channel 205. Then as brush 510 again comes into contact with segment 512 a marking stop impulse is transmitted over the line. Assuming that a sufficient supply of perforated tape still remains available, the distributor shaft 531 will continue to rotate and transmit code combinations in accordance with the succeeding perforations in the tape.

Near the end of each revolution of the distributor shaft 513, cam 521 will operate lever 522 to the position shown. This will in turn operate bail 523 to the position shown. In operating this bail to the position shown the pins attached to the levers 524 through 529, inclusive, are withdrawn from the perforations in the tape and then the lever 530 actuates the tape feeding ratchet 532 through the pawl 533.

Assuming now that the perforations in the tape are as outlined above and that the first two sets of perforations are letter signals. Impulses corresponding to these perforations are transmitted over the transmitting channel 205 of the party line 201 to the central exchange. At the central exchange the receiving relays of teletypewriter 1011 and the reperforator 1002 are connected to this channel and receive these impulses. The printing magnet 1012 of the receiving teletypewriter, however, does not respond to these impulses because it is maintained operated in a circuit from battery through the left-hand break contacts of relay 1013 through the winding of the printer magnet 1012 to ground. The receiving magnet 1016 of the reperforator, however, does follow these signaling impulses repeated by the receiving relay 1015 which are received over the transmitting channel 205 of the party line 201. Relay 1015 in response to the first start spacing signal received from the outlying station A completes an obvious circuit for the operation of relay 1006. The operation of relay 1006 interrupts the locking circuit of relays 1021 and 1004 thus permitting these relays to release. The release of these relays performs no useful function at this time.

The reception of this code combination by magnet 1016 causes the reperforator to perforate a "Letter" signal or code in tape 1001. This will be followed by a second "Letter" signal as described above. The object of transmitting these two "Letters" signals is to insure that the perforator 1002 will be under control of the transmitting distributor at the subscriber's station in case relay 1003 is operated and is holding the feeding-out magnet 1008 operated. When the first spacing start signal arrives under these conditions, it will operate the receiving relay 1015 to its spacing position where an obvious circuit is completed for the operation of relay 1006. In this case the operation of relay 1006 will interrupt the locking circuit relays 1021, 1004 and 1003. Relay 1003 interrupts the operating circuit of the feed-out magnet 1008. Two "Letters" combinations are necessary because the first letters combinations may arrive when the reperforator is part way through the revolution. Consequently, it takes another character to insure that it will be operating in synchronism with the transmitting distributor at the subscriber's station. When these code combinations are received by the reperforator 1002 it causes them to be perforated in the tape 1001.

When these "Letters" code combinations are received by the reperforator 1002 it also causes contacts 1 through 5 and common contact 1019 to be momentarily operated in the manner described above. If relay 1005 is operated at this time, the operation of these contacts produces no useful function at this time. However, if relay 1005 has not been operated prior to this time the operation of these contacts causes relay 1005 to operate and lock operated.

The next code combination transmitted from the subscriber's station will be a blank code combination. When this blank code combination, i. e., a code combination in which each of the five selecting impulses are spacing, is received by the reperforator 1002 it will cause the reperforator 1002 to perforate a hole in the sixth position on the tape.

The manner in which a blank signal which is an all spacing combination causes a sixth hole to be perforated in the tape may be more readily understood from reference to Fig. 21. In case an all spacing combination is received, the first five members 2159 have their top ends positioned to the left. This causes the members 2160 to be operated to the left so that the ends 2161 do not engage the corresponding punched pins 2162.

Extension 2125 of lever 2126 cooperates with the upper portion of the first five members 2159. In case these first five members are moved to their spacing position, spring 2121 causes the member 2126 to follow. The lower extension 2127 of member 2126 is pivoted to the lower end of the sixth member 2159. When member 2126 is moved to the left it causes this sixth member to be moved to the right and this causes the end 2170 of the sixth member 2160 to be moved to its right-hand position so that it will engage the sixth punch pin 2171. Then when member 2167 is raised a hole will be perforated in the sixth position of the tape.

This sixth member 2169 is positioned to its right position only in case all five of the selecting members of the code combination are spacing. If any one of the selecting members of the code combination is marking one of the first five members 2159 will be positioned to its right-hand position and maintain lever 2126 in its right-hand position. This will maintain the member 2169 in its left-hand position so that the end 2170 will not engage the sixth punched pin 2171. Consequently, no hole will be punched in the sixth position in the tape under this condition.

All of the reperforators at the central station are similarly provided with this arrangement for perforating a special sixth hole in the tape in response to the transmission of a blank signal member. It is to be understood, however, that these perforators may be arranged to perforate this sixth hole in the tape in response to any other desired code combination by suitably shaping the extension 2125 and perhaps providing a similar extension on member 2126 which would rest against the lower extension of the first five members 2159.

When the all spacing or blank combination is received by the reperforator 1002 in addition to perforating a hole in the sixth position on the tape this reperforator also momentarily opens the No. 6 contacts. This is accomplished as described above because the sixth member 2178 is moved in its right-hand position where extension 2177 engages the bail 2182 which is depressed when the sixth hole is perforated in the tape.

When the reperforator 1002 momentarily opens the No. 6 contacts it interrupts the locking circuit of relay 1005 which then releases. This blank or all spacing code combination is immediately followed by a selecting code combination so that the slow-release relay 1006 does not release at this time. Consequently relay 1021 does not reoperate at this time. This selecting code combination following the blank combination again reoperates relay 1005 and relay 1005 in turn locks operated as described above, thus preventing relay 1021 from operating in case relay 1006 releases during a pause in the transmission of the message from the subscriber's station. Under these circumstances battery is not applied to lower winding terminal of relay 1003. Consequently, reperforator 1002 will not automatically perforate additional tape when the supply of tape between the reperforator 1002 and the tape-controlled transmitter 1101 is reduced to a predetermined minimum. When the supply of tape between these two devices is reduced to this predetermined minimum at this time the transmitting distributor 1101 will come to rest and await the reception of further signals from the subscriber's station.

As the transmitter at the subscriber's station continues to transmit code combinations representing the characters of the message stored in tape 501 at the subscriber's station the reperforator 1002 will receive and respond to these code combinations by perforating corresponding code combinations in tape 1001 and closing the corresponding contacts 1 to 5.

When the letters signals perforated in tape 1001 as described above, reach the tape transmitter 1101 they pass through this transmitter in the same manner as described above for all of the other signal combinations which pass through the tape transmitter without effecting its operation. When the blank signal, which is the combination perforated in the tape where no holes are perforated in the first five positions of the tape but a hole is perforated in the sixth position, reaches the tape transmitter, contact No. 6 of the tape control contacts will close and complete an obvious circuit for the operation of relay 1117. The operation of relay 1117 performs no useful function at this time. The next perforation in the tape as pointed out above will be a switching combination in which only one of the selecting impulses will be marking. When this combination passes under the tape control contacts only one of the contacts 1 to 4 will close. As pointed out above the switching arrangement shown in Fig. 11 is arranged to respond to only four different code combinations and will select only four different outgoing lines, one of the five code combinations being reserved for connecting on the receiving teletypewriter 1011 associated with party line 201 as described hereinafter. Consequently, if a character represented by a single perforation in a No. 5 position passes under the members of the tape controlled transmitter relay 1110 will operate. However, due to the shunting resistance 1122, relay 1113 will also operate at this time and advance the tape through the transmitter without actuating any of the switching relays. It should be noted that if the resistance of relay 1110 is made sufficiently low to cause relay 1113 to close its left-hand contacts, the shunting resistance 1122 may be dispensed with.

When only one of the contacts 1 to 4 close only one of the relays 1106 to 1109 will operate. Assume for the purpose of illustration that relay 1108 is operated by a single hole in the tape in the No. 3 position which causes the No. 3 tape control contact to operate. The circuit for the operation of relay 1108 may be traced from battery through the upper winding of relay 1113, the left-hand winding of relay 1108, the operated contacts of relay 1111, No. 3 tape control contacts to ground through the lower operated contacts of relay 1111. Current flowing in this path causes relay 1108 to operate but is insufficient to cause relay 1113 to operate. The armature of relay 1113 will consequently be maintained in its right-hand position at this time. Near the end of this revolution of brush arm 1112 during which only the No. 3 contact closes, cam 1115 will close contacts 1116 before the tape controlled No. 3 contacts open and complete a locking circuit for maintaining relay 1108 operated from battery through the armature and right-hand contacts of relay 1113, break contacts of relay 1114, cam controlled contacts 1116, right-hand winding of relay 1108, right-hand operated contacts of relay 1108 to ground through resistance 1120. Inasmuch as relay 1108 is now maintained operated, the operating circuit of the start magnet 1104 of the transmitting distributor 1101 is interrupted. Consequently this magnet does not operate, so at the end of this revolution of the brush arm 1112 the transmitting distributor will come to rest.

Under the assumed conditions party line 203 to which this call would be directed will be idle since this is the line which will be selected by a code combination in which only a third member is marking. If this line is idle at this time, when cam 1115 closes contacts 1116, a circuit will be completed for the operation of relay 1211 from battery through the armature and right-hand contacts of relay 1113, break contacts of relay 1114, cam controlled contacts 1116, the right-hand winding of relay 1108, right-hand operated contacts of relay 1108, lead 1125, left-hand winding of relay 1211, lead 1219 to ground to the break contacts of relay 1823.

The operation of relay 1211 in this circuit completes an obvious circuit for the operation of relay 1823. The operation of relay 1823 removes the operating ground from the other switching relays which are connected to the receiving channel of the party line 203 thus preventing any other transmitter from being connected to this line.

The operation of relay 1211 also completes a circuit for maintaining itself operated and for operating relay 1203 from battery through the inner right-hand operated contacts of relay 1211 and right-hand winding of relay 1211, winding of relay 1203 to ground through the break contacts of relay 1117. The operation of relay 1211 interrupts the operating circuit of relay 1111 thus permitting this relay to release and disconnect the right-hand windings of relay 1106 through 1110 from the tape control contacts. The operation of relay 1203 connects the transmitting distributor 1101 in series with the receiving channel of the party line 203.

The operation of relay 1211 also completes a circuit from battery through the right-hand center break contacts of relays 2004, 1815, 1811, 1615, 1611, and 1215, through the center set of right-hand operated contacts of relay 1211, lead 1127, the operated right-hand contacts of relay 1103 to ground through the winding of start magnet 1104 and switch 1105 of the transmitting distributor 1201. This causes the operation of this start magnet which releases the brush arm 1112 of the transmitting distributor 1101. This distributor then transmits the signaling impulses in accordance with the following perforations in the tape. These impulses are transmitted over the receiving channel of the party line 203 to the selecting equipment at station K shown within the box K in Fig. 13.

Normally the next combination perforated in the tape of the subscriber's station after the combination having a single marking impulse will be figures combination. In certain cases, however, where it is desirable to employ the switching system on a high speed telegraph system it may be necessary to transmit a letters signal after the signal combination having a single marking impulse in order to allow sufficient time for the switching relays to function. The letters combination comprises a spacing start pulse followed by five marking impulses. Consequently the letters signal will allow sufficient time for the switching relays to function and even if these relays operate during the transmission of this combination they will not cause false or extra characters to be transmitted over the receiving channel of the party line 203.

The figures combination when it is repeated and transmitted over the receiving channel of the party line 203 will be received by the selecting mechanism at station K. Receiving relay 1301 of the permutation code selector follows the impulses received over the receiving channel of the party line 203 and repeats them to the selecting magnet 1302. Selector magnet 1302 actuates the selecting mechanism and causes it to close the contacts 1320. Contacts 1320 are controlled by a member which corresponds to the platen of a teletypewriter. The platen of the teletypewriter when shifted to the figure position remains in this position until unshifted by a later code combination. The contacts 1320 are arranged to remain closed so long as the platen-like member remains in the shifted or figures position.

The next code combination transmitted from the subscriber's station and repeated through the central station will be an activating code combination which will momentarily close contacts 1321. The operation of contacts 1321 completes a circuit for the operation of relay 1326 from ground through the operated contacts 1320 and 1321 to battery through the winding of relay 1326. Operation of relay 1326 completes a circuit for maintaining itself operated from ground through contacts 1320 and operated left-hand contacts of relay 1326 to battery through the windings of relay 1326. The next code combination transmitted from the subscriber's station and received by the selector at station K will be a code combination selecting the particular station for which the message is intended. Since the message is intended for station K it will be assumed that the next code combination will be the same combination as assigned to the letter K. When this code combination is received by the line relay 1301 and repeated to the selecting magnet 1302, selecting magnet 1302 will cause the selecting mechanism at station K to momentarily close contacts 1324. The closing of contacts of 1324 at this time completes a circuit for the operation of relay 1327 from ground through the operated contacts 1320 and operated right-hand and left-hand contacts of relay 1326, the operated contacts 1324 to battery through the winding of relay 1327. Relay 1327 in operation completes a locking circuit from ground through its left-hand operated contacts, the break contacts of relay 1328 to battery through the winding of relay 1327. The operation of relay 1327 completes an obvious circuit for lighting lamp 1333 to indicate to the attendant at station K that the receiving channel of the party line is connected to station K. Operation of relay 1327 also completes a circuit for the operation of relay 1336 from battery through the winding of relay 1336, the right-hand break contacts of relay 1339 to ground through the right-hand operated contacts of relay 1327.

The operation of relay 1336 connects the receiving relay 1348 to the receiving channel of the party line 203. The next combination transmitted by the subscriber's station which will be repeated through the central station will be a letters combination. This letters combination will be repeated by both the line relay 1301 at station K and the line relay 1348 of the teletypewriter. The relay 1348 will follow these signals and repeat them to the printing magnet 1349 of the receiving teletypewriter. However, as this is a letters signal it produces no effect on the teletypewriter unless the teletypewriter had been previously left in upper case in which case the letters signal will restore it to the lower case. At station K the selecting magnet 1302 will follow these signals and will cause the selector to open the contacts 1320 which in turn causes relay 1326 to release.

Thereafter the code combinations perforated in the tape 501 at the subscriber's station will be transmitted to the receiving teletypewriter at station K through the tap transmitter at station A, the transmitting channel of party line 201, the reperforator 1002 and retransmitter 1101 at the central station, the receiving channel of the party line 203 to the teletypewriter at station K where they are recorded. The line relay 1301 repeats all of these impulses to the selector magnet 1302. However, these impulses produce no effect upon the selector equipment because it has not been properly activated. The selecting mechanism will close the various contacts when the respective code combinations are received. However, since the switching relays operated by these contacts are not properly conditioned the actuation of these contacts at this time produces no effect upon the switching relays.

At the termination of the message the subscriber at station A will perforate the figures signal combination in the tape followed by an activating combination. The activate signal may be any code combination not assigned as a station designating code or given some other switching function in the system. The figures combination when received at station K by the selecting magnet 1302 will cause contacts 1320 to operate. Then the activating signal combination will cause the selecting mechanism to momentarily close the activating contacts 1321. This completes a circuit for the operation of relay 1326 as described above. The next combination perforated in the tape by the subscriber will be a disconnect signal, for example, the letter V. When this disconnect signal is received by the selecting magnet 1302 to station K it will cause the selecting mechanism to momentarily close the contacts 1325. This completes a circuit for the operation of relay 1328 from ground through the operated contacts 1320, the operated contacts of relay 1326, the operated contacts 1325 to battery through the windings of relays 1328, 1330 and 1332. The operation of relays 1330 and 1332 in this circuit at this time produces no useful function. Operation of relay 1328 interrupts the locking circuit of relay 1327 and allows this relay to release. Relay 1328 in operating completes a locking circuit from ground through the left-hand operated contacts of relay 1327 through its own operated contacts and a winding to battery which circuit insures that relay 1328 will remain operated sufficiently long to cause relay 1327 to fully release. The release of relay 1327 interrupts the circuit of relay 1336 and permits this relay to release. The release of relay 1327 also interrupts the circuit of lamp 1333 thus causing this lamp to be extinguished. The release of relay 1336 disconnects the receiving relay 1348 of the receiving teletypewriter at station K from the receiving channel of party line 203 and reestablishes a local circuit through the upper winding of the receiving relay 1348 to maintain it in its marking position thus maintaining the teletypewriter at station K in its normal condition. The next signal combination perforated in the tape 501 by the subscriber at station A will be a letters combination which will be repeated over the transmission circuit to the selecting magnet 1302 and in turn cause the selector to open the platen contacts 1320. This interrupts the locking circuit of relay 1326 and permits this relay to release thus restoring the circuit to its original condition.

If the next message is intended for station L or M, the subscriber at station A instead of sending the last letters signal, could send the letter L or M followed by a letters signal and then transmit the message to the corresponding station L or M. This would cause the selector controlled by the selecting magnet 1302 to operate either relay 1329 or 1331 as the case may be. The operation of these relays in turn will cause the operation of relays 1337 or 1338, respectively, to connect the receiving apparatus at station L or M to the receiving channel of the party line 203.

Of course the subscriber could transmit a "letters" signal at the end of the message to station K and then again transmit a figures signal followed by the activating signal combination, which may be any available character code not identifying a station, and then the letter L or M and then a second letters signal. These switching combinations would cause the selecting equipment at station K to operate in substantially the same manner and connect either station L or M to the receiving channel of party line 203 depending upon whether the subscriber transmits the letter L or M at this time.

It is also possible for the subscriber to transmit disconnect signals, as described hereinafter, after which the subscriber may transmit the necessary switching signals as described above for connecting his station to either station L or M or to any other station connected to the system.

At the end of this message to station L or M the subscriber at station A again transmits the figures combination followed by an activating combination and a disconnect combination. The selector would operate as described above and disconnect the printing equipment at these stations from the receiving channel of the party line 203 as described above. In case the following message was intended for a station connected to another party line or for the central station, the subscriber at station A will perforate a blank signal combination in the tape following the last letters signal combination.

When this blank signal combination is received by the reperforator at the central switching station, it will cause a sixth hole to be perforated in the tape. It will also momentarily operate the No. 6 contact, this will interrupt the locking circuit of relay 1005 and permit this relay to release.

When this blank signal reaches the transmitting distributor 1101 it will cause the No. 6 tape control contact to close. This will in turn complete an obvious circuit for the operation of relay 1117. Operation of relay 1117 interrupts the locking circuit of relays 1203 and 1211 permitting these relays to release. The release of relays 1203 and 1211 disconnects the transmitter distributor 1101 from the party line 203. The release of relay 1211 interrupts the circuit of the busy relay 1823 and permits this relay to release. The release of relay 1823 partially prepares the circuits for operation of switching relays for connecting any of the transmitting distributors to party line 203.

Assuming that the next message perforated in the tape 501 at station A is intended for the central switching station. In this case the code combination following the blank signal perforated in the tape will have only the fifth impulse marking. When this code combination arrives at the central station and actuates the selector magnet 1016, it will cause both the common contact and the No. 5 contact to be actuated while the remaining contacts will remain in their normal position. The actuation of only the No. 5 contact and the common contact completes a circuit for the operation of relay 1013 from battery 1017, resistance 1018, left-hand winding of relay 1013, the operated No. 5 contact and the operated common contacts 1019, the right-hand break contacts of relay 1005, the right-hand break contacts of relay 1013, the special control contacts 1020 of the receiving teletypewriter 1011 at the central station to ground through the No. 6 contacts of the receiving reperforator 1002. It should be noted that the left-hand winding of relay 1005 is connected in parallel with resistance 1018 so a small current will flow through this winding at this time. This current, however, is insufficient to cause relay 1005 to operate at this time, or if relay 1005 does operate, it performs no useful function at this time.

Relay 1013, in operating, completes a circuit for maintaining itself operated from battery through its right-hand winding and operated right-hand contacts, control contacts 1020 of the teletypewriter 1011 to ground through the No. 6 contacts of the reperforator 1002. Relay 1013, in operating, removes battery connected to the winding of magnet 1012 through the break contacts of relay 1013, thus allowing magnet 1012 to respond to the receiving relay 1014 of the receiving teletypewriter 1011.

The operation of relay 1013 connects battery through its left-hand operated contacts to the winding of the selector magnet 1016 of the reperforator 1002, thus maintaining this magnet in its marking position so that the reperforator will not respond to the signals received over the receiving channel of the party line 201.

The operation of relay 1013 also connects battery to the upper winding terminal of relay 1004, thus preparing a circuit for the operation of relays 1003 and 1004. When the tape transmitter 1101 has transmitted the code combinations of the previous message in tape 1001 so that the supply of tape 1001 is reduced sufficiently to cause contacts 1102 to open, the circuit of relay 1103 is interrupted. The release of relay 1103 at this time completes a circuit for the operation of relay 1003 from battery through the left-hand outer operated contacts of relay 1013, the right-hand break contacts of relay 1004, winding of relay 1003 to ground through the left-hand break contacts of relay 1103. The operation of relay 1003 completes a locking circuit for maintaining itself operated from battery through the left-hand outer operated contacts of relay 1013, the left-hand break contacts of relay 1004 to ground through the winding and right-hand operated contacts of relay 1003. The operation of relay 1003 also completes a circuit for the operation of the feed-out magnet 1008 of reperforator 1002. As described above, this causes the reperforator 1002 to automatically perforate additional "Letters" characters, that is, characters represented by five perforations in the tape. The operation of relay 1003 also closes a circuit for the operation of slow-operate relay 1007. In the preferred embodiment of this invention it requires approximately fifteen seconds for the slow-operate relay 1007 to operate. At the end of this time relay 1007 operates and completes an obvious circuit for lighting the feed-out lamp 1009.

By the time relay 1007 operates, the last series of perforations in tape 1001 representing the previous message including the switching information at the end thereof has passed through retransmitter 1101. Thus none of the previous message or switching information accompanying it remains stored in the tape 1001 between reperforator 1002 and the tape control transmitter 1101.

The operator upon observing the lighted feedout lamp 1009 will operate the stop key 1010. This completes a circuit for the operation of relay 1004 from battery through the left-hand operated contacts of relay 1013, winding of relay 1004 to ground through the operated contacts of the stop key 1010. The operation of relay 1004 completes a locking circuit for maintaining itself operated from ground through its left-hand operated contacts and winding the battery through the left-hand operated contacts of relay 1013.

The operation of relay 1004 interrupts the locking circuit of relay 1003, thus permitting this relay to release. The release of relay 1003 causes the feed-out magnet 1008 and the slow-operate relay 1007 to release. Release of the feed-out magnet 1008 stops reperforator 1002 and the release of relay 1007 interrupts the circuit of the feed-out lamp 1009.

After the transmission of the code combination having only the fifth impulse marking, the message impulses of the message from station A intended for the central station may be transmitted over the line to the central switching station, where relays 1014 and 1015 follow these signaling impulses. Relay 1014 repeats them to the printing magnet 1012 at the receiving teletypewriter 1011 and causes them to be recorded at the central exchange. Magnet 1016, however, does not follow these signaling impulses since it is held in its marking position as described above. Consequently, no corresponding perforations will be perforated in the tape 1001. Relay 1006 will operate and remain operated during the transmission of the message signals but performs no useful function at this time.

*The central station operator starts transmission over a busy party line*

Assume now that during the transmission of this message to the central station the operator at the central station will start the transmitter at station M and that the first message recorded in the tape at station M will be intended for station D. The operator at the central station will operate key 2006. This will cause the operation of relays 1903 and 2004 in a circuit from battery through the upper winding of relay 1903, the operated contacts 2006, the left-hand winding of relay 2004 to ground through the right-hand break contacts of relay 1907. The operation of relays 1903 and 2004 complete a locking circuit for maintaining themselves operated from battery through the lower winding of relay 1903 and lower operated contacts and right-hand winding of relay 2004, right-hand inner operated contacts of relay 2004, winding of relay 1907 to ground through the break contacts of relay 1908. The operation of relay 2004 interrupts the battery supplied to the start magnets of any of the tape controlled transmitters which may be connected to the received channel of party line 203 at this time as described hereinafter.

Relay 1907 operates in this circuit and completes a circuit through the upper winding of relay 1917. Approximately one-third of a second later relay 1917 will close its left-hand contacts which complete a circuit for the operation of the transmitter start magnet 1930. The operation of the start magnet 1930 withdraws the stop latch 1920 from engagement with the stop cam 1921 and permits the transmitting shaft 1923, carrying brush 1927, to make one revolution. During this revolution brush 1927 causes a blank code combination to be transmitted over the receiving channel of party line 203, because the operation of relay 2004 connected this receiving channel to the transmitting distributor 1910.

The receiving relay 1301 responds to this blank signal and repeats it to the selecting magnet 1302. The selecting magnet causes the blank contacts 1313 to be operated, followed by the operation of the contacts 1315. The operation of contacts 1315 performs no useful function at this time. The operation of contacts 1313 completes an obvious circuit for the operation of relays 1339, 1340, and 1341. The operation of these relays completes a circuit for maintaining themselves operated from battery through their windings and left-hand inner operated contacts to ground through the contacts of relays 1312 and 1345.

The operation of relays 1339, 1340, and 1341 causes the release of any or all of the relays 1336, 1337 and 1338 which are operated at this time; thus, regardless of other conditions, the receiver at any or all of the stations K, L and M is removed from associated receiving channel 203 and prevents any recording of subsequent switching characters, the blank code has not been recorded by any receiver at stations K, L or M and neither changes the case nor performs any other function in the receivers of these stations; and any of these receivers associated with the line before the blank signal is transmitted is left in the same condition to resume recording at a later time as it was before the reception of the blank as stated herein.

Returning now to the central station, at the beginning of the revolution of the shaft 1923 during which the blank combination is transmitted cam 1915 will cause contacts 1914 to be opened. This interrupts the locking circuit of relay 1926, thus permitting this relay to release. The opening of the contacts 1914 also removes the battery from the upper winding of relay 1917, thus permitting this relay to release and in turn release the start magnet 1930 before the shaft 1923 has completed a revolution.

Near the end of this revolution, cam 1915 will cause contacts 1914 to again close. This completes a circuit for the operation of relay 1928 and also connects battery to the upper winding of relay 1917. The operation of relay 1928 completes a locking circuit for maintaining itself operated from battery through the right-hand outer break contacts of relay 1926 to ground through the left-hand operated contacts and winding of relay 1928. The operation of relay 1928 also connects the contacts of relays 1901 through 1906 to the transmitting channel of the party line 203 and to the transmitting distributor 1910. Approximately one-third of a second later relay 1917 will again be operated to its left-hand position, where it again completes a circuit for the operation of start magnet 1930. The operation of start magnet 1930 at this time again withdraws the stop latch 1920 from engagement with the stop cam 1921 and thus permits the transmitting distributor 1910 to transmit another code combination over the receiving channel. The operation of the start magnet 1930 also completes a circuit for the operation of relay 1929 from ground through the right-hand inner operated contacts of relay 1928, the winding of relay 1929 to battery through the operated contacts of the start magnet 1930. The operation of relay 1929 completes a locking circuit for maintaining itself operated from battery through the right-hand outer break contacts of relay 1926, the left-hand inner operated contacts and winding of relay 1929 to ground through the right-hand inner operated contacts of relay 1928. The operation of relay 1929 also connects ground to the lower winding of terminal of relay 1919. Relay 1919, however, does not operate at this time because ground is also connected to the upper winding terminal of relay 1919 through the armature and left-hand contacts of relay 1917 and the right-hand break contacts of relay 1919. Near the beginning of this revolution cam 1915 will again open the contacts 1914 and interrupt the circuit through the upper winding of relay 1917, thus permitting this relay to release and in turn release the start magnet 1930. Relay 1917, in releasing, also disconnects ground from the upper terminal of relay 1919 and thus permits this relay to operate.

During this second revolution of the shaft 1923 of the transmitting distributor 1910 the code combination in which the first and fourth impulses are marking and the second, third and fifth are spacing is transmitted over the receiving channel of party line 203.

Relay 1301 will repeat this second code combination to the selector magnet 1302 of the selector at station K. Selecting magnet 1302 will cause a pull bar to be actuated which in turn will cause contacts 1317 to be operated and in turn complete a circuit for the operation of relay 1347 from battery through the left-hand winding of relay 1347, the operated contacts of relay 1341 to ground through the actuated contacts 1317 and the normal contacts 1316, 1314 and 1313. Contacts 1315 will also be operated a short interval of time after the operation of contacts 1317, but perform no useful function at this time because the circuit through these contacts is open at the operated contacts 1317.

Relay 1347 in operating completes a circuit for operating relay 1345 and for maintaining itself operated from battery through the winding of relay 1347 the right operated contacts of relay 1347, winding of relay 1345 to ground through the left-hand inner break contacts of relay 1342. Relay 1345 in operating interrupts the locking circuits for relays 1339, 1340 and 1341 and permits these relays to release. The operation of relay 1345 also completes an obvious circuit for the operation of relay 1351. Relay 1351 in operating prepares a circuit for again locking relays 1339, 1340 and 1341 operated when they are operated the next time by the reception of suitable signals from the central office.

Relay 1351, however, is a slow operating relay and does not close its contact for an appreciable period of time sufficient to insure that relays 1339, 1340 and 1341 will release, when relay 1345 operates as described.

The operation of relay 1347 removes the short circuit from around the transmitting contacts of the transmitting apparatus at the station M and thus effectively connects the transmitting line extending to station M to the transmission channel of party line 203. The operation of relay 1347 also connects battery to line 1350 extending to station M which prepares a circuit for the operation of the start magnet of the transmitting distributor at this station, thus permitting this transmitter to start to transmit impulses.

Returning now to the central station, near the end of this second revolution of the transmitting shaft 1923 of transmitting distributor 1910 cam 1915 will again close contacts 1914 and connect battery to the upper winding of relay 1917. Approximately three-tenths of a second later relay 1917 will be operated to its left-hand position, where it will complete a circuit for the operation of relay 1908 from ground through the armature and left-hand contact of relay 1917 and the left-hand operated contacts of relay 1919 to battery through the winding of relay 1908. The operation of relay 1908 interrupts the operating circuit of relay 1907 and permits this relay to release. The release of relay 1907 interrupts the locking circuit of relays 1903 and 2004 and completes a circuit for the operation of relay 1926 from battery 1913 through operated contacts 1914, winding of relay 1926 to ground through the left-hand break contacts of relay 1907. Operation of relay 1926 completes a circuit for maintaining itself operated from ground through its left-hand operated contacts and winding to battery 1913 through contacts 1914. The operation of relay 1926 also interrupts the locking circuit for relays 1928 and 1929, thus permitting these relays to release. Relays 1908, 1917 and 1919 also release at this time and restore the automatic transmitter at the central station to its normal condition.

Assume that the subscriber at station M has previously prepared messages for transmission by perforating them in the tape and that this tape has been inserted in the tape transmitter. In this case, as in the case of messages transmitted from any of the other subscribers' stations, the subscriber will precede the perforations representing the message by certain perforations for directing the message to the desired station. At the beginning of a tape the subscriber will usually perforate two "Letters" signals to insure that the reperforator 1402 will be stopped and properly synchronized with the tape transmitter at the subscriber's station in case the reperforator had been previously feeding out tape due to the operation of the tape feed-out magnet 1408. The operation of the tape feed-out magnet 1408 is similar to the operation of the tape feed-out magnet 1008 as described elsewhere herein.

Following these two "Letters" signals the subscriber will perforate and cause to be transmitted a blank signal. This blank signal is received by the reperforator 1402 which perforates a hole in only the No. 6 position in the tape. When this perforation arrives at the transmitter 1501 it will cause the relay 1517 to be operated as described above with reference to relay 1117. Relay 1517 performs no useful function at this time. The next combination transmitted from the subscriber's station will be a code combination in which only the first impulse is marking under the assumed condition where the message is intended for a station connected to party line 201. This will cause relay 1506 to be operated and to lock operated, thus interrupting the circuit of the start magnet 1504 of the tape transmitter 1501. Just before the transmitting brush 1512 comes to rest and before any of the operated tape controlled contacts 1 to 6 open, cam 1515 will close contacts 1516 and complete a circuit for maintaining relay 1506 operated and for the operation of relay 1609, providing the receiving channel of party line 201 is idle, as it will be under the assumed condition, from battery through the armature and right-hand contacts of relay 1513, break contacts of relay 1514, contacts 1516, the winding and right-hand contacts of relay 1506, and the left-hand winding of relay 1609, to ground through the break contacts of relay 1821.

The operation of relay 1609 interrupts the operating circuit of relay 1511 and permits this relay to release. The release of relay 1511 disconnects the operating circuits of relays 1505 to 1510 from the tape controlled contacts. The operation of relay 1609 completes a locking circuit for maintaining itself operated and for operating relay 1601 from battery through its right-hand inner operated contacts and right-hand winding, winding of relay 1601 to ground through the break contacts of relay 1517. The operation of relay 1601 connects the receiving channel 206 of party line 201 to the transmitting distributor 1501. The operation of relay 1609 also completes a circuit for the operation of relay 1821. Relay 1821 in turn removes ground from the operating circuits of the other relays 1209, 1213, 1613, 1809, and 1813 associated with the party line 201 thus making this line busy and preventing the connection of any other transmitters to it at this time. Operation of relay 1609 also completes a circuit for the operation of the transmitting distributor 1501 and start magnet 1504 from battery through the center set of right-hand break contacts of relays 2002, 1813, 1809, and 1613, the center set of right-hand operated contacts of relay 1609, operated contacts of relay 1503 to ground through the winding of the start magnet 1504 and switch 1505. This causes the start magnet 1504 to operate and in turn to release the transmitting distributor 1501 for transmission of impulses over the receiving channel of party line 201. The next combination of impulses transmitted from the subscriber's station may be a "Letters" signal in case transmission is at high speed to insure sufficient time for the operation of the various relays described above. In case of slow speed signals this "Letters" combination may be omitted. The next combination will be a "Figures" signal. When this combination as perforated in the tape 1401 by the receiving reperforator 1402 at the central station reaches the transmitting distributor 1501 it will be transmitted over receiving channel 206 of party line 201. The receiving relays 701, 801, 851 and 901 respond to this "Figures" combination and repeat it to the respective selecting magnets. The selecting magnets at all of these stations cause the selector to actuate a member corresponding to the platen of a teletypewriter to its "Figures" position. This causes contacts 720 at station A and 920 at station D to close. These contacts remain closed as long as this platen member remains in its "Figures" position, that is, until a "Letters" combination is received by the respective selecting magnets. The selecting magnets 802 and 852 at stations B and C cause the selecting equipment at these stations to be operated in a similar manner.

The next combination which will be transmitted from the subscriber's station will be an activating signal which, when received by the selecting magnets at each of the stations A, B, C and D, will momentarily close the activating contacts 721 at station A and 921 at station D. Corresponding contacts will be closed at stations B and C. The closure of the contacts 721 completes a circuit for the operation of relay 703 from ground through the operated contacts of relays 720 and 721 to battery through the winding of relay 703. Relay 703, in operating, completes a locking circuit for maintaining itself operated from ground through the operated contacts 720 and left-hand operated contacts of relay 703 to battery through the winding of relay 703. Similar circuits cause the operation of relay 903 at station D as well as corresponding relays at stations B and C. The next combination transmitted from subscriber's station M will be a selecting combination which will select the particular station for which the following message is intended. Under the assumed condition, this message is intended for station D. When this code combination is received by all of the selecting mechanisms connected to the party line 201 they will cause a pull bar, say the "D" pull bar to be operated. The particular pull bar selected by this combination is provided with contacts 922 at station D. The corresponding or "D" pull bar is not provided with any contacts, however, at stations A, B or C. Consequently, when this combination is received by the selecting mechanisms at all of these stations only contacts 922 will be closed. The closure of contacts 922 completes a circuit for the operation of relay 904. Operation of relay 904 completes an obvious circuit for lighting lamp 933 to indicate that the receiving equipment at station D is connected to the receiving channel of party line 201. Operation of relay 904 completes a circuit for maintaining itself operated from battery through its winding, the break contacts of relay 905 and operated contacts of relay 904 to ground.

The operation of relay 904 also completes a circuit for the operation of relay 907 from ground through the right-hand operated contacts of relay 904, right-hand break contacts of relay 906 to battery through the winding of relay 907. The operation of relay 907 connects the receiving relay 948 in series with the receiving channel of party line 201 and thus conditions the receiving teletypewriter at station D to receive the impulses transmitted over this channel from the reperforator 1402 and tape control transmitter 1501 at the central station. Following this selecting group of impulses, a "Letters" signal is transmitted from the subscriber's station, which is recorded by the reperforator 1402 and transmitted by the transmitting distributor 1501. When this "Letters" signal is received by the selecting magnets of the selectors at stations A, B, C and D it will cause the selecting mechanisms at these stations to move the platen member to its "Letters" position, thus interrupting contacts 720 and 920 at stations A and D and corresponding contacts at stations B and C. The opening of contacts 720 interrupts the locking circuit of relay 703, thus permitting this relay to release. The opening of contacts 920 interrupts the locking circuit of relay 903 and thus permits this relay to release. The circuits at stations B and C operate in a similar manner.

The subscriber will now transmit the message which will be received by the reperforator 1402 at the central station, perforated in tape 1401, transmitted from the tape control transmitter 1501 to the receiving magnet 948. Receiving magnet 948 will repeat the message currents to the printing magnet 949 which causes the receiving teletypewriter at station D to record the message. The line relays and selecting magnets of the selecting mechanisms at stations A, B, C and D all receive and respond to the impulses representing the message. However, these message currents do not cause the selectors to alter or switch any of the circuits at these stations, because the switching equipment has been effectively deactivated or disconnected from the selecting mechanisms and remains so disconnected until the proper activating signals are again received by the selecting mechanisms.

*End of transmission from a subscriber's station*

Assume now that after the transmission has progressed for a time from station M to station D and that the message from station A to the central station has been completed. At the completion of this message the subscriber at station A will perforate a "Figures" signal in the tape, followed by a switching signal. The "Figures" signal will cause the receiving magnet 1012 at the central station to operate the receiving apparatus to its upper case position. The switching signal combination will then cause it to momentarily open contacts 1020. This interrupts the locking circuit of relay 1013 thus permitting this relay to release. The release of relay 1013 connects battery to the upper winding terminal of the receiving magnet 1012 and holds this magnet in its marking position, thus preventing it from following any signaling impulses transmitted over the transmitting channel of the party line 201. The release of relay 1013 also interrupts the battery connected to the upper winding terminal of the selector magnet 1016, thus permitting this magnet to follow any additional signaling impulses transmitted over this channel.

If the subscriber at station A has additional messages to be transmitted to other stations in the system, he will perforate the desired switching information in tape 501 at the subscriber's station A, after which he will perforate this tape in accordance with the messages to be transmitted. In this case the system will operate as described above when transmission was first initiated from station A.

Assume now that no more messages are available for transmission from station A at this time and that the subscriber at station A wishes to terminate transmission from his station and indicate this information to the operator at the central station. The operator at the subscriber's station will then perforate a blank signal in his tape, followed by the "K" signal, which in turn is followed by a special blank signal recorded in the tape by operating the special key 615 of the keyboard perforator.

When the blank signal is received by the reperforator it causes the No. 6 contact to close as described above and perforates a hole in the sixth position in the tape.

In case the previous message had been transmitted to the reperforator at the central station, the operation of the No. 6 contact of the reperforator at this time would cause relay 1005 to release and restore the circuit of the reperforator to normal. However, since the previous message had been transmitted to the receiving teletypewriter 1011 and since its circuits together with the circuit of the reperforator were returned to their normal condition by the operation of contacts 1020, reception of this blank signal does not perform any useful function at the central station at this time.

When the "K" signal is received, which signal combination has a marking first, second, third and fourth impulse and a spacing fifth impulse, it causes the reperforator to close the first, second, third and fourth contacts without actuating the fifth contact. In addition, the common contacts 1019, which close once for each code group of signaling impulses received by the reperforator, are also actuated. The operation of these contacts completes a circuit for the operation of relay 1005 as described above. Relay 1013, however, does not operate because the No. 5 contacts are not actuated. The details of circuits for controlling these relays at this time operate as described above.

The operation of these contacts also completes a circuit for the operation of relay 1022 from battery 1025 through the right-hand break contacts of relay 1022, winding of relay 1022, left-hand break contacts of relay 1022 normal contacts No. 5, the operated common contacts 1019, right-hand break contacts of relays 1005 and 1013, normal contacts 1020 of the receiving teletypewriter to ground through the normal No. 6 contacts of the reperforator. If any one of the contacts 1 through 4, inclusive, is not operated and remains in its unoperated condition, ground is also connected to the right-hand winding terminal of relay 1022 through the No. 6 contacts of the reperforator, the contacts 1020 of the receiving teletypewriter, right-hand break contacts of relays 1013 and 1005, operated common contacts 1019 and operated contacts of any of the contacts 1 through 4 to the right-hand break contacts of relay 1022, thus preventing relay 1022 from operating. However, in case all of these contacts 1 through 4 are operated, relay 1022 will operate in the path described above. The operation of relay 1022 completes a circuit for maintaining itself operated from battery through its right-hand operated contacts, winding of relay 1022 and its operated left-hand inner contacts, lead 1023 to ground through the right-hand outer break contacts of relay 2002. Operation of relay 1022 also connects battery over lead 1024 to light lamp 2007 which indicates to the operator at the central station that the transmission has ceased over the transmitting channel of party line 201, whereupon she will operate a key to start transmission from another one of the stations connected to the party line. Following the "K" signal perforated in the tape at the subscriber's station, the subscriber will perforate a special blank signal, by means of key 615, in the tape. He will then perforate another "K" signal, followed by this special signal and repeat this combination a number of times. When the subscriber operates key 615 a special sixth hole is perforated in the tape at the subscriber's station. When this perforation reaches the tape transmitter it causes the No. 6 contacts to be closed. This completes a circuit for operating relay 708 from ground through the No. 6 contacts of the tape transmitter, lead 534 to battery through the winding of relay 708. The operation of relay 708 interrupts the locking circuit of relays 710 and 711, thus permitting these relays to release. The release of relay 710 completes a locking circuit for maintaining relay 708 operated and operating relay 709 from ground through the left-hand inner break contacts of relay 710, winding of relay 709, right-hand operated contacts of relay 708 to battery through the winding of relay 709. Release of relay 710 short-circuits the transmitting contacts of transmitting apparatus at subscriber's station A and thus effectively disconnects this apparatus from the transmitting channel of the transmitting apparatus at station A. The release of relay 710 also interrupts the operating circuit of the start magnet 502 of the tape transmitter at the subscriber's station A, thus stopping the operation of this transmitter. The tape transmitter will then be stopped with the next letter "K" signal under or over the pins controlling the contacts. If the operator at the central station should again attempt to start transmission from subscriber's station A before the subscriber has any additional messages perforated in his tape, a letter "K" signal will be immediately transmitted to the central exchange, causing lamp 2007 to light to indicate to the operator at the central exchange that the subscriber at station A has nothing further to transmit. The tape will then be advanced so that the special blank signal with a hole perforated in the No. 6 position of tape 501 will actuate the tape transmitter at the subscriber's station A and cause the transmitting apparatus at the subscriber's station to be again disconnected from the transmitting channel 205 of the party line 201. The last signal combination transmitted from the subscriber's station at the end of transmission as described above is always a blank or all-spacing signal combination. This combination when received by the reperforator 1002 at the central office causes a hole to be perforated in the sixth position in the tape as described above and causes the No. 6 contact of the reperforator to be momentarily opened. The momentary operation of this No. 6 contact interrupts the locking circuit of relay 1005 thus permitting this relay to release.

If this blank signal combination is the end of transmission from the party line 201, relay 1015 will remain on its marking contact sufficiently long to allow the slow release relay at 1006 to release. The release of relay 1006 completes the circuit for the operation of relay 1021 from battery through the break contacts of relay 1006, winding of relay 1021 through ground to the left-hand break contacts of relay 1005. The operation of the relay 1021 completes a locking circuit for maintaining itself operated as described above.

The operation of relay 1021 also prepares a circuit for the operation of relay 1003 from battery, from the break contacts of relay 1006, the left-hand operated contacts of relay 1021, the right-hand break contacts of relay 1004 to the lower terminal of the winding of the relay 1003.

Then when the supply of tape between the reperforator 1002 and the tape transmitter 1101 is reduced to a predetermined minimum quantity contacts 1102 will open and permit relay 1103 to release. The release of relay 1103 completes the circuit of relay 1003 and causes this relay to operate. The operation of relay 1003 causes the tape fed-out magnet to operate and after an interval of time lamps 1009 to light as described above. The operator will then operate key 1010 to stop the automatic operation of the reperforator 1002 and thus return the equipment to its normal condition.

The above described operations are repeated each time messages are transmitted from the subscriber's station. In case the subscriber has no additional tape perforated for transmission the letter "K" signal followed by the special blank signal is perforated in the tape 501 by the subscriber and transmitted over the line to the central office.

Relay 1006 is operated upon the reception of the first spacing impulse and interrupts the locking circuit of relay 1004. The letter "K" signal will cause relay 1005 to be operated and lock operated. The following blank signal will cause relay 1005 to be released and then when relay 1006 releases relay 1021 will be operated and complete the circuit for the operation of relay 1003 as described above whereupon the operation of automatically perforating an additional supply of tape is repeated.

Assume now that the operator at the central station upon observing the lighted lamp 2007 wishes to start the transmitter at station D. The operator will momentarily operate key 2008. This will cause relays 1901 and 2002 to operate in series. The operation of relays 1901 and 2002 completes a path for the operation of relay 1907 and for locking relays 1901 and 2002 operated. The operation of relay 2002 connects the receiving channel of the party line 201 to the transmitting distributor 1910. However, this distributor is held at rest because the start magnet 1930 has not as yet been operated. The operation of relay 2002 interrupts the battery connected to the circuit through its center set of its right-hand contacts. This interrupts the circuit of the start magnet 1504 of the transmitting distributor 1501 and at the end of the revolution of brush arm 1512 then in progress, brush arm 1512 will come to rest on a stop segment 1912 maintaining a receiving channel of the party line 201 in its marking condition. Approximately one-third of a second after relay 1907 operates, during which time brush arm 1512 completes the revolution then in progress, relay 1917 will be operated.

It should be noted that during this one-third of a second the code combination being then transmitted to the receiving teletypewriter to the receiving relay 948 and printer magnet 949 of the teletypewriter at the subscriber's station D will have been completed so that the proper character will be recorded on the teletypewriter. Then when relay 1917 operates, it completes a path for the operation of the start magnet 1930. Start magnet 1930 releases the transmitting distributor 1910 which thereupon makes a revolution and transmits a blank signal combination over the receiving channel of the party line 201 to all of the selecting mechanisms at stations A, B, C and D connected to this line. This blank signal combination is also received by selecting magnet 949 of the receiving teletypewriter at station D. The reception of this blank combination by this apparatus is not recorded by it, hence it does not add any character to the message being received at station D. The line relays 701, 801, 851 and 901 of the permutation code selectors at the respective stations A, B, C and D respond to this blank code combination, which is a code combination in which the start and selecting impulses are spacing, and repeats it to the respective selecting magnets 702, 802, 852 and 902. The selecting magnets 702 and 902 cause the corresponding selecting mechanisms to close contacts 713 and 913 and a short interval of time later, contacts 715 and 915. Corresponding contacts are provided at stations B and C but have not been shown. It is to be understood, however, that the mechanisms at these stations are similar to mechanisms shown in Figs. 7 and 9 and operate in substantially the same manner. The operation of contact 713 completes an obvious circuit for the operation of relay 706. Likewise, the operation of contacts 913 completes an obvious circuit for the operation of relay 906. The subsequent operation of contacts 715 and 915 produces no useful function at this time because the circuits through these contacts are open at the break contacts 713 and 913.

Returning now to the central exchange, during the first part of this revolution cam 1915 opens the contacts 1914 and interrupts the locking circuit of relay 1926, allowing this relay to release.

When contacts 1914 open, they also interrupt a circuit through the upper winding 1917, thus causing this relay to be operated to its right-hand position, where it interrupts the circuit of the start magnet 1930. Start magnet 1930 will then release and latch 1920 engage the stop cam 1921 at the end of this first revolution. A short interval of time before the end of this revolution cam 1915 again closes contacts 1914 which completes a circuit for the operation of relay 1928. The operation of relay 1928 connects the contacts of relay 1901 through 1906 to the receiving channel of the party line 201. The operation of relay 1928 completes a locking circuit for maintaining itself operated and prepares a circuit for the operation of relay 1929.

Closure of contacts 1914 also completes a circuit for the operation of relay 1917. Approximately one-third of a second after contacts 1914 reclose, relay 1917 is again operated to its left-hand position and causes start magnet 1930 to reoperate. The operation of the start magnet 1930 completes a circuit for the operation of relay 1929. Relay 1929, in operating, completes a locking circuit for maintaining itself operated and prepares the circuit for the operation of relay 1919. Relay 1919, however, does not operate at this time because ground is connected to both of its winding terminals. Start magnet 1930, in operating, also releases the transmitting distributor 1910 whereupon brush arm 1927 makes a second revolution and transmits a code combination of impulses over the receiving channel of line 201 to each of the stations A, B, C and D connected to this line.

Figure 8:
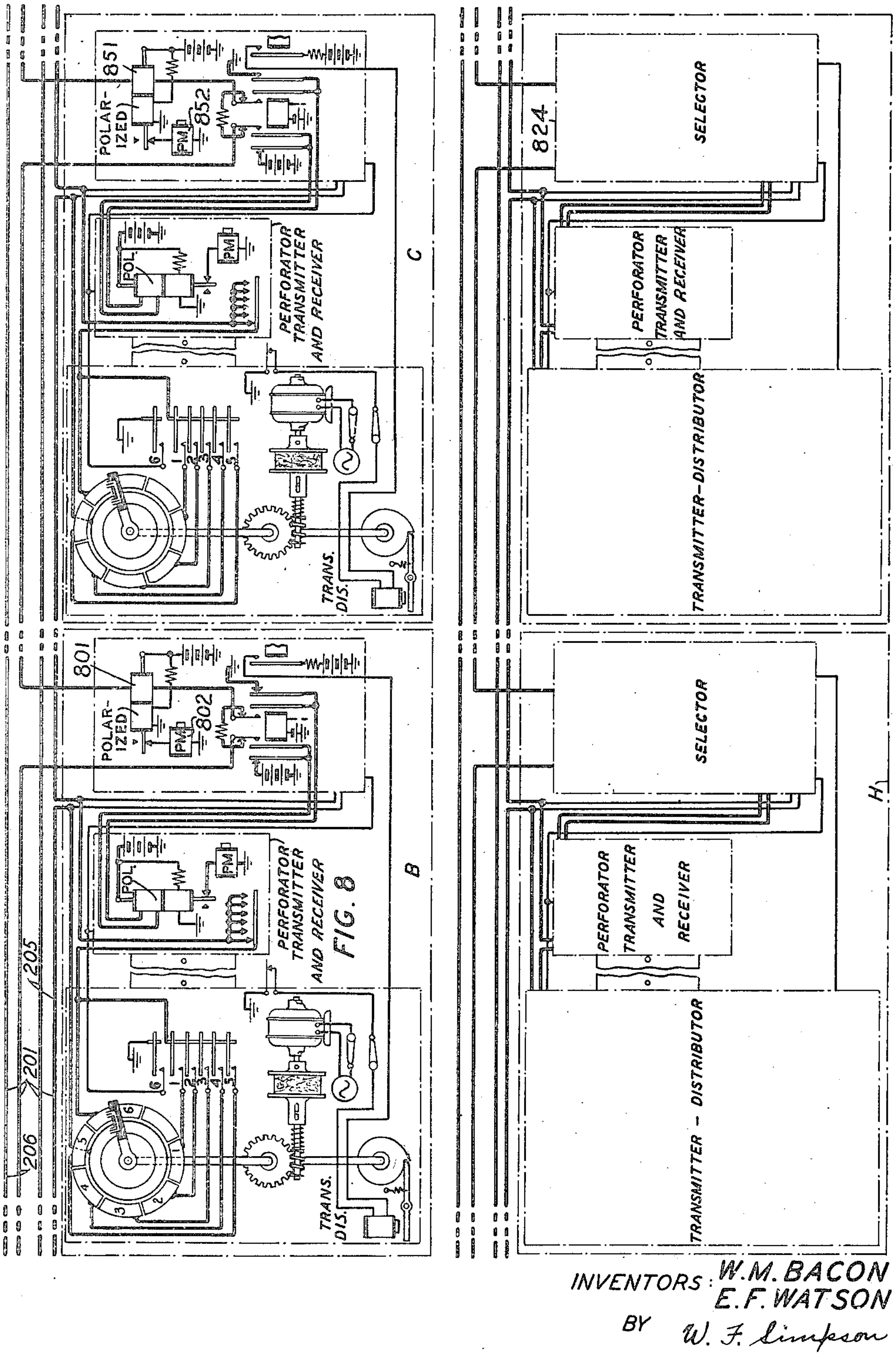

The receiving relays 701, 801, 851 and 901 respond to this second code combination and repeat it to the respective selecting magnets. These selecting magnets cause the selectors to operate a corresponding pull bar of the selecting mechanism at each of these stations. The pull bars selected by this code combination at stations A, B and C, shown in Figs. 7 and 8, are not provided with contacts. The pull bar selected by this combination at station D causes contacts 1914 to close. A short interval of time later contacts 1915 close but do not perform any useful function at this time because the circuit through these contacts is interrupted by the actuation of contacts 914.

Contacts 715 at station A and the corresponding contacts at stations C and D also close at this time. The operation of contacts 715 completes a circuit for the operation of relay 712 from battery through the winding of relay 712, the left-hand, outer, operated contacts of relay 708, operated contacts 715, break contacts 714 and 713 to ground. The operation of relay 712 interrupts the locking circuit of relay 706 and thus permits this relay to release. Corresponding relays at stations B and C operate in a similar manner.

At station D the operation of contacts 914 completes a circuit for the operation of relay 910 from battery through the left-hand winding of relay 910, operated contacts of relay 906 to ground through the actuated contacts 914 and normal contacts 913. The operation of relay 910 interrupts the locking circuit of relays 908 and 909, permitting these relays to release. Relay 909, however, is slow to release and does not immediately release. The operation of relay 910 also completes a circuit for maintaining itself operated and for operating relay 911 from battery through the right-hand winding of relay 910, its right-hand operated contacts, winding of relay 911, the left-hand inner break contacts of relay 908 to ground. The operation of relay 911 interrupts the locking circuit of relay 906 and permits this relay to release. The operation of relay 911 completes a circuit for the operation of the slow operate relay 918. After relay 906 has released, relay 909 will finally release and relay 918 operate which again prepare a locking circuit for relay 906 when it is again operated.

The operation of relay 910 also removes the short circuit from the transmitting contacts of the transmitting apparatus at station D and thus effectively connects these contacts to the transmitting channel of the party line 201.

Station D may now transmit messages to any of the other stations in the system in the same manner as described above.

Returning again to the central exchange a short interval after the beginning of this second revolution, cam 1915 will again open contacts 1914 and interrupt the circuit through the upper winding of relay 1917. Relay 1917 will thereupon be operated to its right-hand position where it will interrupt a circuit through the start magnet 1930 and release the stop latch 1920 which will engage the stop cam 1921 at the end of this second revolution. Relay 1917, in operating to its right-hand position, removes the ground from the upper winding of terminal of relay 1919, thus permitting this relay to operate. Shortly before the end of this second revolution, cam 1915 will again reclose contacts 1914 and complete a circuit through the upper winding of relay 1917. Approximately one-third of a second later, during which time the switching relays at the subscribers' stations have adequate time to operate in the manner described above, relay 1917 will again be operated to its left-hand position where it completes the circuit for the operation of relay 1908. The operation of relay 1908 interrupts the operating circuit of relay 1907 and allows this relay to release. The release of relay 1907 interrupts the locking circuit of relays 2002 and 1901, thus allowing these relays to release. Relay 1907, in releasing, completes a circuit for the operation of relay 1926 from battery through contacts 1914, winding of relay 1926 to ground through the left-hand break contacts of relay 1907. Relay 1926, in operating, interrupts a locking circuit of relays 1928 and 1929, thus allowing these relays to release. The release of relay 1907 also interrupts the circuit through the upper winding of relay 1917, thus allowing this relay to release. Relay 1929, in releasing, interrupts the operating circuit of relay 1919, thus permitting this relay to release. The release of relays 1919 and 1917 interrupts the operating circuit of relay 1908 and allows this relay to release and thus restores the automatic transmitter circuit to normal.

The release of relay 2002 reestablishes a circuit for the operation of start magnet 1504, whereupon transmission of signals to the receiving teletypewriter at station D will be resumed.

In the absence of line hits or machine or electrical failure none of the signaling impulses representing any of the characters of the message being transmitted to the receiving teletypewriter at station D are altered or mutilated in any way and that no additional characters are recorded by this teletypewriter incident to the recording of the message.

Assume that the messages are perforated in tape 900 at station D and that the first message is intended for station H it will be transmitted to the reperforator 1002 at the central station which will cause tape to be perforated in accordance with the message. These perforations will pass through the tape transmitter 1101 and cause this transmitter to be connected to the receiving channel of party line 202 in a manner similar to the manner described above. Thereafter, the message will be retransmitted by tape transmitter 1101 to the receiving channel of party line 202 and cause the selecting equipment 824 at station H to connect receiving apparatus to this station to the receiving channel after which the message will be recorded at station H.

*The central station operator stops transmission from a subscriber's station*

Assume now that the transmission from station M, as described above, has not been completed but that for some reason the operator at the central station wishes to interrupt this transmission and start transmission from station K. To accomplish this, the operator at the central station will operate the stop key 2009 which will cause the operation of relays 2004 and 1906 in series. The operation of relays 1906 and 2004 will complete a circuit for maintaining relays 2004 and 1906 operated and will cause relay 1907 to operate. Operation of relay 2004 connects the transmitting distributor 1910 in series with the receiving channel of party line 203 to station K. If, as under the assumed conditions, no messages are being transmitted over this receiving channel, the operation of relay 2004 performs no other useful function at this time. However, in case messages are being transmitted from one of the transmitting distributors at the central exchange over the receiving channel of party line 203, the operation of relay 2004 will interrupt the operating circuit of the start magnet of this transmitter and cause it to come to rest after completing the code combination then in progress of transmission. Approximately one-third of a second after relay 1907 operates, relay 1917 will be operated and complete a circuit for the operation of the start magnet 1930 which in turn releases the transmitting distributor 1910 and causes brush arm 1927 to make one revolution during which time a blank signal, that is, a single code combination in which all of the impulses are spacing, is transmitted over the receiving channel of the party line 203 to station K. Receiving relay 1301 of the selecting mechanism at station K will respond to this code combination and repeat it to the selecting magnet 1302.

The selecting magnet 1302 will cause the blank contacts 1313 to be operated for a short interval of time. A very short interval of time after contacts 1313 have been operated, contacts 1315 will be momentarily operated and then released before contacts 1313 are released. Inasmuch as contacts 1313, in operating, interrupt the circuits of contacts 1315 during the entire interval of time during which these contacts are operated, contacts 1315 perform no useful function at this time. The operation of contacts 1313 complete an obvious circuit for the operation of relays 1339, 1340 and 1341. The operation of relays 1339, 1340 and 1341 complete a locking circuit for maintaining themselves operated.

Returning now to the central station, near the beginning of this first revolution of the brush arm 1927 cam 1915 opens contacts 1914. This interrupts the locking circuit of relay 1926 and permits this relay to release. Contacts 1914, in opening, also interrupt the circuit through the upper winding of relay 1917, thus allowing this relay 1917 to release and, in turn, releases start magnet 1930. Start magnet 1930 releases, causing the stop latch 1920 to engage the stop cam 1921 at the end of this first revolution. Near the end of this first revolution of brush arm 1927, during which a blank signal is transmitted over the receiving channel of party line 203, cam 1915 will reclose contacts 1914. Contacts 1914, in reclosing, complete a circuit for the operation of relay 1928. Relay 1928, in operating connects the contacts of selecting relays 1901 to 1906 to the transmitting distributor 1910 and to the receiving channel of party line 203.

Approximately one-third of a second after contacts 1914 are closed relay 1917 is again operated to its left-hand position where it again completes a circuit for the operation of start magnet 1930. Start magnet 1930, in operating, completes a circuit for the operation of relay 1929. Relay 1929 completes a circuit for maintaining itself operated and connects ground to the lower winding terminals of relay 1919. Relay 1919, however, does not operate at this time because ground is connected to both of its winding terminals. Start magnet 1930 in operating withdraws the stop latch 1920 from its stop cam 1921, thus permitting the distributor brush arm 1927 to make a second revolution and transmit a second code combination over receiving channel of party line 203 to station K. During this revolution marking impulses will be transmitted during the second and fifth impulse intervals and spacing impulses during the first, third and fourth impulse periods since relay 1906 is operated at this time. These impulses are transmitted to a subscriber K where line relay 1301 repeats them to the selecting magnet 1302. Magnet 1302 responds to these impulses and causes the selecting mechanism to momentarily close contacts 1315. Contacts 1315, in closing, complete a circuit for the operation of relay 1342 from battery through the left-hand winding of relay 1342, the operated contacts of relay 1339, 1340 or 1341, operated contacts 1315 and unoperated contacts 1317, 1316, 1314 and 1313 to ground. The operation of relay 1342 interrupts the locking circuit of relays 1347 and 1345. Relay 1345 is slow in releasing and does not release immediately. The release of relay 1347, however, completes a circuit for locking relay 1342 operated and for operating relay 1343 from battery through the right-hand winding of relay 1342, right-hand operated contacts of relay 1342, winding of relay 1343, the left-hand inner break contacts of relay 1347, 1346, 1344 to ground. The operation of relay 1343 interrupts the locking circuit of relays 1339, 1340 and 1341, thus permitting these relays to release. A short interval of time after the release of these relays, relay 1345 releases and prepares another locking circuit for these relays when they are again operated by transmitting the proper code combinations from the central exchange.

The release of relay 1347, as described above, interrupts the circuit of the start magnet of the transmitter at the subscriber's station M. This interrupts the operation of the tape transmitter to this station and prevents it from transmitting any more impulses over the transmitting channel of party line 203. The release of relay 1347, in addition, short-circuits the transmitting line extending to station M. This effectively disconnects the transmitting apparatus at this station from the transmitting channel of party line 203.

Returning now to the central station, shortly after the beginning of this second revolution of the brush arm 1927 cam 1915 opens contacts 1914 and permits relay 1917 to be operated to its right-hand position. Relay 1917, in operating to its right-hand position interrupts the circuit of the start magnet 1930 and causes it to release a stop latch 1920 which will thereupon engage stop cam 1921 at the end of this second revolution. The relay 1917, in operating to its right-hand position, removes ground from the upper winding terminal of relay 1919 and permits this relay to operate.

Near the end of this second revolution cam 1915 again recloses contacts 1914. Contacts 1914, in closing, again close a circuit through the upper winding of relay 1917. Approximately one-third of a second later, during which time the apparatus and relays at the subscriber's station as described above have adequate time to function, relay 1917 will again be operated to its left-hand position where it will complete a circuit for the operation of relay 1908. Relay 1908, in operating, will interrupt the operating circuit of relay 1907 and permit this relay to release. Relay 1907, in releasing, interrupts locking circuit of relays 2004 and 1906, permitting these relays to release. The release of relay 1907 completes a circuit for the operation of relay 1926. Relay 1926, in operating, interrupts the locking circuit of relays 1928 and 1929 and allows these relays to release. Relay 1926, in operating, also completes a locking circuit for maintaining itself operated under control of contacts 1914. The release of relay 1929 interrupts the operating circuit of relay 1919, thus allowing this relay to release which, in turn, releases relay 1908, thus restoring the transmitting distributor circuit to its normal condition. If the operator at the central station then wishes to start the transmission from station L, she will momentarily operate key 2010, whereupon the operation of the automatic transmitting distributor at the central station will be repeated and the transmission from station L started as described above with reference to the starting in the transmission from station M with the exception that contacts 1316 and relay 1346 will be operated at this time instead of contacts 1317 and relay 1347.

*Transmission from the central station*

Figure 17:
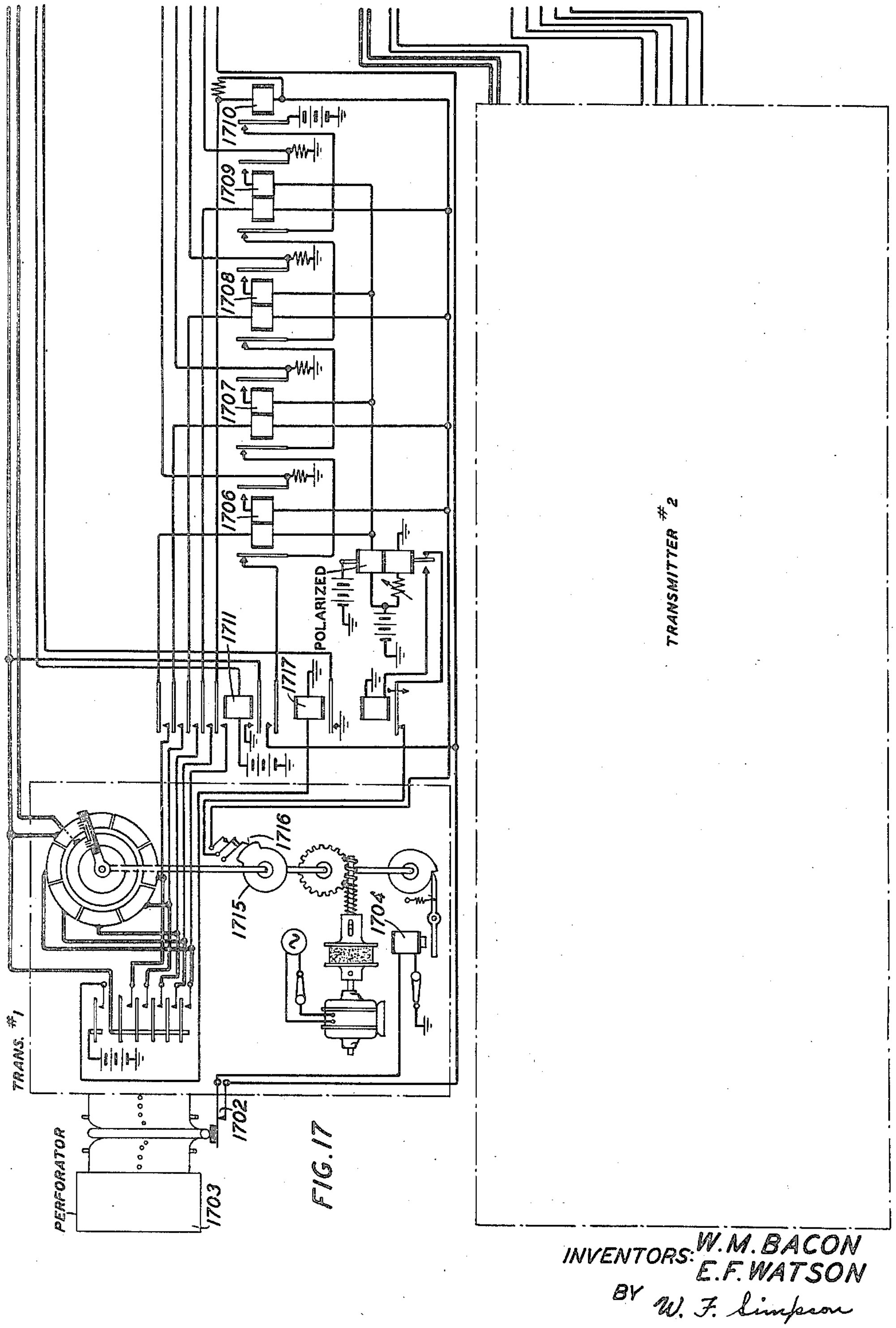
Figure 18:
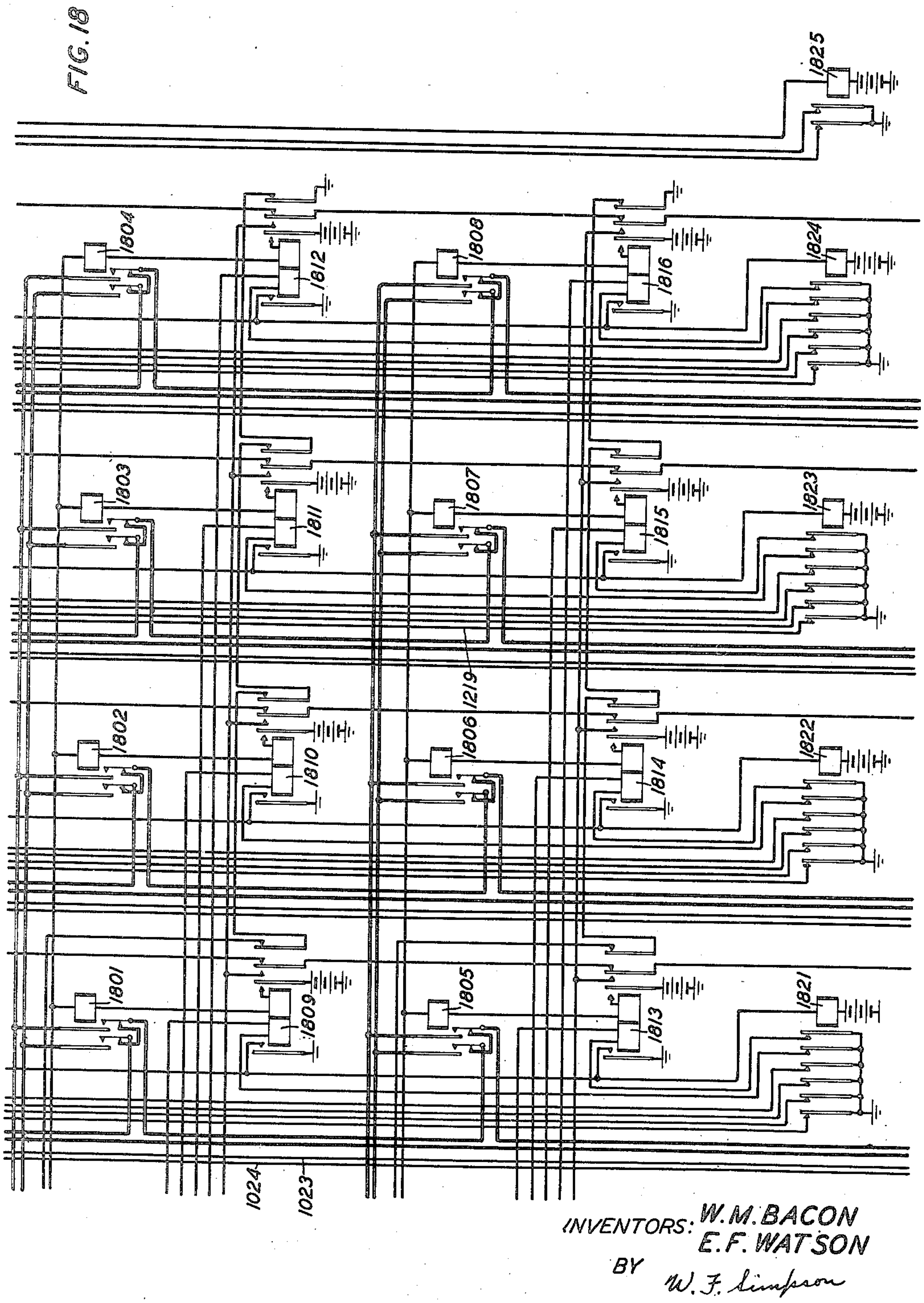
Figure 19:
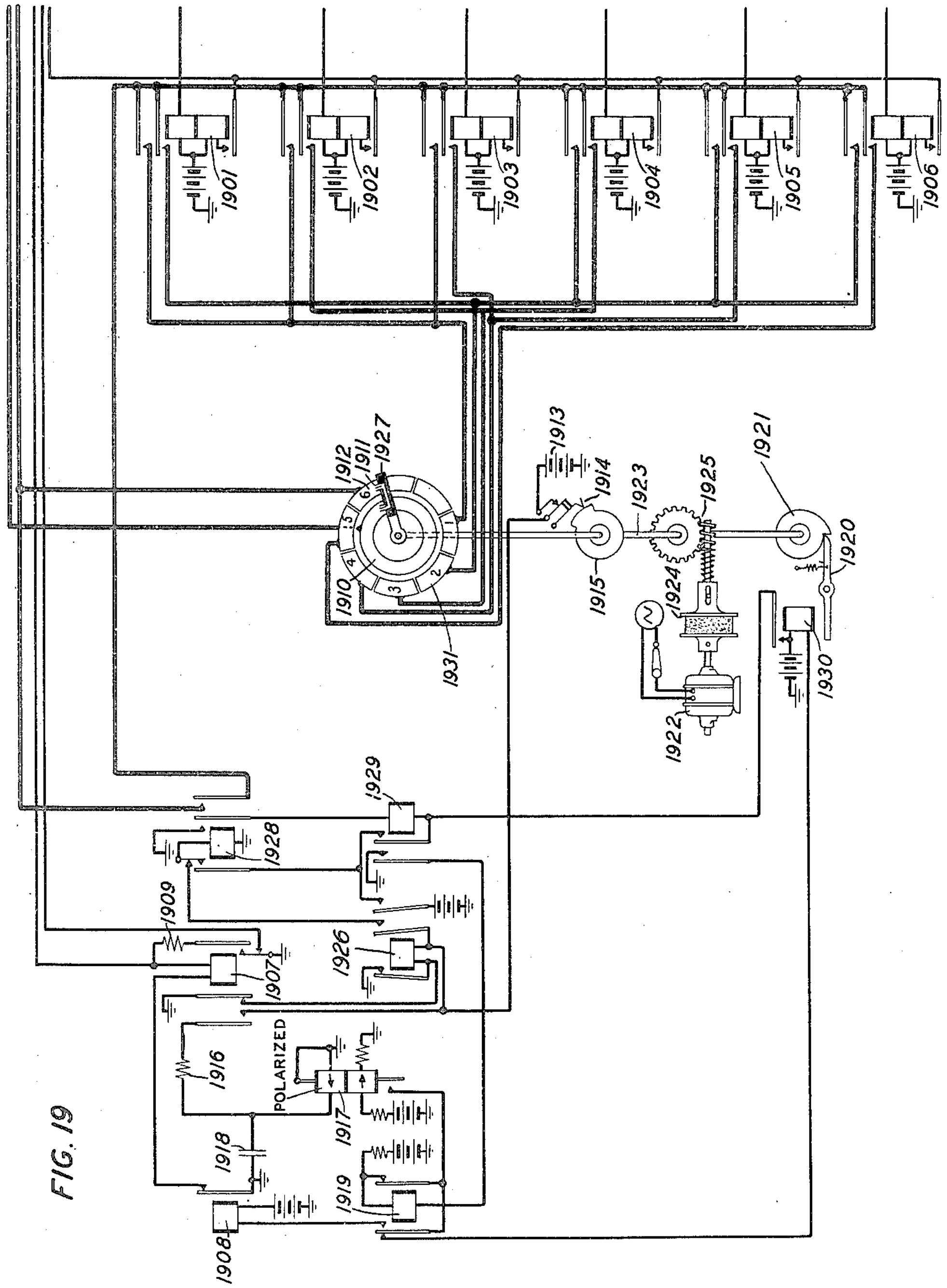

Messages may also be transmitted from the central station to any of the outlying subscribers' stations. Fig. 17, shows the transmitting apparatus required at the central station for transmitting messages to these outlying stations. It is also possible for messages to be transmitted simultaneously to two or more of the stations on any party line. For example, assume that the central station has a message intended for stations A and D connected to party line 201. The operator at the central station will operate the keyboard perforator 1703 in accordance with the message to be transmitted to these stations. Prior, however, to perforating the tape in accordance with the messages to be perforated, the operator at the central station will first perforate a blank signal in the tape, followed by a signal combination having a single marking impulse. If, as assumed, the messages are intended for party line 201, this combination will have only the No. 1 pulse marking and the second, third, fourth and fifth pulses spacing. Following this impulse the operator will perforate a letters signal in the tape where it is required to provide adequate time for the operation of the switching relays. Following this a figures signal is perforated in the tape and then an activating signal followed by one or more selecting signaling combinations. Under the assumed conditions two selecting combinations will be transmitted after the activating signal combination. Following this the letters signal will be transmitted and then the message.

When the blank signal, which will have a hole perforated in the sixth position in the tape, reaches the transmitting distributor 1701, it will cause the sixth tape controlled contact to operate and cause relay 1717 to operate. Relay 1717 would cause any previous connection to be interrupted. In case the transmitting distributor 1701 is idle, operation of this relay at this time produces no useful function. The single marking combination causes relay 1706 to be operated and then, when cam 1715 closes contacts 1716, relay 1809 is operated providing the receiving channel of the party line 201 is idle. If the receiving channel of party line 201 is busy, relay 1821 will be operated and the operation of relay 1821 removes the operating ground from all of the switching relays employed to connect the transmitters at the central exchange with the receiving channel of party line 201. If this channel is busy, relay 1809 will not operate until it becomes idle. Consequently, the transmitter-distributor 1701 will remain at rest during this interval. When the receiving channel of the party line 201 becomes idle, relay 1821 will release and permit relay 1809 to operate. Relay 1809, in turn, will cause relay 1801 to operate. The operation of these two relays connect the transmitting distributor 1701 to the receiving channel of party line 201, whereupon the transmitting distributor 1701 will transmit signaling impulses over this line in accordance with the remaining perforations in the tape.

In case two or more of the transmitting distributors have stored or are having stored in their respective tapes messages directed to any particular line at a time during which this line is busy, both distributors will wait until the line becomes idle. Then the switching relays corresponding to relays 1801 and 1809 of each distributor will be operated when relay 1801 releases. Relay 1801 will immediately reoperate and remain operated as long as any of these switching relays remain operated. The fact that two or more sets of relays operate, however, does not permit two transmitters to simultaneously transmit over the same channel. Only the lower transmitter will be permitted to transmit over the channel because the circuit through the start magnet of the upper transmitter will be interrupted at the lower switching relay corresponding to relay 1809. This relay, in operating connects battery to a circuit extending through the left-hand break contacts of relay 2002 and 1813, the central set of right-hand contacts of relay 1809, tape control contacts 1702 to ground through the winding of the start magnet 1705. The start magnet will operate in this circuit and release the transmitter, whereupon the transmitter will transmit signaling impulses over the receiving channel of line 201 in accordance with the perforations in the tape.

In case another set of switching relays above these relays operate at the same time, the circuit of the start magnet of this other transmitter will not be complete. Consequently, the distributors will remain at rest and maintain the circuit closed through it. Then, after the transmission was completed to this channel from the transmitting distributor 1701 and relay 1809 released, the circuit to the start magnet of the second transmitter would be completed, whereupon it would transmit its message over the receiving channel of party line 201.

Returning now to the assumed conditions where transmitter 1701 has a message intended for stations A and D of party line 201, a figures signal will be transmitted from distributor 1701 after the switching relays 1801 and 1809 have been operated. This figures signal is received by line relays 701, 801, 851 and 901 of the selectors at stations A, B, C and D. These relays respond to this signals combination and repeat it to the selecting magnets 702, 802, 852 and 902. The selecting magnets, upon receiving this combination, cause the selectors to actuate a member corresponding to the platen of a teletypewriter to its figures position where contacts 720 at station A and 920 at station D are closed. Corresponding contacts are closed at stations B and C. These contacts are maintained closed until a letters signal is received. Following the figures signal, an activating signal will be transmitted over this line and be received by the selecting magnets 702, 802, 852 and 902 of the permutation code selectors at stations A, B, C and D. The selecting magnets respond to this activating signal and cause selectors to close contacts 721 and 921 at stations A and D. Similar contacts are closed at stations B and C. Operation of contacts 721 completes a circuit for the operation of relay 703. Relay 703, in operating, completes a circuit for maintaining itself operated under control of the contact 720. Similarly, contacts 921 complete a circuit for the operation of relay 902 which also completes a circuit for maintaining itself operated under control of contacts 920. The next combination transmitted over the line will represent a selecting impulse for connecting a receiving teletypewriter apparatus at station A to the receiving channel of party line 201. This impulse will be received by all of the selecting magnets connected to the receiving channel at stations A, B, C and D. These magnets will all respond to these impulses and cause their selectors to actuate a pull bar. The actuated pull bar at station A will cause contacts 722 to be momentarily operated. The operation of these contacts completes a circuit for the operation of relay 704 from ground through the operated contacts 720, operated right-hand and left-hand contacts of relay 703, operated contacts 722 to battery through the winding of relay 704. Relay 704, in operating, completes a locking circuit for maintaining itself operated under control of relay 705. The pull bars actuated at stations A, B, C and D in response to this code combination do not close any contacts at these stations. Consequently, the relays at these stations remain in their previous condition.

The operation of relay 704 completes a circuit for lighting lamp 733 to indicate that the receiving apparatus at station A is connected to the receiving channel. The operation of relay 704 also completes a circuit for the operation of relay 707 from ground through the right-hand operated contacts of relay 704, the left-hand break contacts of relay 706 to battery through the winding of relay 707. Relay 707, in operating, connects the receiving relay 648 in series with the receiving channel of party line 201 so that this relay will now follow signaling impulses transmitted over the line and repeat them to the printer magnet 649 of the receiving teletypewriter at station A and cause these signals to be recorded.

The next signaling combination to be transmitted over the line will be the selecting combination required to connect the receiving apparatus at station D to the receiving channel of party line 201. This code combination will be received by the selecting magnets 702, 802, 851 and 902 and cause the corresponding selecting mechanisms to operate a pull bar. This pull bar will cause contacts 922 at station D to momentarily close and operate relay 904 in a circuit pointed out in detail hereinbefore. The pull bars selected by this combination at stations A, B and C are not provided with any contacts. Consequently, the circuits at these stations remain in their previous condition. The operation of relay 904 completes a circuit for the operation of relay 907 and the operation of relay 907 connects the receiving relay 948 in series with the receiving channel of the party line 201. This relay will repeat the signals repeated over this channel to the printing magnet 949 of the receiving teletypewriter at station D. The next signal combination transmitted over receiving channel of line 201 from the transmitting distributor 701 will be a letters signal. The selecting magnets of these stations will respond to this code combination and cause the selecting mechanism to position the platen member to its letters position, thus opening contacts 720 and 920 at stations A and D and corresponding contacts at stations B and C. The opening of these contacts interrupts the locking circuit of the relays 703 and 903 at stations A and D, respectively. Similar relays are released at stations B and C. The release of these relays effectively disconnects the switching system from these selecting mechanisms so that when the selecting mechanisms respond to the message signals transmitted over the system they do not cause any of the switching relays to operate or release.

Then, when the message impulses are transmitted from the transmitter 1701 over the receiving channel of the party line 201 they will be recorded on the receiving teletypewriters at both stations A and D. At the termination of this message the usual disconnect signals will be transmitted over this receiving channel. The same disconnect signal will disconnect the receiving teletypewriter at both stations A and D from the receiving channel of party line 201 and thus restore the stations equipment to their normal condition.

In the foregoing descriptions it has been assumed that the transmission was from the tape controlled transmitters. The transmission might equally well have been from the keyboard transmitters provided at the respective stations provided the lever 616 is in either its keyboard or K position or in its T-K or keyboard and tape position. The operation of the system is essentially the same under both of these conditions. It is, of course, necessary for the necessary switching information to be transmitted in this case from the keyboard prior to transmitting the message over the system. In case the keyboard is employed for transmission, it will be necessary to observe the counter which is operated by magnet 660 each time a message character is transmitted over this system. This is provided to indicate to the subscriber when it will be necessary to transmit a carriage return signal and a line feed signal to properly operate the receiving teletypewriter at the distant subscriber's station. The circuit of this counter is so arranged that the release magnet 661 will be operated when a carriage return signal is transmitted over this system so that it will be in a position to start counting the characters of the next line. The circuit of the counting magnet 660 is so arranged that it will not count various code combinations representing the various functions such as letters signals, figures signals, etc., transmitted from the keyboard.

The operation of the system for the transmission of messages from any station to any other station is substantially the same as described above for the various typical circuit connections. Each of the various communication paths will not be described in detail because they may be composed of any suitable type or combination of types communication paths which are well understood in the art and operate in their usual manner.

It should be noted, however, that any subscriber or station connected to the system may transmit messages (through the central switching office) to any other station connected to the system by perforating suitable switching information in the tape, or transmitting it from the keyboard, prior to the transmission of each message. Furthermore, any station may send multiple address messages to two or more or may broadcast to all of the stations connected to any party line in a manner similar to the manner described in detail above where it was assumed that the central station desired to transmit to stations A and D simultaneously. Likewise, the central station may simultaneously transmit to as many of the subscribers connected to any party line as may be desired.

Furthermore, any subscriber on a party line may transmit messages to any other subscriber on the same party line by transmitting suitable switching information to the central station over the transmitting channel. At the central station this switching information will serve to relay messages from the transmitting channel to the receiving channel of this party line in the same manner that it relays messages from the transmitting channel to the receiving channel of any other individual or party line.

Party lines 201 and 202 are provided with receiving teletypewriters individual to these lines. As described with reference to Fig. 10, messages received from these party lines 201 and 202 intended for the central station are recorded on these receiving teletypewriters. Receiving teletypewriters individual to each of the party lines are provided for only those party lines from which a substantial proportion of the originating messages are intended for the central station.

In case only a small proportion of the messages originating on a party line is intended for the central station, no receiving teletypewriter will be provided individual to the party line. Such party lines have been illustrated in Fig. 14 and terminate at the central station in a reperforator. Messages originating upon these lines intended for the central office are directed through the reperforators connected to these lines, the transmitting distributors controlled by the tape from these reperforators, and the switching equipment to the receiving teletypewriter 1630. The reperforators, transmitter-distributors and switching equipment connected to lines of this type operate in substantially the same manner as the equipment connected to the other type of party lines as described above. The receiving only teletypewriter 1630 acts just as if it were connected to a receiving only channel extending to another subscriber's station except that it is actually located at the central station, so that no geographically long telegraph line is connected between it and the central station.

It is also to be understood that this invention is not limited to the specific circuits of the preferred embodiment of this invention described in detail above because many modifications of these circuits and other circuits of a similar nature for performing the same functions will at once appear obvious to persons skilled in the art of automatically switching communication circuits. For example, a simple switching system is shown connected to the transmitting distributor which is capable of selecting five different circuits. It is to be understood, however, that other equivalently functioning types of switching circuit may be employed and may select as many communication circuits as may be desired without departing from this invention, the scope of which is defined in the following claims.

What is claimed is:

1. A communication system comprising a plurality of outlying stations, a central station, transmitting and receiving apparatus located at each of said outlying stations, a communication channel connected between each of said outlying stations and said central station for transmitting impulses from the transmitting apparatus at each of said outlying stations to said central station, a second communication channel connected between each of said outlying stations and said central station for transmitting impulses from said central station to said outlying stations, switching apparatus at said outlying stations connected to said second communication channel for connecting said transmitting apparatus to said first communication channel and for connecting said receiving apparatus to said second channel, and means at said central station for controlling said switching apparatus.

2. A communication system comprising a plurality of outlying stations, a central station, transmitting and receiving apparatus at each of said outlying stations, a communication channel connected between each of said outlying stations and said central station for transmitting impulses from the transmitting apparatus at each of said outlying stations to said central station, a second communication channel connected between each of said outlying stations and said central station for transmitting impulses from said central station to said outlying station, switching apparatus at each of said outlying stations connected to said second communication channel for connecting said transmitting apparatus to said first communication channel and for connecting said receiving apparatus to said second channel and means at said central station for controlling said switching apparatus, means at each of said outlying stations for transmitting a distinctive signal to said central station when all of the information available for transmission has been transmitted, and means at said central station for responding to said distinctive signal.

3. In a signaling system, a central station, a plurality of outlying stations, each comprising transmitting and receiving apparatus, a signal transmitting system connecting said outlying stations to said central station comprising a first line connected to each of said outlying stations and said central station for transmitting impulses from said outlying stations to said central station, a second line connecting each of said outlying stations and said central station for transmitting impulses from said central station to said outlying stations, and switching apparatus at each of said outlying stations connected to said second line for connecting said transmitting apparatus to said first line and for connecting said receiving apparatus to said second line in response to permutation code signals transmitted over said second line.

4. In a telegraph system, a central station, a plurality of outlying stations, each comprising transmitting and receiving apparatus, a telegraph transmission system connecting said outlying stations to said central station comprising a transmitting line connected to each of said outlying stations and said central station for transmitting impulses from said outlying stations to said central station and a receiving line connecting each of said outlying stations and said central station for transmitting impulses from said central station to said outlying stations, switching apparatus at each of said outlying stations connected to said second line for connecting said transmitting apparatus to said transmitting line and for connecting said receiving apparatus to said receiving line in response to permutation code signals transmitted over said receiving line, apparatus at said central station for interrupting communication over said receiving line without mutilating any of the code combinations of signaling impulses being transmitted thereover, means for transmitting the permutation code combinations of switching impulses, and means for reestablishing the communication over said receiving line without adding any additional code combinations to said message currents and without mutilating any code combinations of said message currents.

5. A selector responsive to permutation code groups of impulses, a first switching apparatus controlled by said selector, a second switching apparatus also controlled by said selector, means for energizing said first switching apparatus in response to a particular group of impulses, means for controlling said first switching apparatus by succeeding code groups and means for deenergizing said first switching apparatus by a second particular group of impulses, means for energizing said second switching apparatus in response to a third particular group of impulses, and means for deenergizing said second switching apparatus.

6. In a signaling system an incoming line, a selector controllable by permutation code groups of pulses connected to said incoming line, and a first group of switching devices controlled by said selector, means operated in response to a particular group of impulses for operatively connecting said first group of switching devices to said selector, a group of signal responsive devices connected to said first group of switching devices and means for selectively connecting said signal responsive devices to said incoming line under control of said selector and said first switching devices, means responsive to a second particular group of impulses for interrupting said operative connection, a second group of switching devices, means controlled by a third group of impulses for operatively connecting said second group of switching devices to said selector, means responsive to said third group of impulses for disconnecting the previously connected signal responsive device from said incoming line, apparatus controlled by said second group of switching devices and said selector, and means responsive to another group of impulses for interrupting said second operating connection and for restoring the connection between said previously selected signal responsive devices and said signaling line.

7. In a telegraph system, a plurality of telegraph stations, a telegraph line connected between said stations, telegraph transmitting and receiving apparatus located at each of said stations, a selector controllable by permutation code groups of impulses located at each of said stations, a first group of switching devices located at each of said stations, means for establishing an operative connection between said first switching devices at each of said stations and said selectors at each of said stations in response to a first particular permutation code group of impulses, means controlled by said selectors and said switching devices for selectively connecting at least one of the receiving devices at, at least, one of said stations to said telegraph line in response to succeeding code permutation groups of impulses, means responsive to a particular second permutation code group of impulses for interrupting the operative connection between said selectors and said first switching devices at each of said stations, a second group of switching devices at each of said stations, means at each of said stations responsive to a third permutation code group of impulses for establishing an operative connection between said second group of switching devices and said selectors at each of said stations, additional means responsive to said third permutation code group of signaling impulses for interrupting a previously established connection at any of said stations between the receiving apparatus thereat and said line, and means responsive to succeeding groups of permutation code impulses for selectively connecting the transmitting apparatus at one of said stations to said line and means responsive to other permutation code groups of impulses for interrupting said last mentioned operative connection and restoring the connection between said previously selected receiving device and said line.

8. In a telegraph system, a perforating apparatus controlled by received telegraph signals, a tape perforated by said apparatus in response to received telegraph signals, a tape-controlled telegraph transmitter, means for supplying said tape to said telegraph transmitter, automatic means for perforating said tape, an operative connection between said automatic means, said perforating apparatus and said tape-controlled transmitter for automatically perforating said tape, and means for controlling said operative connection in response to a particular group of signal combinations received by said perforating apparatus.

9. In a telegraph system, a perforating apparatus, a tape, a source of telegraph signals, an operative connection between said source of telegraph signals and said perforating apparatus for perforating tape in accordance with telegraph signals received from said source, a tape-controlled transmitter supplied operative independently of said tape with and controlled by said perforated tape, means responsive to a particular code group of telegraph signaling impulses received from said source, an operative connection between said perforating apparatus and said tape-controlled transmitter jointly controlled by said responsive means and the supply of tape between said perforating apparatus and said tape-controlled transmitter for automatically perforating an additional supply of tape, and additional means for controlling said operative connection for stopping the automatic perforation of said tape.

10. In a telegraph system, a perforating apparatus, a tape, a source of telegraph signals, an operative connection between said source of telegraph signals and said perforating apparatus for perforating tape in accordance with telegraph signals received from said source, a tape-controlled transmitter supplied with and controlled by said perforated tape, means responsive to a particular code group of telegraph signaling impulses received from said source, an operative connection between said perforating apparatus and said tape-controlled transmitter jointly controlled by said responsive means and the supply of tape between said perforating apparatus and said tape-controlled transmitter for automatically perforating an additional supply of tape, additional means for controlling said operative connection by said perforating apparatus for stopping the automatic perforation of tape, and manual means also controlling said operative connection for stopping the automatic operation of said perforating apparatus.

11. A telegraph system comprising a telegraph transmission system, a plurality of geographically separated telegraph stations connected to said telegraph system, a transmitting device located at each of said stations, means for normally disabling each of said telegraph transmitting devices, and means responsive to permutation code groups of impulses for selectively rendering only one of said disabling means ineffective at any given time.

12. A telegraph system comprising a plurality of telegraph stations, a telegraph line connected to said stations, a receiving device at each of said stations, disabling means for normally disabling each of said receiving devices, and apparatus responsive to permutation code groups of impulses for selectively rendering only one of said disabling means ineffective at any given time whereby one of said receiving devices may receive telegraph signaling impulses transmitted over said line.

13. A telegraph perforating mechanism comprising a receiving mechanism, a receiving magnet, a flexible tape, a selector mechanism controlled by said receiving magnet comprising elements each of which is positioned in response to a different impulse of a received code combination of impulses, a perforating means associated with each of said elements for perforating said tape in accordance with the received impulses, an additional selecting element, an additional perforating mechanism controlled by said additional element for perforating an additional hole in said tape, and control means for positioning said additional element under control of said first-mentioned elements.

14. A telegraph system comprising a telegraph line, a first telegraph transmitter connected to said line, a second telegraph transmitter connected to said line, at least one switching device connected to said telegraph line, at least two telegraph instruments controlled by said switching device, means for transmitting telegraph signaling impulses over said line from said first telegraph transmitter, means for disabling said first transmitter at the end of any code group of signaling impulses being transmitted over said line, and means for transmitting switching code groups of telegraph impulses from said second transmitter for controlling said switching apparatus.

15. A telegraph system comprising a telegraph line, a first telegraph transmitter connected to said line, a second telegraph transmitter connected to said line, at least one switching device connected to said telegraph line, at least two telegraph instruments controlled by said switching device, means for transmitting telegraph signaling impulses over said line from said first telegraph transmitter, means for disabling said first transmitter at the end of any code group of signaling impulses being transmitted over said line, means for transmitting switching code groups of telegraph impulses from said second transmitter for controlling said switching apparatus, and means for rendering ineffective said disabling means after said code groups of switching impulses are transmitted over said telegraph line.

16. A telegraph system comprising a first station, a second station, and a telegraph transmission system extending between said stations, a first and a second telegraph transmitting apparatus at said first station, a first and a second receiving apparatus at said second station, switching apparatus at said second station for connecting said first receiving apparatus to said transmission system, and switching apparatus at said first station for connecting said first transmitting apparatus to said transmission system, switching apparatus at said first station for automatically connecting said second transmitting apparatus to said system, means for automatically stopping said first transmitter at the completion of any code group upon the connection of said second transmitter to said transmission system, means at said second station responsive to the operation of said second transmitter for interrupting the connection between said first receiver and said transmission system, means at said first station for again initiating transmission from said first transmitter upon the disconnection of said second transmitter, and means at said second station for reestablishing a connection between said first receiver and said transmission channel at said second station upon the completion of transmission from said second transmitter.

17. In a telegraph system, a first station, a second station, a telegraph transmission system connected between said stations, a telegraph transmitter at said first station, means for connecting said transmitter to said transmission system, a signal responsive device at said second station connected to said telegraph transmission system, telegraph receiving apparatus at said second station, switching apparatus connecting said telegraph receiving apparatus to said transmission system, a special transmitter at said first station, switching equipment for connecting said special transmitter to said transmission system, apparatus operative upon the connection of said special transmitter to said transmitting system for automatically stopping the transmission from said first transmitter at the completion of the code group of signaling impulses then in progress of transmission, means for transmitting a special first signal from said special transmitter which is not recorded by said telegraph receiving apparatus for disabling said receiving apparatus, and means responsive to the last signal transmitted from said special transmitter at the completion of transmission therefrom for rendering said disabling means ineffective, and other means operative upon the disconnection of said special transmitter from said transmission system to again initiate transmission from said first transmitter.

18. A main signaling line, a selecting device responsive to permutation code groups of impulses received from said main signaling line, a first group of local lines, a second group of local lines, a switching system connected between said selecting device and said first group of local lines, and a second switching system connected between said second group of lines and said selecting device, means responsive to permutation code groups of signals received over said main line for energizing one of said switching systems and extending at least one of the lines of said first group of lines to said main signaling line, means responsive to other permutation code groups of impulses for energizing said second switching system and extending at least one of the local lines of said second group of lines to said main line, and means responsive to other permutation code groups of impulses for disconnecting the local lines of the respective groups from said main line.

19. In a communication system, a main line, a selecting device responsive to permutation code groups of impulses, a first group of local lines, a first switching system connected between said local lines and said selecting device, means responsive to permutation code groups of impulses received over said main line for energizing said switching system and for selectively extending the transmission path of said main line to any of said local lines, a second group of local lines, a second switching system connected between said selecting device and said second group of lines, means responsive to certain permutation code groups of impulses received over said main line to energize said second switching system and disable the transmission path between said first group of local lines and said main line, other means for selectively extending the transmission path of said main line to any of said second group of lines to said main line, and means responsive to other permutation code groups of impulses received over said main line to deenergize said second switching apparatus but maintaining the transmission paths between said second group of lines and said main line and reestablishing the path between previously selected local lines of said first group and said main line.

20. In a telegraph system, perforating apparatus controlled by received telegraph signals, a tape perforated by said apparatus in response to received telegraph signals, a tape-controlled telegraph transmitter, means for supplying said tape to said telegraph transmitter, means for automatically perforating tape, means responsive to a plurality of certain code groups of received telegraph signaling impulses, an operative connection between said perforating apparatus and said tape-controlled transmitter jointly controlled by said responsive means and the supply of tape between said perforating apparatus and said tape-controlled transmitter for automatically perforating an additional supply of tape, and means independent of said supply of tape responsive to any succeeding code group of impulses for interrupting the automatic perforation of said additional supply of tape.

21. In a telegraph system comprising an interconnecting station and a plurality of outlying stations, a party line terminating at said main station and extending to a plurality of said outlying stations, other telegraph lines extending to other outlying stations, means at said main station for transmitting signals between said telegraph lines, transmitting and receiving apparatus located at said outlying stations for transmitting and receiving over said party line, means at each of said outlying stations for normally disabling all of said transmitting and receiving apparatus at all of said outlying stations connected to said party line, and means for selectively rendering any of said disabling means ineffective.

22. In a telegraph system comprising an interconnecting station and a plurality of outlying stations, a party line terminating at said main station and extending to a plurality of said outlying stations, other telegraph lines extending to other outlying stations, means at said main station for transmitting signals between said telegraph lines, transmitting and receiving apparatus located at said outlying stations for transmitting and receiving over said party line, means at each of said outlying stations for normally disabling all of said transmitting and receiving apparatus at all of said outlying stations connected to said party line, apparatus for selectively rendering any of said disabling means ineffective, and means at said central station for controlling said last-mentioned apparatus.

23. A telegraph perforating mechanism comprising a receiving mechanism, a single receiving magnet, a flexible recording medium, a selector mechanism controlled by said receiving magnet comprising elements each of which is positioned in response to a different impulse of a received code combination of impulses, recording mechanism controlled by each of said elements for recording the received impulses on said medium, an additional selecting element, an additional recording mechanism controlled by said element for recording another signal on said medium, and control means for positioning said additional element for recording said other signal in response to only one specific setting of said first elements in response to a particular code combination received by said receiving mechanism.

24. In a telegraph system, a central station, a plurality of outlying stations, telegraph lines connected between said outlying stations and said central stations, a plurality of telegraph transmitters for transmitting over said lines, means for automatically and simultaneously connecting more than one of said telegraph transmitters to one of said lines, means for disabling all but one of the telegraph transmitters connected to said one line, and means operative at the end of transmission from the operative transmitter for disconnecting said transmitter from said line and rendering the disabling means of the succeeding transmitter ineffective.

25. In a telegraph system, a telegraph station, a plurality of telegraph lines connected to said station, a plurality of telegraph transmitters controlled by tape having permutation code groups of signals recorded thereupon, means for automatically connecting any of said transmitters to any of said lines and means for simultaneously connecting at least two of said transmitters to any one of said lines, apparatus for rendering all but one of the transmitters connected to any given line ineffective, and means responsive to a single code group of signals recorded by said tape for disconnecting each of said transmitters from said line in turn and for rendering ineffective the disabling means of a succeeding transmitter connected to said line.

26. A telegraph system comprising a telegraph station, a plurality of telegraph lines connected to said station, a plurality of telegraph transmitters located at said station, switching apparatus for connecting any of said transmitters to any of said lines, means operative upon the connection of any of said transmitters to any of said lines for applying a busy condition to said line, means responsive to said busy condition for preventing the connection of any other transmitters to said line, means responsive to the removal of said busy condition for connecting to said line all the transmitters conditioned to transmit thereto, and means for disabling all but one of the transmitters connected to said line and apparatus for rendering said disabling means ineffective one at a time upon the completion of transmission by each preceding transmitter.

27. In a telegraph system, a central telegraph station, a remote telegraph station, a telegraph line extending between said stations, a signal device located at said central station, a telegraph transmitter located at said remote station controlled by a tape having telegraph signals recorded thereupon, means at said central station for initiating the operation of said telegraph transmitter, and means responsive to certain signals recorded on said tape for stopping the operation of said transmitter and energizing said signal device at said central station.

28. A telegraph station comprising an incoming telegraph line, a receiving device responsive to permutation code groups of received impulses, switching apparatus including means for energizing said switching apparatus operated by said receiving device in response to certain permutation code groups received over said incoming line, a plurality of local telegraph circuits terminating in said station, means controlled by said receiving device and said switching apparatus for extending the transmission path of said incoming line to said local circuits selectively in response to certain received permutation code groups of impulses, and means responsive to all other permutation code groups of impulses for deenergizing said switching apparatus.

29. A telegraph system comprising a plurality of telegraph stations, telegraph channels extending to all of said telegraph stations, a telegraph receiving device located at each of said stations responsive to permutation code groups of telegraph signaling impulses received from said telegraph channel, switching apparatus at each of said stations, local telegraph circuits terminating at each of said stations, means responsive to one permutation code group of impulses for energizing the switching apparatus at at least a portion of said plurality of telegraph stations, means responsive to the succeeding group of permutation signals received from said channel for selectively extending the transmission path of said channel to one of the local circuits at one of said telegraph stations at which said switching apparatus is energized and for deenergizing said switching apparatus thereat, and means at all of the other stations for deenergizing their respective switching apparatus in response to the reception of said second group of permutation code impulses.

30. In a telegraph system, a selecting device responsive to permutation code groups of signaling conditions, a first group of selectable elements, a second group of selectable elements, means responsive to predetermined code groups of impulses for establishing an operative connection between said selecting device and said first group of selectable elements for causing said selecting device to select certain elements of said first group of selectable elements in response to succeeding permutation code groups of signaling conditions, and means operable independently of the selection of any of said first elements and responsive to other permutation code groups of signaling conditions for establishing an operative connection between said selecting device and said second group of selectable elements for causing said selecting device to select certain elements of said second group of selectable elements in response to succeeding code groups of signaling conditions.

31. In a telegraph system a selecting device responsive to permutation code groups of signaling conditions, a first group of selectable elements, a second group of selectable elements, means responsive to predetermined code groups of impulses for establishing an operative connection between said selecting device and said first group of selectable elements for causing said selecting device to select certain elements of said first group of selectable elements in response to succeeding permutation code groups of signaling conditions and means responsive to other permutation code groups signaling conditions for establishing an operative connection between said selecting device and said second group of selectable elements for causing said selecting device to select certain elements of said second group of selectable elements in response to succeeding code groups of signaling conditions, and means responsive to other permutation code groups of signaling conditions for disrupting said operative connections.

32. A selecting device responsive to permutation code groups of impulses, a first switching apparatus controlled by said selecting device, a second switching apparatus independent of said first switching apparatus also controlled by said selecting device, means for energizing said first switching apparatus in response to particular permutation code group of impulses, means for controlling said first switching apparatus by succeeding code groups, means operable independently of prior control of said first switching apparatus for energizing said second switching apparatus in response to another code group of impulses, and means for controlling said second switching apparatus by succeeding code groups of impulses.

33. A selecting device responsive to permutation code groups of impulses, a first switching apparatus controlled by said selecting device, a second switching apparatus independent of said first switching apparatus also controlled by said selecting device, means for energizing said first switching apparatus in response to particular permutation code group of impulses, means for controlling said first switching apparatus by succeeding code groups, means operating independently of said first switching apparatus for energizing said second switching apparatus in response to other permutation code groups of impulses, and means for controlling said second switching apparatus by succeeding code groups of impulses, and means for deenergizing said switching apparatus.

34. A selecting device responsive to permutation code groups of impulses, a first group of switching devices controlled by said selector, a second group of switching devices also controlled by said selector, means for energizing said switching devices, means responsive to particular permutation code group of impulses for deenergizing all of the switching devices of said first group, and means responsive to other particular permutation code groups of impulses for deenergizing all of said second group of switching devices.

35. A telegraph system comprising a telegraph transmission channel, a plurality of geographically separated stations connected to said channel, a record controlled telegraph transmitting device located at each of said stations, means for normally disabling each of said transmitting devices and means responsive to permutation code groups of impulses for selectively starting only one of said transmitting devices and rendering the associated disabling means ineffective at any given time.

36. In a telegraph system, a plurality of telegraph channels, a telegraph transmitter for transmitting permutation code groups of signaling conditions, a storage medium for controlling said transmitter, means responsive to a predetermined permutation code signal stored in said medium for causing said transmitter to automatically advance said medium through said transmitter irrespective of all except certain other specified signals stored in said medium, means responsive to said other specified code groups stored in said medium for selectively connecting said transmitter to at least one of said channels, and means also responsive to said last-mentioned permutation code groups stored in said medium for interrupting said automatic advance of said medium.

37. In a telegraph system, a tape controlled permutation code transmitter, a plurality of telegraph circuits, means for connecting said transmitter to said circuits, means responsive to particular permutation code groups of signals stored in said tape for causing said transmitter to advance said tape through it irrespective of all except certain other specified permutation code groups of signals stored in said tape, means responsive to said other permutation code groups of signals stored in said tape for selectively connecting said transmitter to said telegraph channels, other means responsive to said last-mentioned signals stored in said tape for stopping the advance thereof, and means responsive to the connection of said transmitter to any of said channels for causing said transmitter to transmit thereover the signals stored in said tape.

38. A telegraph system, a telegraph transmitter, a perforated tape for controlling said transmitter, a plurality of telegraph channels connectable to said transmitter, means responsive to predetermined signals stored in said tape for causing said transmitter to advance said tape without transmitting the subsequent signals perforated in said tape over any telegraph channels, and means responsive to other signals stored in said tape for stopping the automatic advance of said tape and selectively connecting said transmitter to at least one of said telegraph channels.

39. A telegraph system comprising a telegraph transmission system, a plurality of geographically separated telegraph stations connected to said telegraph system, a telegraph transmitting device located at each of said stations for transmitting telegraph signals only to a single station connected to said transmission system, means for normally disabling each of said telegraph transmitting devices, and means responsive to permutation code groups of impulses transmitted only from said single station for selectively rendering only one of said disabling means ineffective at any given time.

40. A telegraph system comprising a telegraph transmission system, a central station connected to said transmission system, a plurality of geographically separated telegraph stations connected to said telegraph system, a record controlled telegraph transmitting device located at each of said plurality of telegraph stations for transmitting telegraph signals only to said central station, means for normally disabling each of said telegraph transmitting devices, and means responsive to permutation code groups of impulses transmitted only from said central station for selectively starting only one of said transmitters and rendering its disabling means ineffective at any given time.

41. A telegraph system comprising a telegraph transmission system, a plurality of geographically separated telegraph stations connected to said telegraph system, a transmitting device located at each of said stations, means for normally disabling each of said telegraph transmitting devices, and means responsive to permutation code groups of impulses for selectively rendering only one of said disabling means ineffective at any given time, said responsive means comprising a selector coadjuvant to said stations, a universal contact actuated by the operation of said selector in response to any permutation code received thereby, and a contact individual to each of said stations operable by the operation of the selector in response to a code combination selectively identifying said station for rendering said universal contact ineffective.

42. A telegraph system comprising a telegraph transmission system, a plurality of geographically separated telegraph stations connected to said telegraph system, a transmitting device located at each of said stations, means for normally disabling each of said telegraph transmitting devices, and means responsive to permutation code groups of impulses for selectively rendering only one of said disabling means ineffective at any given time, said responsive means comprising selector means coadjuvant to each of said stations, a universal contact actuated by the operation of said selector means in response to any permutation code identifying any of said stations, a contact individual to each of said stations operable by the operation of the respective coadjuvant selector means in response to a code combination selectively identifying said station, said individual contact having a period of effective operation longer than said universal contact, and apparatus for disabling said universal contact during the operation of said individual contact whereby only at stations not identified by said particular code combination, said universal contact prevents the rendering of said disabling means ineffective.

43. A telegraph system comprising a telegraph transmission system, a plurality of geographically separated telegraph stations connected to said telegraph system, a transmitting device located at each of said stations, means for normally disabling each of said telegraph transmitting devices, and means responsive to permutation code groups of impulses for selectively rendering only one of said disabling means ineffective at any given time, said responsive means comprising a selector for each of said stations, a universal contact actuated by the operation of said selector in response to any permutation code received thereby, and a contact individual to each of said stations operable by the operation of the selector for said station in response to a code combination selectively identifying said station for rendering said universal contact ineffective, said contact individual to each of said stations when operated having a period of effective operation completely overlapping the period of effective operation of said universal contact.

44. A telegraph system comprising a telegraph transmission system, a plurality of geographically separated telegraph stations connected to said telegraph system, a transmitting device located at each of said stations, means for normally disabling each of said telegraph transmitting devices, and means responsive to permutation code groups of impulses for selectively rendering only one of said disabling means ineffective at any given time, said responsive means including a selector at one of said stations, a controlling contact operable by said selector upon the reception of any one of a plural number of code combinations, and a contact operable by a particular code combination to cancel the effect of said controlling contact.

45. A telegraph system comprising a plurality of telegraph stations, a telegraph line connected to said stations, a receiving device at each of said stations, disabling means for normally disabling each of said telegraph receiving devices, apparatus responsive to permutation code groups of impulses for selectively rendering only one of said disabling means ineffective at any given time whereby one of said receiving devices may receive telegraph signaling impulses transmitted over said line, said apparatus including selectable elements responsive to a single code combination to determine the one of said disabling means to be ineffective.

46. A telegraph system comprising a main station, a plurality of outlying telegraph stations, a telegraph line extending from said main station to all of said outlying stations, a receiving device at each of said outlying stations for receiving telegraph signals transmitted from said main station, disabling means for normally disabling each of said receiving devices at said outlying stations, and apparatus responsive to permutation code groups of impulses transmitted only from said main station for selectively rendering only one of said disabling means ineffective at any given time whereby one of said receiving devices may receive telegraph signaling impulses transmitted over said line from said main station.

47. A communication system comprising a main control station, adjustable way-station selective means at said control station, a plurality of way-stations, printing telegraph apparatus and selective means at each of said way-stations, a full duplex communication line interconnecting said main station and said way-stations, means at said main station for transmitting selecting signals over said line, means at said main station and way-stations responsive to said selecting signals for starting operation of said way-station selective means and said selective means respectively, means responsive to operation of said station selective means for transmitting over said line a selecting signal dependent upon the adjustment of said means, and means at the selected way-station controlled by said selective signal and said selective means for rendering the associated printing telegraph apparatus operative for communication over said line.

48. In a telegraph system, a plurality of telegraph stations, a first group of telegraph instruments located at a plurality of said stations, a second group of telegraph instruments also located at a plurality of said stations, a first group of switching devices for controlling said first group of instruments, a second group of switching devices for controlling said second group of instruments, apparatus responsive to received telegraph signals for selectively controlling said switching devices, instrumentalities responsive to a predetermined group of signals received in consecutive order for establishing an operative connection between said first group of switching devices and said apparatus responsive to received telegraph signals, and other instrumentalities responsive to another predetermined group of signals for establishing an operative connection between said apparatus responsive to received telegraph signals and said second group of switching devices.

49. A telegraph system comprising a central station, a plurality of secondary switching stations, a common telegraph transmission system extending between said secondary switching stations and said central station, a plurality of local stations associated with said secondary switching stations, telegraph transmitting apparatus located at a plurality of said local stations, telegraph receiving apparatus located at a plurality of said local stations, signal responsive devices at said secondary switching centers for establishing a transmission path to at least one of said local stations for every message transmitted over said system, other signal responsive devices responsive to a predetermined pattern of signaling conditions for selectively controlling said transmitting apparatus, and apparatus at said secondary switching centers responsive to said pattern of signaling conditions for temporarily interrupting the transmission path connecting a local station to said transmission system for the duration of said predetermined pattern of signaling conditions.

50. In a telegraph system, a plurality of stations each comprising a storage controlled telegraph message transmitter, means at one station for controlling the initiation of transmission from another station, said means comprising elements for originating transmitter start codes independently of the storage of said telegraph message transmitter at said one station, means operable under control of said elements for sending transmitter start codes to said other station, and means controlled by and under control of said transmitter start codes to start said storage controlled telegraph transmitter at said other station.

51. In a telegraph system, a telegraph transmission channel, a plurality of message transmitters, control circuits for causing said message transmitters to transmit messages to said channel one at a time, an additional transmitter for transmitting service signals, control apparatus for interrupting, at any point in a message, the operation of any of said message transmitters and connecting said service transmitter to the channel for transmitting service signals over said channel.

52. A telegraph system comprising a line extending from a control office to a plurality of way stations, a storage controlled transmitter at the control office for transmitting over said line messages directed to one or another of the way stations, means at the way stations for selectively receiving messages directed thereto, transmitting means at each way station for transmitting messages toward the control station, receiving means at the control station for recording said messages, means at the control station for sending selective signals to the way stations to start the transmitters thereat one at a time, additional means at the control station operative to interrupt outgoing message transmission from the message transmitter thereat to allow said control signals to be sent, and means for resuming transmitting message signals after the sending of said control signals.

53. In a telegraph system, a plurality of outlying storage controlled message transmitters associated with a channel of telegraphic transmission, a central office having a recorder also associated with said line for recording telegraphic code combinations representing messages sent from said transmitters, said channel being adapted for simultaneous transmission from said transmitters toward said central office and from said central office toward said transmitters, and control means at said central office for selectively transmitting control pulses to selectively initiate transmission of message code combinations from said transmitters.

54. In a telegraph system having a central station, a two-way transmission channel leading from said station, a plurality of outlying stations associated with said path in such manner that any one of said stations can transmit toward said central station simultaneously with transmission from said central station to one of said outlying stations, automatic transmitters at said central station and outlying stations respectively in combination with means for interrupting message transmission from the automatic transmitters at the central station, means for sending control pulses during said interruption to initiate transmission from a transmitter at an outlying station toward said central station, and means for resuming message transmission without introduction of a message error.

55. In a telegraph system having a central station, a two-way transmission channel leading from said station, a plurality of outlying stations associated with said path in such manner that any one of said stations can transmit toward said central station simultaneously with transmission from said central station to one of said way stations, automatic transmitters at said central station and outlying stations respectively in combination with an element conditionable to cause the operation in sequence of automatically operable means for interrupting message transmission from the automatic transmitters at the central station, automatically operable means for sending control pulses during said interruption to initiate transmission from a transmitter at an outlying station toward said central station, and automatically operable means for resuming transmission without introduction of a message error.

56. In a telegraph system, a plurality of tape controlled telegraph transmitters each assigned an individual starting pattern for initiating transmission therefrom, a telegraph transmission path extendable to all of said transmitters, a transmitter start circuit for transmitting the transmitter start patterns assigned to each of said transmitters for extending said path to the respective transmitters and causing transmission therefrom.

57. In a telegraph system, a plurality of storage controlled telegraph transmitters associated with a channel of telegraph transmission, a control office, a recorder at said control office for messages sent from said transmitters, control pulse sending means at said control office and control pulse responsive means at said transmitters selectively responsive thereto to cause the transmission under control of the storage means from a selected one of said transmitters of stored telegraphic matter and the recording thereof by said recorder.

58. In a transmission system, a plurality of storage controlled code transmitters associated with a channel of code transmission, storage means for supplying each said transmitter with message material, a control office, a recorder for messages sent from said transmitters, control pulse sending means at said control office and control pulse responsive means selectively responsive to control pulses received from said sending means to test one of said transmitters selectively for the presence of stored transmissible message material, and means effective on affirmative test to cause transmission thereof and the recording thereof by said recorder.

59. A transmission system including a plurality of storage code transmitters, storage means for supplying each of said transmitters with material in the form of successive messages to be transmitted, a control office, paths outgoing from said control office, means at the control office for effecting selective initiation of transmission of messages from such of said transmitters as may be supplied with message material to said control office, selective relaying means at said control office for choosing one of said outgoing paths for each of said messages, and means sending the message over said path.

60. In a system for the transmission of intelligence by codes, a plurality of automatic code transmitters automatically actuatable by codes stored in physical form, means for supplying to said transmitters message representing codes incorporated with directing codes representing stations of address for the respective messages, said transmitters being associable with a channel of transmission common thereto, a control station separated by a portion of said channel from said transmitters, control pulse sending means at said control office, control pulse means responsive selectively thereto to cause transmission from said transmitters under the control of the stored codes of said transmitters, selective means at said control office selectively actuatable in accordance with the directing codes, and channels of transmission for said messages selectable by said selective means.

61. In a system of telegraphy, a plurality of transmitters, message storing means for each transmitter, means for storing in each message storing means a succession of messages each including at the end thereof an end-of-message signal, means for associating a plurality of said transmitters in which the first message of each is directed to an outgoing channel with said channel, and control means whereby said first messages are all completely transmitted before succeeding messages directed to the said channel in the storage means of any of said transmitters are transmitted.

62. In a telegraph system, a storage medium for storing code combinations in physical form, transmission means controlled by said storage medium, a plurality of channels of telegraphic transmission extending from said transmission means, devices operable under control of and in accordance with certain code combinations stored in said medium to selectively broadcast information to a plurality of receiving stations, and paths selectively automatically controllable whereby any one of a plurality of said stations may cause the storage of code combinations in said medium.

63. In combination, a tape controlled transmitter, means for supplying the tape thereof with successive groups of code combinations in groups constituting messages preceded by address codes and followed by end-of-message indications, and selective means for determining the transmission of successive messages to one or a plural number of stations selectively according to the address codes.

64. In combination, a system of telegraphic transmission including automatic storage type telegraph transmitters each controlled by stored code combinations, means for supplying code combinations thereto, a plurality of geographically separated recorders, selective means controlled by and in accordance with certain of the stored code combinations selectively for controlling recording of certain of said code combinations representing messages by a single one or a plural number of said recorders.

65. An automatic telegraph transmitter, code storage means therefor for controlling the transmission thereof, a start circuit for said transmitter, a plurality of recorders, and selective mechanism controlled by and in accordance with certain recorded codes of said storage means for selectively actuating either one or a plurality of said recorders to control the recording of certain other codes of said storage means.

66. In combination, a system of telegraphic transmission including automatic storage type telegraph transmitters each controlled by stored code combinations, means for supplying code combinations thereto, a plurality of geographically separated recorders, selective means controlled by and in accordance with stored code combinations assigned to individual ones of said recorders for controlling recording of code combinations representing messages by the individual recorders, and means whereby said selective means responds to sequences of said code combinations to control recording of code combinations representing messages by a plurality of said recorders corresponding to the code combinations of said sequences.

67. In combination, a system of telegraphic transmission including automatic storage type telegraph transmitters each controlled by stored code combinations, a plurality of geographically separated recorders, selective means controlled by and in accordance with stored code combinations assigned to individual ones of said recorders for controlling recording of code combinations representing messages by the individual recorders, and means whereby said selective means responds to sequences of said code combinations to control recording of code combinations representing messages by a plurality of said recorders corresponding to the code combinations of said sequences, in combination with message originating transmitters geographically associated with and individual to a respective plurality of said recorders for supplying the stored code combinations in message groups to said automatic storage type telegraph transmitters.

68. In combination, a system of telegraphic transmission including automatic storage type telegraph transmitters each controlled by stored code combinations, means for supplying code combinations thereto, a channel of transmission leading away from said transmitters to a plurality of geographically separated recorders, selective means controlled by and in accordance with stored code combinations assigned to individual ones of said recorders for controlling recording of code combinations representing messages by the individual recorders, and means whereby said selective means responds to sequences of said code combinations to control recording of code combinations representing messages by a plurality of said recorders corresponding to the code combinations of said sequences.

69. In a telegraph system; a plurality of telegraph stations; a telegraph line extending to said stations; telegraph transmitting apparatus located at a plurality of said stations; telegraph receiving apparatus located at a plurality of said stations; signal responsive apparatus; first control apparatus for selectively establishing an operative association of said transmitting apparatus with said telegraph line; a second control apparatus for selectively establishing an operative association of said receiving apparatus with said telegraph line; operative connections between said line, said control apparatus, and said signal responsive equipment for rendering one of said operative associations effective in response to a succession of predetermined code combinations received over said line in a predetermined order; and other operative connections between said line, said control apparatus, and said signal responsive equipment responsive to other predetermined signals for rendering said another of operative associations effective and rendering said one operative association ineffective.

70. In combination, a telegraph line, a plurality of transmitting apparatus associable with said line, a plurality of receiving apparatus associable with said line, equipment responsive to signals received over said line, connections controlled by said equipment in response to a group of predetermined code combinations received over said line in predetermined order to selectively associate said transmitting apparatus with said line, other connections controlled by said equipment in response to another group of predetermined code combinations received over said line in a predetermined order to selectively associate said receiving apparatus with said line, and intercontrol means whereby operations of said equipment to establish said connections of transmitting apparatus and receiving apparatus are mutually exclusive.

71. In combination, a telegraph line, a plurality of transmitting apparatus associable with said line, a plurality of receiving apparatus associable with said line, equipment responsive to signals received over said line, connections controlled by said equipment in response to a group of predetermined code combinations received over said line in predetermined order to selectively associate said transmitting apparatus with said line, other connections controlled by said equipment in response to another group of predetermined code combinations received over said line in a predetermined order to selectively associate said receiving apparatus with said line, and interconnections whereby during selective association of the transmitting apparatus the association of the receiving apparatus is rendered ineffective.

72. In a telegraph system, a station having a transmitter, a channel of telegraphic transmission operatively associated with said channel for transmission thereover by said transmitter, a remotely located recorder for recording messages received over said channel from said transmitter, means controllable from said station for interrupting transmission from said transmitter during any message, means for transmitting matter other than said message over said channel during the interruption, means preventing recording by said recorder incident to transmission of said other matter, and means thereafter automatically resuming transmission of the interrupted message and causing resumption of its recording by said recorder.

73. In a telegraph system, a transmitter of permutation codes, a channel or line outgoing therefrom, a remote receiver of permutation codes associated with said line or channel, means controlling said transmitter for transmission of codes representing a message to said receiver, means for interrupting the operation of said transmitter at the end of a code and transmitting other permutation codes over said line or channel, means operable by remote control for preventing receiving operation of said receiver by said other codes, and means for resuming transmission of codes representing said message by said transmitter and resumption of receiving by said receiver at the beginning of the next code of said message.

74. In a telegraph system, a transmitter of character representing codes in groups comprising messages, remote recorders for said codes, a medium of transmission interconnecting said transmitter with said recorders, means controllable remotely from said recorders for associating any thereof with said medium for recording a message sent by said transmitter, means for interrupting the transmission of said message from said transmitter and transmitting other codes not a part of said message, means operable to prevent recording of said other codes by said recorder, other code responsive means associated with said medium operable by said other codes, and means operable upon resumption of transmission for resuming recording by the same recorder or recorders as before the interruption.

75. In a telegraph system; an automatic storage controlled transmitter associable with a channel of transmission for transmission thereover of stored code material; a receiving recorder, separated from said transmitter by said channel, but associable with said channel for recording such code material; a selectively conditionable element, operable when conditioned to establish a non-recording condition of said recorder; means operable during the time of association of said recorder with said channel for interrupting said transmitter and acting remotely over said channel to condition said element, the action over said channel being transmission of a conditioning effect not causing recording by said recorder; means for transmitting over said channel during the non-recording condition of said recorder codes not recorded by said recorder; and means operable over said channel to restore the recording condition thereof and thereafter resume transmission at the point of interruption.

76. A channel of telegraph transmission, a recorder having a plurality of case conditions for recording code combinations received thereover, a transmitter operably and transmissively related to said channel for transmitting the code conditions to be recorded, means associated with said channel for acting upon said transmitter to interrupt transmission therefrom, means operable incident to the interruptions to interpolatively transmit impulses upon said channel independently of operation of said transmitter, means for resuming transmission, means operable incident to the interruption and resumption of transmission to prevent recording by said recorder incident to said interpolatively transmitted impulses or of spurious code combinations by said recorder and to insure that the case condition of the recorder at the instant of resumption of transmission is unchanged from the condition at the instant of interruption.

77. A communication system of the type in which a through telegraphic communication path is set up between local stations through one or more switching offices, a local station included in such system, said station including a recorder for incoming messages intended for said local station, a reperforator for incoming messages intended for retransmission, and selective apparatus operative under control of received signals for determining whether said messages are recorded by said recorder or perforated by said reperforator.

78. A telegraph exchange system comprising a first office, a second office remote from the first office, a line or channel connecting said offices, printing telegraph apparatus at said offices including transmitting means at the first office, selective switching equipment at the second office for extending calls to any one of a plurality of receiving points, an automatic code transmitter at the first office, means including said code transmitter for directively controlling said switching equipment over said line or channel, and means for initiating the operation of said code transmitter to transmit a message to said second office over said line or channel.

79. A system as set forth in claim 78 in which means is provided for initiating the operation of the code transmitter upon the connection of the transmitting means at said first office to the line or channel to the second office.

80. A printer selector for connecting a normally inoperative circuit or receiving unit to a transmitting line comprising contacts, means for operating said contacts upon the receipt of a predetermined code combination, other contacts, means for operating said other contacts during each cycle of the selector and circuit-controlling means jointly controlled by said contacts.

81. Line switching mechanism comprising a printer responsive to code impulses, said printer being provided with means for operating contacts only upon the receipt of predetermined code signals and for operating other contacts during each operating cycle of the printer, relays connected to both said contacts and said other contacts of the printer, and a line switching device controlled by said relays upon the receipt of predetermined code signals by the printer.

82. A combination of signaling equipment comprising an incoming transmission channel supplying permutation codes including directing codes and message codes, a plurality of recording instruments capable of recording said message codes on respective media associated with said instruments, means normally associating one of said instruments with said channel for recording of incoming message codes, switching means controlled by one of said instruments in response to one or more directing code combinations for dissociating said one instrument from operative association with said source and associating the other therewith, means including means responsive to an end-of-message code combination or combinations for returning said one instrument to its normal association with said channel a transmitter adapted to be controlled by one of said media extending in normally unbroken relation from its respective instrument to its transmitter, other channels of transmission, and elements selectively operable in accordance with one or more of said directing codes as sensed by said transmitter for selectively directing groups of said message codes comprising individual messages over one or another of said channels.

83. A signal receiving station comprising a printing mechanism and a perforating mechanism, a transmission path supplying message code groups of impulses preceded by directing code groups of impulses, apparatus selectively responsive to directing code groups of impulses preceding each message code group of impulses for alternatively associating one or the other but not both of said mechanisms with said path to record the following message code groups of impulses means responsive to a code combination or combinations constituting an end-of-message signal appended to each message for temporarily terminating reception by said perforating mechanism to permit the subsequent directing code groups of impulses to determine whether said printing mechanism or perforating mechanism will be associated with said path for the next message, a medium in which said perforating mechanism perforates code groups, a transmitter controlled by said perforated code groups, said medium being normally continuous between said perforating mechanism and said transmitter, means operable in a selective manner for associating said transmitter selectively with a plurality of channels of telegraphic communication for transmitting messages thereover, means responsive to end-of-message signals perforated in said medium to stop said transmitter at the end of each message transmitted thereby to allow operation of said selectively operable means to determine the channel to which the next message is to be transmitted.

84. Apparatus for selectively operating a switching device comprising selector means responsive to permutation code combinations, a contact actuatable under control of said selective means to prepare for a switching operation in response to a particular code combination, an element conditioned for subsequent switching by actuation of said contact, a switching contact operable to operate said switching device by a selected code combination chosen from all the code combinations capable of operating said selector means when said element is conditioned, and restoring means operable by a universal contact upon the receipt of a code combination other than said selected code combination to uncondition said element.

85. Apparatus for selectively executing a switching operation comprising selector means, a switching circuit rendered effective in response to a sequence of particular code combinations operating said selector means, a contact operated in common by all code combinations, control means operated by said common contact upon the interposition in said sequence of a code foreign thereto, and a circuit changer operable to prevent said switching circuit from being rendered effective upon the operation of said control means regardless of the actuation of the selector by the remainder of the sequence.

86. Apparatus for selectively executing a switching operation comprising a selector, selector controlled contacts, one of said contacts being selectively operable by said selector, apparatus conditioned by the operation of said one contact when operated, one of said controlled contacts being a universal contact operable in response to all code combinations, and means controlled incident to operation of said universal contact and some particular contact to execute said switching operation, in combination with means effective incident to operation of said universal contact without operation of said particular contact to uncondition said conditioned apparatus.

87. Apparatus for selectively operating a switching device comprising selector means responsive to permutation code combinations, a contact actuatable to prepare for a switching operation in response to a particular code combination, an element conditioned for subsequent switching by actuation of said contact, a switching contact operable to operate said switching device by a selected code combination when said element is conditioned, and restoring means operable by a universal contact upon the receipt of a code combination other than said particular and selected code combinations to uncondition said element.

88. The method of operating two telegraph systems, the second of which includes a storage controlled transmitter, which comprises sending from a station on the first system to a station common to the first and a second system a series of code combinations including a code combination designed to identify a station of address of the second system together with each message, causing the code combination to control the recording of the message at the common station when the code combination identifies the common station as the station of address, and causing the storage of the message in the storage of the storage controlled transmitter of the second system when the code combination identifies as the station of address some station of the second system other than the common station.

89. The method of operating two telegraph systems, the second of which includes a storage controlled transmitter which comprises sending from a station of the first system to a station common to the first and second systems a series of code combinations designed to identify the station to which the accompanying message is to be transmitted, causing the code combinations to control the recording of the message at the common station when the identifying code combinations identify said common station, and causing the storage of the message in the storage of the storage controlled transmitter of the second system when the identifying code combinations are any code combinations other than the code combinations identifying said common station.

90. In a telegraph system, a channel of telegraph transmission, means including a storage controlled transmitter for sending messages thereover under control of physically stored information representing message matter, a receiving instrument for receiving said message matter having a "case shift mechanism" controllable from one position to another by case control codes sent over said channel by said means, instrumentalities for interrupting transmission by said means, a switching selector associated with said channel for control thereover, devices for sending coded impulses over said channel during said interruption to control said switching selector, and means for resuming transmission to and recording by said receiving instrument in the same case independently of signaling conditions impressed upon said channel during interruption.

91. A telegraphic transmission channel, means including a code storage transmitter associable therewith for transmission thereover, a receiver for recording said transmitted matter including codes assigned "case shift" functions, interrupting means for stopping said transmitter between codes for the purpose of transmitting circuit switching conditions over said channel during said interruption, means for transmitting said conditions during said interruption and switching means controlled over said channel responsive thereto, means operative to resume transmission from said transmitter to said receiver, and means operative upon said interruption and resumption of transmission to resume reception by said receiver as though said interruption had not occurred.

92. In a telegraph system, a telegraph channel, means including a printer-code storage and transmitting device for transmitting a message over said channel, control means for said transmitting device to render the same active, a selective recorder remotely located from said transmitting devices for recording said message, means for controlling said control means to interrupt message transmission over said channel, means operative during said interruption to transmit over said channel other pulse conditions to which said selective recorder would normally respond, another selector remotely located from said transmitting devices for selectively responding to said other pulse conditions, means for thereafter resuming transmission of the interrupted message from the point where the interruption occurred, and means operable incident to the interruption to insure that the selective recorder records nothing foreign to the message incident to the interruption, transmission of the pulse conditions, and resumption of transmission.

93. In a multi-station telegraph system, a main office or switching center and a plurality of branch stations, telegraph lines or channels connecting said branch stations to said main office, means including storage means at said main office for transmitting a message arriving over one of said lines or channels over another of said lines or channels, printers at said stations for effecting communication over said lines or channels, means at said main office for transmitting a control signal including a circuit interruption of predetermined duration over said lines or channels, and automatically operative means for temporarily stopping message transmission over said lines or channels while said control signal is being transmitted.

94. In a multi-station telegraph system, a main station or switching center and a plurality of branch stations, telegraph lines connecting said branch stations to said main office, means including a tape reperforator and a tape sensing transmitter controlled thereby at said main office for storing a message arriving over one of said lines and retransmitting said message over another of said lines, switching means at said main office for selectively interconnecting said transmitter with a desired outgoing line, printers at each of said stations for recording messages, means at said main station for transmitting a control signal over one of said lines, and automatically operative means for temporarily stopping message transmission over said line during the time said control signal is being transmitted to prevent interference therewith.

95. In combination, a main station or switching office, a branch telegraph station, a line or channel arranged for duplex operation between said main office and said branch station, means for transmitting printing telegraph signals from each station to the other station, means for transmitting a control signal including a blank code combination from the main office to the branch station and operative means for temporarily and automatically interrupting normal transmission of message signals from the main office to said branch station to permit the initiation of said control signal.

96. In combination, a main station or switching office, a branch telegraph station, a line or channel arranged for duplex operation between said main office and said branch station, means for transmitting printing telegraph signals from each station to the other station, means for transmitting a control signal including a circuit interruption of predetermined duration from the main office to the branch station and automatically operative means for interrupting normal transmission of message signals from the main office to said branch station incident to the initiation of said control signal.

97. In a telegraph system, a main station, a plurality of other stations, a first and a second line connecting a first one and a second one of said other stations with said main station, means for transmitting signals in either direction over each of said lines, means at said main station for generating selective control signals comprising line circuit interruptions, and means for transmitting said control signals over either of said lines.

98. A telegraph system comprising a multi-station line, a central station and a plurality of outlying stations associated with said line, each outlying station having a transmitter and recording means for recording messages transmitted to it, storing means at said main station operable to record in a flexible medium from one station at a time signals from any of said outlying stations, means including transmitter means at said central station for transmitting to one of said outlying stations selectively, means at the central station supplemental to its message transmitter means for interrupting, and maintaining interrupted, transmission from said transmitter means, and sending control signals to control association or dissociation of said transmitters at said outlying stations with said line, means supplemental to said recorders for responding to said control signals for responding to and effecting the association or dissociation, and means for resuming transmission from said transmitter means.

99. A telegraph system including a multi-station transmission path, a central station and a plurality of outlying stations associated with said path for common use thereof, each outlying station having a recorder for recording messages transmitted to it and a transmitter, storing means at said main station for use in common but successively by said outlying stations to record in a flexible medium signals from said outlying stations, means including transmitter means at said central station for impressing upon said path control conditions and means at or adjacent to said outlying stations responsive thereto to condition at least one of said stations and cause it to record a message sent by said transmitter means via said path and locking out another thereof from so recording.

100. A system according to claim 97 comprising other transmission paths leading from said central station to other outlying stations, and means selectively operable to cause the transfer of any message stored in said storing means to a selected one of said stations.

101. A message directing system having a central office in which means is provided for storing messages in mechanical form in a medium, transmission means operable under control of said medium, paths of transmission including one or more multi-party paths usable in common by a plurality of outlying stations associated with such path, means including control signal sending means in said central office and including control signal responsive means at or adjacent to said outlying stations to selectively cause the sending by said transmission means over a selected multi-party path to a selected outlying station upon said path messages intended therefor and to prevent their sending by said transmission means to unselected stations.

102. Apparatus for selectively operating a switching device, comprising selector means responsive to permutation code combinations; a contact actuatable to prepare for a switching operation in response to a particular one of said code combinations; an element conditioned for subsequent switching by actuation of said contact; a switching contact operable following the conditioning of said element both to operate said switching device and to uncondition said element by a selected one of said code combinations; and restoring means to uncondition said element without operating said switching device operable by a universal contact upon the receipt of any code combination other than said particular and said selected code combinations.

103. Apparatus including a selector operable under control of code permutations for selectively executing a switching operation; comprising selectable contacts operated selectively by said selector and a common contact operated upon all selections; apparatus conditioned by the operation of an assigned selectable contact; and means controlled, while said apparatus is conditioned, incident to operation of said common contact and one of said selectable contacts to execute said switching operation; in combination with means effective, while said apparatus is conditioned, incident to operation of said common contact by code permutations other than those which operate said assigned and said one contact to uncondition said conditioned apparatus.

104. A multiple selective transmission system wherein concurrent transmission of messages over any two or more of a group of lines is effected and each message is terminated by an end-of-message signal, resettable elements, means including said resettable elements for selecting the desired ones of said lines over which transmission is to be effected simultaneously and means responsive to the end-of-message signal for resetting said elements to normal after transmission of the message.

105. A multiple selective transmission system wherein transmission of messages over a selected line may be accomplished, resettable elements, means for selectively resetting one of said elements to establish a connection, holding circuit means for holding any of said elements which are set, and means operated by an end-of-message signal for actuating a contact controlling said holding circuit means to release any of said elements previously set incidental to establishing a connection.

106. A multiple selective transmission system wherein concurrent transmission of a message from a given station over two or more lines of a group may be accomplished selectively, a series of actuatable elements, one for each of the lines of said group, means including holding circuit means for holding any of said elements actuated upon its actuation to establish a message transmission path over its line, a circuit including a contact controlling all of said actuated elements, and means for interrupting said last named circuit to release all said elements held actuated.

107. A multiple transmission system wherein concurrent transmission of a message from a given point over two or more lines chosen selectively from a group may be accomplished, a series of actuatable elements, one for each of the lines of said group, means including holding circuit means for holding each of said elements actuated when actuated to establish a message transmission path over its line, an electrical path including a contact controlling all of said actuated elements, and means operable by an end-of-message signal appended to each message to operate said contact to release all such elements as may be held.

108. A multiple selective transmission system wherein concurrent transmission of coded pulse groups comprising messages over any two or more of a group of lines may be effected, each message being terminated by pulses comprising an end-of-message signal, relays having a normal position and an operated position for conditioning the desired ones of said lines over which transmission is to be effected simultaneously, and means responsive to an end-of-message signal for restoring said relays to normal position after transmission of a message.

109. A telegraph system comprising a telegraph station, a telegraph line connected to said telegraph station, a receiving printing telegraph apparatus located at said station, a receiving perforating telegraph apparatus located at said station, means establishing an operative association between said line and one of said printing apparatus and said perforating apparatus, means controlled by received telegraph signals for operatively associating the other of said receiving apparatus to said line and operatively disassociating the one therefrom, a transmitter, a tape perforated by said perforating apparatus extending to said transmitter to control the transmission thereof, a circuit controller controlled by said tape having a normal condition and a taut tape condition, and feedout means operable for supplying more tape incident to the simultaneous occurrence of said taut tape condition and the association of said line with said printing apparatus.

110. A telegraph system comprising a telegraph station, a telegraph line connected to said telegraph station, a receiving printing telegraph apparatus located at said station, a receiving perforating telegraph apparatus located at said station, means establishing an operative association between said line and one of said printing apparatus and said perforating apparatus, means controlled by received telegraph signals for operatively associating the other of said receiving apparatus to said line and operatively disassociating the one therefrom, and means operable upon cessation of signals incoming to said reperforating apparatus to step tape perforated with "Letters Shift" characters from said reperforator.

111. A telegraph system including a recording instrument having selectable code elements for recording successive code combinations representing telegraphic messages and an end-of-message signal comprising a code or codes for each message on a flexible medium, means for causing said instrument to record successive messages each followed by one or more selected codes as an end-of-message signal, said medium extending in a loop to a transmitter controlled by said tape for sending such messages out over a channel or channels of transmission, means for causing said recording instrument to feed out tape in steps to supply the whole of a message and its end-of-message codes to said transmitter when not so supplied by a following message, and elements operable to maintain said code elements all marking on each step to cause said tape as so fed out to be perforated with all marking conditions.

112. A telegraph system including a recording instrument for recording successive code combinations representing a telegraphic message and a special code indicative of temporary cessation of incoming transmission on a flexible medium, said medium extending in a loop to a transmitter controlled by said tape for sending such messages out over a channel or channels of transmission, means dependent upon cessation of incoming transmission following receipt of said special code combination for causing said recording instrument to feed out tape sufficient to advance said special code to said transmitter, and the perforating elements of said instrument being operable incident to such feed out to cause said tape as so fed out to be perforated with "Letters Shift" code combinations.

113. In a telegraph system, a record controlled telegraph transmitter comprising mechanical means for responding to signals stored in a storage medium, a plurality of contacts operatively controlled by said mechanical means, sensing means for sensing a code group stored in said medium, feed out means for normally advancing said medium past said sensing means, electromagnetic means for preventing the further operation of said feed means incident to sensing said code group, a plurality of other contacts also controlled by said sensing means to establish a channel-awaiting condition of said transmitter for its subsequent transmission, and a relay which incident to rendering said channel available to said transmitter for its further transmission estops further preventing by said electromagnetic means.

114. A communication system of the type in which a through telegraphic communication path is set up between local stations through one or more switching offices, a local station included in such system, said station including a recorder for incoming messages intended for said local station, a reperforator for incoming messages intended for retransmission, a relay apparatus controlled by the reperforator selectively for each message in accordance with non-message codes preceding such message for determining whether the message is to be recorded or reperforated, and means operated under control of the reperforator to condition either the recorder or the reperforator for such operation.

115. A communication system having a local station, said station including a recorder for incoming messages intended for said local station, a reperforator for incoming messages intended for retransmission, selective apparatus operable under selective control of the reperforator selectively in accordance with received signals for determining whether said messages are recorded by said recorder or perforated by said reperforator, and elements operative incident to each message operative under control of signals accompanying that message to cause said reperforator to exercise such selective control.

WALTER M. BACON.
EDWARD F. WATSON.

REFERENCES CITED

The following references are of record in the file of this patent:

UNITED STATES PATENTS

| Number | Name | Date |
|---|---|---|
| 1,105,920 | Potts | Aug. 4, 1914 |
| 1,370,669 | Potts | Mar. 8, 1921 |
| 1,851,956 | Dirkes | Mar. 29, 1932 |
| 1,895,718 | Kleinschmidt | Jan. 31, 1933 |
| 1,917,294 | Carr | July 11, 1933 |
| Re. 19,321 | Reiber | Sept. 18, 1934 |
| 2,021,382 | Reiber | Nov. 19, 1935 |
| 2,023,952 | Dirkes | Dec. 10, 1935 |
| Re. 21,086 | Preston | June 30, 1936 |
| 2,097,789 | Hailes | Nov. 2, 1937 |
| 2,113,383 | Powell | Apr. 5, 1938 |
| 2,116,506 | Carr et al. | May 10, 1938 |
| 2,116,549 | Zenner | May 10, 1938 |
| 2,143,828 | Dirkes et al. | Jan. 10, 1939 |
| 2,148,430 | Benjamin | Feb. 28, 1939 |
| 2,152,010 | Zener | Mar. 28, 1939 |
| 2,154,592 | Watson | Apr. 18, 1939 |
| 2,193,809 | Dirkes | Mar. 19, 1940 |
| 2,346,173 | Light | Apr. 11, 1944 |

FOREIGN PATENTS

| Number | Country | Date |
|---|---|---|
| 437,646 | Great Britain | Nov. 4, 1935 |